United States Patent
Shimizu et al.

(10) Patent No.: US 7,809,850 B2
(45) Date of Patent: Oct. 5, 2010

(54) DIGITAL CONTENT DELIVERY SYSTEM, DIGITAL CONTENT DELIVERY METHOD, PROGRAM FOR EXECUTING THE METHOD, COMPUTER READABLE RECORDING MEDIUM STORING THEREON THE PROGRAM, AND SERVER AND CLIENT FOR IT

(75) Inventors: Shuichi Shimizu, Yokohama (JP); Taiga Nakamura, College Park, MD (US)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 10/523,347

(22) PCT Filed: Jun. 4, 2003

(86) PCT No.: PCT/JP03/07093

§ 371 (c)(1),
(2), (4) Date: Dec. 21, 2005

(87) PCT Pub. No.: WO03/105421

PCT Pub. Date: Dec. 18, 2003

(65) Prior Publication Data

US 2006/0168104 A1      Jul. 27, 2006

(30) Foreign Application Priority Data

Jun. 6, 2002  (JP) ............................ 2002-165014
Oct. 18, 2002  (JP) ............................ 2002-303850

(51) Int. Cl.
*G06F 15/16* (2006.01)

(52) U.S. Cl. ........................................... 709/231

(58) Field of Classification Search ................. 709/231, 709/233, 203, 218, 234
See application file for complete search history.

(56) References Cited

U.S. PATENT DOCUMENTS

| 5,095,444 | A | * | 3/1992 | Motles ........................ 709/224 |
| 5,790,541 | A | * | 8/1998 | Patrick et al. ................ 370/392 |
| 5,864,854 | A | * | 1/1999 | Boyle .......................... 707/10 |
| 6,434,622 | B1 | * | 8/2002 | Monteiro et al. ............ 709/231 |

(Continued)

OTHER PUBLICATIONS

Taiga Nakamura, "Reliable Multicast based on Peer-to-Group Dissemination", IBM Research, http://domino.research.ibm.com/comm/research_people.nsf/pages/taiga.index.html, Jul. 11, 2002, 16 pages.*

Deering et al. "Multicast Routing in Datagram Internetworks and Extended LANs," Stanford University, ACM Transactions on Computer Systems, vol. 8, No. 2, May 1990, pp. 85-110.

(Continued)

*Primary Examiner*—Philip C Lee
*Assistant Examiner*—Jason Recek
(74) *Attorney, Agent, or Firm*—Michael Buchenhorner; Vazken Alexanian

(57) ABSTRACT

A system distributes digital contents through first and second networks and. A server is connected to the first network, and clients for receiving and displaying or reproducing the digital contents are connected to the second network. The server divides digital contents held therein into a plurality of packets, and transmits packets of a minimum unit for constructing the digital contents to the second network. The clients include storage for holding the digital contents therein by use of the packets of the minimum unit received from the server and packets received from other clients constructing the second network.

12 Claims, 35 Drawing Sheets

(a)

(b)

U.S. PATENT DOCUMENTS

| | | | |
|---|---|---|---|
| 2003/0115351 A1* | 6/2003 | Giobbi | 709/231 |
| 2003/0204585 A1* | 10/2003 | Yao et al. | 709/224 |
| 2003/0204613 A1* | 10/2003 | Hudson et al. | 709/231 |
| 2004/0030929 A1* | 2/2004 | Bi et al. | 713/201 |
| 2005/0120131 A1* | 6/2005 | Allen | 709/233 |
| 6,622,157 B1* | 9/2003 | Heddaya et al. | 709/202 |
| 6,778,537 B1* | 8/2004 | Ishibashi | 370/395.62 |
| 2001/0018772 A1* | 8/2001 | Shibata et al. | 725/93 |

OTHER PUBLICATIONS

Banerjee, S. et al. "Scalable Application Layer Multicast," Department of Computer Science, University of Maryland, May 2002, pp. 1-17.

Shan Zhe, Wei Ming Liang, Chen Dao Xu, Xie Li, "Application and Implementation of Multicast Technology in Real-time Video Transfer System," Computer Science 2000, vol. 27, No. 11, Nov. 2000, pp. P20-P24.

* cited by examiner (a)

| GROUP | CLIENT ADDRESS | EFFECTIVE THROUGHPUT |
|---|---|---|
| #1 | 255.255.aaa.001 | #1Ta |
| | 255.255.aaa.012 | #1Tb |
| | 255.255.aaa.032 | #1Tc |
| | 255.255.aaa.040 | #1Td |
| | 255.255.aaa.041 | #1Te |
| #2 | 255.255.bbb.017 | #2Ta |
| | 255.255.bbb.019 | #2Tb |
| | ⋮ | |

(a)

(b)

(a)

(b)

(c)

US 7,809,850 B2

DIGITAL CONTENT DELIVERY SYSTEM, DIGITAL CONTENT DELIVERY METHOD, PROGRAM FOR EXECUTING THE METHOD, COMPUTER READABLE RECORDING MEDIUM STORING THEREON THE PROGRAM, AND SERVER AND CLIENT FOR IT

CROSS REFERENCE AND PRIORITY

This application filed under 35 USC 371, is cross-referenced with, and claims priority from, International Patent Application PCT/JP03/07093 filed on Jun. 4, 2003, and published in English with Publication No. WO 03/105421 on Dec. 18, 2003, under PCT article 21(2), which in turn claims priority of Japanese Application No. 2002-165014, filed on Jun. 6, 2002 and Japanese Application No. 2002-303850, filed on Oct. 18, 2002.

BACKGROUND OF THE INVENTION

The present invention relates to a distribution of digital contents. More specifically, the present invention relates to a digital contents distribution system and a digital contents distribution method, which distribute digital contents from digital contents distribution sites through networks, and make a plurality of clients store the digital contents therein, thus making it possible to distribute the digital contents efficiently through the networks. Moreover, the present invention relates to a program for executing the method, a computer readable recording medium including the program, and to a server and clients therefor.

Moreover, the present invention relates to a digital contents distribution system, which makes it possible to distribute the digital contents to a predetermined wide area group including a plurality of groups connected to one another through the networks, each group being constructed by including a plurality of clients, while reducing overheads of communication traffics to servers. Furthermore, the present invention relates to a server and clients for the system, a control method for making computers function as the above-described server and clients, a program for the method, and a computer readable recording medium recording the program therein.

Recent years, more and more widespread have been networks such as the Internet through systems including a computer, a public telephone line, ISDN, optical communication, wireless communication, ADSL and CATV. It is conceived that services will be further widespread in the future, which distribute text data, audio data, image data and multimedia data made by compounding these through the networks to clients such as a plurality of computers or mobile terminals from servers placed at sites providing the digital contents, besides digital contents such as E mail.

Meanwhile, besides the first network such as the above-described Internet, which is capable of managing or distributing the digital contents over a wide range, the second networks such as Local Area Network (LAN) and Wide Area Network (WAN) have also been widespread rapidly, which share, manage and distribute the digital contents in relatively narrow ranges in comparison with the Internet. The above-described second networks enable efficient use of computer resources in public groups such as business enterprises, government bodies, administrative organs, educational institutions, libraries and broadcast communication organization. Specifically, it can be said that current connections among servers in a public group are made through the plurality of networks belonging to the plurality of groups in many cases. Usually, a plurality of clients such as the computers (hereinafter, referred to as "clients") are interconnected so as to form a predetermined group in each of the above-described second networks, thus making it possible for each group to hold the given digital contents.

In the above-described network environment, it may sometimes be necessary to distribute the digital contents held in the server to a plurality of clients belonging to other networks. Heretofore, a variety of transmission methods or systems for distributing the digital contents transmitted from a server to a plurality of clients have been proposed.

For example, Deering, S., et al. has proposed a method called IP multicast for the purpose of avoiding overlap of packets on a network route in "Multicast Routing in Internetworks and Extended LANs (Stanford University, Department of Computer Science Technical Report: STAN-CS-88-1214, July, 1988)." FIG. 31 is a schematic diagram illustrating the IP multicast method proposed by Deering, et al. As illustrated in FIG. 31, the IP multicast method proposed by Deering, et at. has had a disadvantage in involving complicatedness of network resources, which includes a necessity of placing dedicated routers having "states" regarding clients receiving service instead of simple routers performing IP transfer though the method eliminates the overlap of the packets on the network 100 to enable good communication. Another disadvantage in that scalability of the network is restricted has occurred, which includes a necessity of expansion of network equipment and incapability of coping with a situation such as sudden interference with and departure of the client in association with the above-described complicatedness of the network resources.

Moreover, because the IP multicast has a structure of sending data from an arbitrary source to an arbitrary group, the IP multicast has a disadvantage in weakening against a malicious attack and requiring a unique global address to be secured for the group. However, the IP multicast has an advantage in that the service can be managed at low cost in terms of distributing the digital contents because the IP multicast basically provides best-effort service. However, the IP multicast is unsuitable for use in a backbone line of an enterprise, in which a slight line disconnection leads to a great loss, and use in moving picture distribution always requiring a fixed band to be secured. As described above, the IP multicast has a disadvantage in that handling for securing reliability, avoiding congestion and securing security is difficult in comparison with unicast. Furthermore, the IP multicast requires a large-scale change of a network infrastructure. For the above-described reasons, it cannot be said yet that the IP multicast is practical.

Moreover, in order to solve the above-described problems of the IP multicast, an "applicant-level multicast" system has been proposed, which is described in the following documentations. Dimitrios Pendarakis, Sherlia Shi, Dinesh Verma, and Marcel Waldvogel. Almi: An application level multicast infrastructure. In Proceedings of the 3rd USENIX Symposium on Internet Technologies and Systems (USITS), pages 49-60, 2001; Y. Chu, S. Rao, and H. Zhang. A Case For End System Multicast. In Proc. ACM Sigmetrics, June 2000; P. Francis, "Yoid: extending the internet multicast architecture."

In the foregoing background arts, a system is used, in which clients also serve as relay points for packet transmission, and packets are transferred to downstream clients. FIG. 32 is a schematic diagram illustrating digital contents distribution using the application-level multicast system. The application-level multicast system shown in FIG. 32 is configured in such a manner that the client 106 is given a rank and the client 106 can transmit packets in accordance with individual path tree structures. In the application-level multicast system illustrated in FIG. 32, Pendarakis, et al. calculated the minimum network for efficiently connecting all of the join clients to one another. Moreover, Chu, et at. tried to allocate packet flows to the clients.

The minimum network is formed as, for example, the minimum spanning tree (MST) in which branches are weighted by a round-trip time (RTT). Because the MST is determined statically, it will be necessary to reconstruct the network if the departure of the join clients occurs. Because the server 108 executes the calculation that performs this reconstruction, there is a disadvantage in that an overhead given to the server 108 is increased. Moreover, there has been proposed a method for reducing the overhead to the server 108, in which the reconstruction caused by the join and departure of the respective clients is carried out locally, and the entire construction of the minimum network is reviewed, and so on. Nevertheless, if a client located at an intermediate point in a path tree structure that transmits the packets is departed, and if the central processing unit (CPU) of the client 106 is allocated to another process to fail in relaying the packets, then the minimum network will be affected by a factor such as a sudden shutdown of packet receiving in a client downstream thereof. In order to avoid such a disadvantage, it is necessary to take measures such as impartment of a redundancy to the minimum network (tree structure) and prepreparation of an alternate tree structure. This brings more and more complicatedness of the construction of the minimum network, and therefore, the overhead added to the server 108 in the reconstruction will be further increased. This is because each client is given a role of the relay statically and because the generation and reconstruction of the path tree structure including network construction information is carried out only by the server.

Meanwhile, there has also been proposed a system for caching the transmission packets coordinately by use of dispersed clients. In the system for caching the transmission packets coordinately, data is acquired not from the server 108 but from the caches of the clients 106 (Specification of Japanese Patent Application No. Hei 11 (1999)-282332, Title of the Invention: "Data Caching System on Basis of Dispersed Clients"). The specification of Japanese Patent Application No. Hei 11 (1999)-282332 discloses a technique of acquiring data from a client, in which the respective clients search the client caching desired data therein by use of a correspondence table between data cache and the clients.

Although the method disclosed in the specification of Japanese Patent Application No. Hei 11 (1999)-282332 enables good caching in the client, a delay occurs at least by a length of the data to be cached when data are acquired. Therefore, in the case of streaming requiring realtime characteristics with a short time delay, the method is insufficient in terms of the realtime characteristics. Moreover, the specification of Japanese Patent Application No. Hei 11 (1999)-282332 never discloses caching for data with a long length. Furthermore, if the above-described data caching system manages the streaming data by dividing this data into small packets for the purpose of reducing the time delay due to the caching, then it will be necessary to update the correspondence table for the caching frequently in the unit of the packets, and the overhead for the client will be increased. Therefore, not only the advantage of including the correspondence table in the clients is damaged, but also the overheads of the clients are significantly increased. Accordingly, the method is impractical.

Meanwhile, Aramaki, et al. have proposed a construction of connecting the clients to an edge server. FIG. 33 schematically illustrates a system proposed by Aramaki, et al. The system illustrated in FIG. 33 uses the server 108 placed remotely through the network 100 and the edge server 100 placed near the clients 106. The network 100 between the remote server 108 and the edge server 110 is formed as a best-effort type network, where digital contents are transmitted so as to make full use Of a bandwidth thereof, and then the transmitted digital contents are once cached in the edge server 110. The cached digital contents are streamed anew from the edge server to the clients nearby, and thus the distribution of the digital contents to the clients is completed. Specifically, the method of Aramaki, et al. provides one solution to a method for restricting overlap of packets between the server 108 and the edge server 110 to avoid congestion of the network. However, the overhead of the edge server 110 is prone to be a subject even in the case of using the edge server 110, and it is necessary to reduce overlap of transmission packets also in the case of transmitting the packets from the edge server 110 to the respective clients.

If a backbone between the server 108 and the edge server 110 is a bandwidth sharing type intranet even in the case where the Internet is not used for connection therebetween, a similar construction to the above, which uses the server 108 and the edge server 110, can be utilized for avoiding the congestion due to the packet overlap on the backbone. However, it is necessary to place the edge servers 110 under all of end routers interconnected by backbone routers. Therefore, cost of constructing the second network such as LAN and WAN is increased, thus causing disadvantages such as a further increase of maintenance cost of the edge server 110 and an increase of a load to a network administrator, which is caused thereby. Moreover, a status is brought, where the increase of the complicatedness as a system becomes a problem from a viewpoint of the network and autonomic computing therefor. Hence, it has been necessary to provide a plurality of clients with a simple and robust operational system, which includes functions such as self-configuring and self-optimizing without any special auxiliary servers (edge servers and the like) and imparts network autonomy while securing the realtime characteristics in the digital contents.

Moreover, in the above-described IP multicast, a transmission source designates an IP address having a value within a special range as a destination and transmits the packets thereto. This IP address represents a multicast group. A host on the receiving side transmits an join request to this group to the respective routers on the path, and the routers having received the request recognize a group having transmitted the join request and execute processing of distributing the packets thereto. The same packets can be transmitted at one time to a large number of hosts on the receiving side without the overlap of the packets by performing appropriate routing also by use of the multicast.

In a single network that does not diverge from the above-described routers and limited networks, the contents distribution by the multicast functions well without causing a large investment burden on the equipment/apparatus or the disadvantage to the communication traffics particularly. However, the communication protocol for use in the present Internet as a whole (IPv4) does not usually give validity to the multicast function. In general, additional apparatus/equipment is required in order to actually perform the multicast on the Internet.

FIG. 34 illustrates a network system that enables contents distribution corresponding to another multicast than the above-described multicast, for example, pseudo multicast as a well-known method. In this case, the contents are distributed to groups to which the above-described multicast can be applied. The network system illustrated in FIG. 34 enables the digital contents distribution by forming a plurality of tunnels between a server and the plurality of groups. The server 112 illustrated in FIG. 34 distributes the digital contents through the first network 116 such as the Internet to the wide area group G constructed of the groups 114a to 114c. The wide area group G illustrated in FIG. 34 is constructed by including the groups 114a to 114c. For example, business enterprises, public institutions, government bodies and educational institutions can be cited.

Concretely, if description is made by exemplifying, for example, one business enterprise, then the group 114a can be defined as a Hokkaido sales office, the group 114c can be defined as a Kyushu sales office belonging to the same enterprise, and so on. The server 112 illustrated in FIG. 34 distributes the digital contents in the multicast manner to the groups 114a to 114c individually by use of constructions called the tunnels 118a to 118c. More specifically, the tunnels 118a to 118c distribute multicast packets to receivers on networks at one time in such a manner that an entry port of the tunnel between two different networks and an exist port are provided, respectively and the data packets are transferred via the entry and exit ports. As illustrated in FIG. 34, the plurality of tunnels must be prepared in accordance with the number of groups in order to carry out the multicast distribution to the plurality of groups.

The above-described technology of tunneling is already known in public. It is also known that the multicast distribution by the tunneling does not often function fully when the number of groups is numerous. It is FIG. 35 that illustrates the above more concretely. In FIG. 35, the transmitter of the digital contents (hereinafter, referred to as a "provider") and a large number of groups are mutually connected through the Internet. The groups 114a to 114c are connected to the first network through lines different in communication capacity, such as ISDN, ADSL, CATV and optical communication, used by the groups. Moreover, the clients in each of the groups 114a to 114c are mutually connected through a communication infrastructure of a type varied and different from others in communication capacity, for example, the second network such as, for example, a local area network (LAN) constructed by using Ethernet (registered trademark) and a wireless communication network. The plurality of clients 122 are mutually connected on the second network, which are then connected to the first network 116 through the routers 124 and the like. The server 112 transmits the packets to all of the clients 122 under such a status.

Under the status illustrated in FIG. 35, disadvantages described below occur in accordance with the conventional technique of performing the multicast distribution by the tunneling.

(1) Problem on Operation and Management in Group to be on the Receiving Side:

In order to provide the ports of the tunnels to the second networks, dedicated host apparatuses are required, which are constructed to be capable of receiving the packets by the multicast and multicasting the packets to the clients 122. Naturally, the communication to the LAN interconnecting the clients in each group depends on the function of the dedicated host apparatus. Therefore, when the dedicated host comes not be usable for some reasons, all of the clients on the second network managed by the dedicated host apparatus are affected.

(2) Problem on Network Bandwidth of Contents Distribution Server:

Because the communication between the server 112 and the respective groups is unicast, an amount of packets transmitted by the server and an amount of the communication traffics therefor are multiplied by M if the number of the groups is M. Hence, unless a high capacity communication infrastructure is used on the server 112 side, simultaneous communication comes to be impossible without damaging the realtime characteristics as the number of groups is being increased more. This leads to a loss of attraction in terms of a cost merit in using the multicast.

Specifically, in the one-to-multi distribution of the digital contents, and more particularly, in the distribution of the digital contents for which the realtime characteristics are required, it has been necessary heretofore to enable the distribution of the digital contents improved in the realtime characteristics, in which the overlap of the transmission packets on the network paths is avoided to avoid the congestion of the traffics, the complicatedness of the individual routers is not brought, and a change involving a large-scale investment such as for work and cost of exchanging all of the routers on the paths is not required. Moreover, it has been necessary to distribute the digital contents without damaging the stability of the network system, in which no change is given to network layers such as the routers and switching hubs, and further, a necessity of the reconstruction corresponding to the frequent join and departure of the clients in the static minimum network is eliminated, thus reducing the overheads to the server.

Specifically, it has been necessary to distribute the digital contents of which realtime characteristics are secured without increasing the complicatedness of the network resources and the reconstruction overheads to the server in a manner that the network imparted with redundancies is constructed in order to secure the stability of downstream clients and to enable the digital contents distribution to the users securely, for example, when a client located at an upstream relay point is departed due to an abnormal end.

Furthermore, in the case of using the tunneling, though it is possible to increase the number of tunnels to be constructed as the number of groups is being increased, this will further compress the communication traffics on the server side in accordance with the increase of the number of tunnels. Moreover, in order to prevent the above-described disadvantages on the server side, a method for avoiding the congestion on the server side is also conceived, in which the tunnels are also constructed among the groups, and the packets are relayed thereamong in a cascaded manner. However, there occur new problems that additional apparatus/equipment is required because the ports of the tunnels are constructed also among the groups and that interference with a tunnel in one group fatally affect other groups because hierarchical structures are formed among the groups. Furthermore, it is also conceived that packets directly sent from the server and packets sent from the other groups in the cascaded manner are overlapped with each other. Therefore, a disadvantage occurs in reproducing the digital contents, and it becomes necessary to eliminate the overlap of the packets in a software manner. As described above, the background arts have not made it possible to fully cope with the conventional problems in reproduction quality and in terms of software and cost.

SUMMARY OF THE INVENTION

The present invention was made in consideration of the above-described disadvantages. The present invention provides the digital contents in realtime from the server to a plurality of information processing apparatuses without depending on the number of groups. When providing the digital contents, the server divides the digital contents into packets and transmits the divided packets through the first network to at least one client belonging to the second network. The transmitted packets are defined as a minimum unit required for reconstructing the digital contents. Note that, in the present invention, the packets of the minimum unit mean the minimum packets capable of reconstructing original digital contents without the overlap of the packets. In the present invention, the packets of the minimum unit are referred to as "source packets" hereinafter. The client having received the source packets transmit, through the second network, a copy of the received source packets to clients connected to the second network. The client having transmitted the copy packets receives a copy of the source packets received by other clients.

The digital contents divided into the plurality of packets and transmitted during a predetermined period are merged in the client to be reconstructed, and then provided in realtime to a user in the client. A mode for providing the contents in the present invention may include any modes known heretofore, such as display of motion picture image data, reproduction of audio data, display of image data constructing multimedia data and reproduction of audio data in synchronization therewith. The mode in the present invention will be defined below as display or reproduction including the above-described providing modes while allowing the reconstructed digital contents to be provided, the client receives subsequent packets, and completes reconstruction of a subsequent stream while allowing the already reconstructed digital contents to be provided, thus enabling the digital contents to be provided continuously.

By repeating the above-described processing, the present invention keeps on distributing the digital contents stably while avoiding the overlap of the transmitted packets, thus making it possible to flexibly cope with frequent departure and new join of the clients constructing the network. Moreover, the present invention realizes a stable system, which does not allow great environmental variations in the clients, such as, for example, a change in allocation status of the CPU, not to affect the efficiency of the digital contents distribution. Moreover, the present invention does not use the routers, switching hubs and auxiliary servers, which are constructed especially. Thus, the present invention further enables the digital contents distribution without obliging network users to do work such as maintenance without increasing the cost of the network system unnecessarily.

Furthermore, the present invention provides pseudo tunneling distribution for performing efficient distribution from the server to the predetermined wide area group no matter whether the tunnel for performing the distribution exists. The pseudo tunnel distribution in the present invention means a distribution system and a distribution method, which enable the same digital contents to be provided smoothly to the clients in the wide area group without causing a serious time lag just by distributing the minimum source packets required for reconstructing the digital contents from the server to the wide area group without any overlap. In the pseudo tunnel distribution in the present invention, the server distributes the packets to the clients belonging to the plurality of groups without any overlap. In the present invention, the plurality of clients construct groups, and the plurality of groups construct the wide area group. Moreover, the server is constructed to be capable of transmitting the packets to the entire wide area group, and selects clients to which the packets are to be transmitted from the wide area group for each time when the server transmits the packets. At least one client receives the source packets constructing the digital contents from the server. The server and the clients hold a client list of the clients constructing the wide area group. The client having received the source packets refers to source packet distribution data or a list of preallocated copy destinations, which is received together with the source packets. Then, the client distributes the copy of the source packets to other clients. By executing the above-described processing, all of the clients reconstruct the digital contents just enough.

Furthermore, in the present invention, the LAN in the group is effectively used in order to make efficient use of network characteristics of the clients belonging to the wide area group. Each group is constructed by, for example, connecting the clients belonging to the group to one switching hub, thus enabling the communication using the function of the switch without affecting one another. Moreover, in the present invention, the third network corresponding to the multicast is constructed between an application computer and the plurality of clients connected under one router. Thus, the digital contents are shared in the group, and it is made possible to reduce the overheads of the clients and hardware resources.

Specifically, the present invention provides a digital contents distribution system for distributing digital contents through first and second networks, the system comprising:
  a server connected to the first network and for holding therein and transmitting digital contents; and
  clients constructing the second network connected to the first network and for receiving and providing the digital contents,
  wherein the server comprises means for dividing the held digital contents into a plurality of packets and for transmitting packets of a minimum unit for constructing the digital contents to the second network, and
  wherein each of the clients constructing the second network comprises means for making all of the clients connected to the second network hold therein the digital contents by use of the packets of the minimum unit, the packets having been received by the clients from the server, and use of packets received from other clients constructing the second network.

In the present invention, the server can comprise means for dynamically allocating the packets of the minimum unit to a plurality of the clients of the second network. In the present invention, the means for allocating the packets of the minimum unit to the plurality of clients of the second network can comprise:
  means for determining overheads of the clients; and
  means for dynamically selecting at least one of the clients as an intermediate node in association with the overheads and for allocating the packets to the intermediate node. In the present invention, the means for determining overheads of the clients can comprise means for determining a time difference between a time when the server transmits the packets of the minimum unit to a predetermined client and a time when the predetermined client issues a receipt notice of the packets of the minimum unit.

The present invention provides a digital contents distribution method for distributing digital contents to clients through first and second networks, in which a system comprises a server connected to the first network and for transmitting the digital contents, and clients constructing the second network connected to the first network and for receiving and providing the digital contents, the method comprising the steps of:
  dividing the digital contents into a plurality of packets and of transmitting packets of a minimum unit for constructing the digital contents from the server to the clients;
  receiving the packets of the minimum unit from the server by the clients constructing the second network;

receiving packets for reconstructing the digital contents from other clients constructing the second network; and making all of the clients connected to the second network hold therein the digital contents by use of the packets of the minimum unit, the packets having been transmitted from the server, and use of the packets received from the other clients.

The present invention provides a program for executing a server process for executing a method for distributing digital contents to a destination through first and second networks, in which a system comprises a server connected to the first network and for transmitting the digital contents, and clients constructing the second network connected to the first network and having destinations designated for receiving and providing the digital contents, the program making the system execute the steps of:

dividing the digital contents into a plurality of packets;

dynamically allocating packets of a minimum unit from the server to a plurality of the destinations of the second network; and transmitting the packets of the minimum unit for constructing the digital contents from the server through the first network to the second network, wherein the step of allocating packets of a minimum unit comprises the steps of:

receiving receipt notices from the destinations;

making the server hold the receipt notices therein;

selecting a destination serving as an intermediate node in association with the held receipt notices by use thereof; and allocating the packets of the minimum unit to the destination selected as the intermediate node.

The present invention provides a computer readable recording medium recording therein a program for executing a server process for executing a method for distributing digital contents to a destination through first and second networks, in which a system comprises a server connected to the first network and for transmitting the digital contents, and clients constructing the second network connected to the first network and having destinations designated for receiving and providing the digital contents, wherein the program makes the system execute the steps of:

dividing the digital contents into a plurality of packets;

dynamically allocating packets of a minimum unit from the server to a plurality of the destinations of the second network; and transmitting the packets of the minimum unit for constructing the digital contents from the server through the first network to the second network, and wherein the step of allocating packets of a minimum unit comprises the steps of:

receiving receipt notices from the destinations;

making the server hold the receipt notices therein;

selecting a destination serving as an intermediate node in association with the held receipt notices by use thereof; and allocating the packets of the minimum unit to the destination selected as the node.

The present invention provides a program for executing a client process for executing a method for distributing digital contents to clients through first and second networks, in which a system comprises a server connected to the first network and for transmitting the digital contents, and the clients constructing the second network connected to the first network and for receiving and providing the digital contents, the program making the clients execute the steps of:

receiving packets of a minimum unit constructing digital contents divided into a plurality of packets through the first network;

receiving packets for reconstructing the digital contents from other clients constructing the second network; and making the clients included in the second network hold therein the digital contents by use of the packets of the minimum unit, the packets having been received through the first network, and use of the packets received from the other clients.

The present invention provides a computer readable recording medium recording therein a program for executing a client process for executing a method for distributing digital contents to clients through first and second networks, in which a system comprises a server connected to the first network and for transmitting the digital contents, and the clients constructing the second network connected to the first network and for receiving and providing the digital contents, wherein the program makes the clients execute the steps of:

receiving packets of a minimum unit constructing digital contents divided into a plurality of packets through the first network;

receiving packets for reconstructing the digital contents from other clients constructing the second network; and making the clients included in the second network hold therein the digital contents by use of the packets of the minimum unit, the packets having been received through the first network, and use of the packets received from the other clients.

The present invention provides a digital contents distribution server connected to a first network and for providing digital contents to a second network connected to the first network, the server comprising:

means for dividing the digital contents into a plurality of packets;

means for storing a list including destinations included in the second network;

means for transmitting packets of a minimum unit for constructing the digital contents from the server through the first network to the second network;

dynamic allocation means for dynamically allocating, by use of the list, the destinations to the second network to which the packets of the minimum unit are transmitted;

means for receiving receipt notices from the destinations;

means for selecting a destination serving as an intermediate node by use of the receipt notices;

means for transmitting the packets of the minimum unit by use of the destination selected as the intermediate node.

The present invention provides a client for receiving digital contents distributed through a first network and constructing a second network connected to the first network, the client comprising:

means for receiving, through the first network, packets of a minimum unit constructing digital contents divided into a plurality of packets;

means for receiving packets for reconstructing the digital contents through the second network; and means for making clients included in the second network hold the digital contents therein by use of the packets of the minimum unit received through the first network and packets received from other clients through the second network.

The present invention provides a digital contents distribution system for distributing digital contents to a predetermined wide area group through first and second networks, the system comprising:

a server connected to the first network and for holding therein and transmitting the digital contents; and a plurality of groups constructed by including clients constructing the second network connected to the first network and for constructing the wide area group for receiving and providing the digital contents, wherein the server comprises means for dividing the held digital contents into a plurality of packets and transmitting packets of a minimum unit for constructing the digital contents to the clients in the group without overlap, and wherein each of the clients having received the packets of the minimum unit comprises means for distributing copies of the packets of the minimum unit received from the server to all of the clients constructing a sub wide area group including the each client and another client constructing another group.

The present invention provides a server connected to a first network and for holding therein and distributing digital contents through the first network to a wide area group including a plurality of groups connected through a second network, the server comprising:

means for creating packets of a minimum unit by dividing the held digital contents into a plurality of packets;

means for selecting distribution destinations of the packets of the minimum unit in such a manner that identical packets of the minimum unit are not overlapped for a predetermined group; and means for transmitting the packets of the minimum unit for constructing the digital contents to clients of the selected destinations in the group.

The present invention provides a method for controlling a computer as a server for holding therein and distributing digital contents through a first network to a wide area group including a plurality of groups connected through a second network, the method making the computer execute the steps of:

creating packets of a minimum unit by dividing the held digital contents into a plurality of packets;

selecting and registering therewith distribution destinations of the packets of the minimum unit in such a manner that identical packets of the minimum unit are not overlapped for a predetermined group;

storing data of the selected distribution destinations as the packets of the minimum unit; and reading and transmitting, for constructing the digital contents, the stored packets of the minimum unit to clients of the selected distribution destinations in the group.

The present invention provides a program for controlling a computer as a server for holding therein and distributing digital contents through a first network to a wide area group including a plurality of groups connected through a second network, the program making the computer execute the steps of:

creating packets of a minimum unit by dividing the held digital contents into a plurality of packets;

selecting and registering therewith distribution destinations of the packets of the minimum unit in such a manner that identical packets of the minimum unit are not overlapped for a predetermined group;

storing data of the selected distribution destinations as the packets of the minimum unit; and reading and transmitting, for constructing the digital contents, the stored packets of the minimum unit to clients of the selected distribution destinations in the group.

The present invention provides a computer readable recording medium recording therein a program for controlling a computer as a server for holding therein and distributing digital contents through a first network to a wide area group including a plurality of groups connected through a second network, wherein the program makes the computer execute the steps of:

creating packets of a minimum unit by dividing the held digital contents into a plurality of packets;

selecting and registering therewith distribution destinations of the packets of the minimum unit in such a manner that identical packets of the minimum unit are not overlapped for a predetermined group;

storing data of the selected distribution destinations as the packets of the minimum unit; and reading and transmitting, for constructing the digital contents, the stored packets of the minimum unit to clients of the selected distribution destinations in the group.

The present invention provides a client connected to a second network for distributing digital contents through a first network and the second network to a predetermined wide area group and constructing a group of the wide area group, the client comprising:

means for receiving packets through any of the first and second networks and for judging whether or not the received packets are packets of a minimum unit for reconstructing the digital contents; and means for creating a copy packet from the received packets in response to the judgment and for distributing the copy packet at least to a client of another group.

The present invention provides a method for controlling a computer as a client connected to a second network for distributing digital contents through a first network and the second network to a predetermined wide area group and constructing a group of the wide area group, the method making the computer execute the steps of:

receiving packets through any of the first and second networks and storing the received packets in a memory;

judging whether or not the received packets are packets of a minimum unit for reconstructing the digital contents;

when the received packets are judged to be the packets of the minimum unit, creating a copy packet from the received packets in response to the judgment and distributing the copy packet at least to a client of another group; and when the received packets are judged not to be the packets of the minimum unit, storing the received packets in the memory.

The present invention provides a program for controlling a computer as a client connected to a second network for distributing digital contents through a first network and the second network to a predetermined wide area group and constructing a group of the wide area group, the program making the computer execute the steps of:

receiving packets through any of the first and second networks and storing the received packets in a memory;

judging whether or not the received packets are packets of a minimum unit for reconstructing the digital contents;

when the received packets are judged to be the packets of the minimum unit, creating a copy packet from the received packets in response to the judgment and distributing the copy packet at least to a client of another group; and when the received packets are judged not to be the packets of the minimum unit, storing the received packets in the memory.

The present invention provides a computer readable recording medium recording therein a program for controlling a computer as a client connected to a second network for distributing digital contents through a first network and the second network to a predetermined wide area group and constructing a group of the wide area group, wherein the program makes the computer execute the steps of:

receiving packets through any of the first and second networks and storing the received packets in a memory;

judging whether or not the received packets are packets of a minimum unit for reconstructing the digital contents;

when the received packets are judged to be the packets of the minimum unit, creating a copy packet from the received packets in response to the judgment and for distributing the copy packet at least to a client of another group; and when the received packets are judged not to be the packets of the minimum unit, storing the received packets in the memory.

The present invention provides an on-network digital contents sharing method for sharing predetermined digital contents in clients connected through a plurality of networks, in which the predetermined digital contents are converted into a plurality of continuous stream data, and packets of a minimum unit necessary to reconstruct the predetermined digital contents are transmitted from a server through the networks, the method comprising the steps of:

selecting the clients requiring distribution of the predetermined digital contents by reading a client list;

transmitting the packets of the minimum unit to the selected clients;

making the clients having received the packets of the minimum unit store the packets of the minimum unit in memories thereof, create copy packets and distribute the copy packets to other clients except for the clients having received the packets;

storing the copy packets received from the other clients in the memories; and making users share the predetermined distributed digital contents by reconstructing the packets in the memories.

BRIEF DESCRIPTION OF THE DRAWINGS

For a more complete understanding of the present invention and the advantages thereof, reference is now made to the following description taken in conjunction with the accompanying drawings.

FIG. 12 is a table showing an embodiment of a client list used by the server in the present invention.

DETAILED DESCRIPTION OF THE PREFERRED EMBODIMENTS

Although the present invention will be described below based on concrete embodiments, the embodiments to be described below do not limit the present invention.

A: Digital Contents Distribution System

Figure 1:
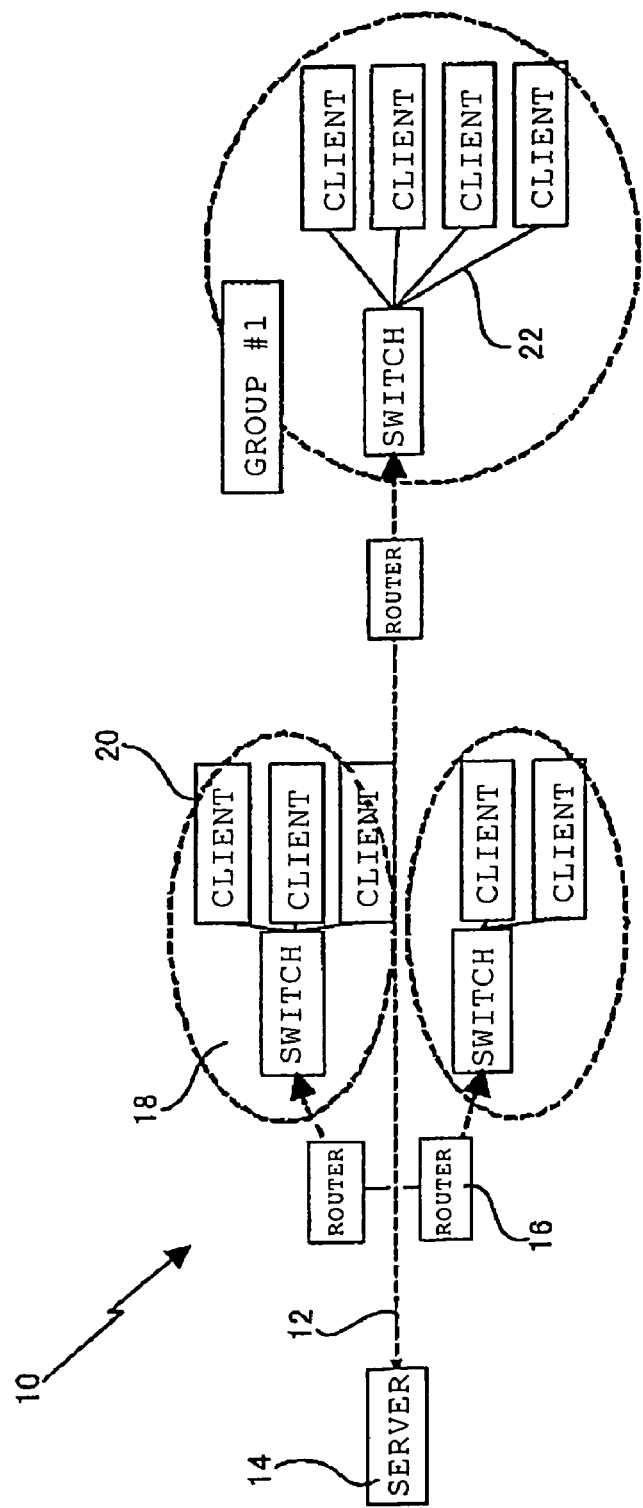
FIG. 1 is a schematic diagram illustrating a digital contents distribution system of the present invention.

FIG. 1 is a schematic diagram illustrating the digital contents distribution system 10 of the present invention. The digital contents distribution system 10 of the present invention is constructed by including the server 14 connected to the network 12 and the plurality of clients 20 connected individually to the network 12 through network devices such as the routers 16 and the switching hubs 18. As the network 12 illustrated in FIG. 1, a network such as the Internet, WAN and LAN can be given. As a communication medium for constructing the network, a public telephone line, ISDN, ADSL, optical communication, ground wave wireless communication, satellite communication and the like can be used. In accordance with the present invention, the server 14 distributes digital contents to the clients 20 through the networks 12 and 22. As the digital contents distributed in the present invention, moving picture image data in conformity with MPEG2, MPEG4, a higher-order standard, or the like can be cited, which is included in contents necessary to be provided to the plurality of clients simultaneously with realtime characteristics. Moreover, as the digital contents in the present invention, it is also possible to use multimedia data constructed by including plural types of digital data such as moving picture image data, audio data and text data, besides the moving picture image data.

Moreover, the clients 20 are connected to the network 12 through the routers 16 and the switching hubs 18 and the like, and are identified as a predetermined group #1 and the like by the server 14 by means of identifiers, for example, such as IP addresses allocated for each router 16. Moreover, the clients in the predetermined group construct the network 22 set by peer to peer connection in the preferred embodiment of the present invention. Thus, mutual communications among the clients in the group are enabled.

It is possible to construct the server 14 usable in the present invention of a personal computer or a workstation. As such a personal computer or a workstation, there can be cited a personal computer or a workstation, which is capable of mounting thereon a CPU such as PENTIUM (registered trademark) or a CPU compatible therewith, and capable of operating an operating system such as WINDOWS (registered trademark), WINDOWS (registered trademark) NT (Microsoft Corporation), OS/2 (trademark: International Business Machines Corporation), AIX (trademark: International Business Machines Corporation), UNIX and LINUX. However, the server 14 is not limited to these.

Moreover, as the clients 20 usable in the present invention, the personal computers or workstations that can be applied to the above-described server 14 can be given. Moreover, the clients 20 can be constructed by including a notebook personal computer, a PDA and the like, which are connected through a wireless network, if such a computer and a PDA have processing speeds sufficient to be applied with the present invention.

The digital contents distribution system 10 of the present invention, which is illustrated in FIG. 1, is constructed in such a manner that moving picture image data is decomposed into a plurality of streams, one stream is further divided into a plurality of packets, and each packet is transmitted as a source packet from the server 14 to a predetermined client 20. In the present invention, the source packet constructing the stream is transmitted to at least one client included in a given group. The client having received the source packet transmits copies of the received packet (hereinafter, referred to as "copy packets") to other clients included in the given group. The downstream clients having received the copy packets accumulate the copy packets during a predetermined period, and after the elapse of the predetermined period, reconstruct the stream by use of packet identifiers added as serial numbers to the packets, for example. Then the digital contents are displayed or reproduced in the clients. Specifically, in the present invention, the server 14 enables the same digital contents to be provided to the clients belonging to the predetermined group without transmitting packets, which are overlapped in one group, to the clients.

B: Digital Contents Distribution Method

The method for executing the digital contents distribution of the present invention will be further described below in detail.

Figure 2:
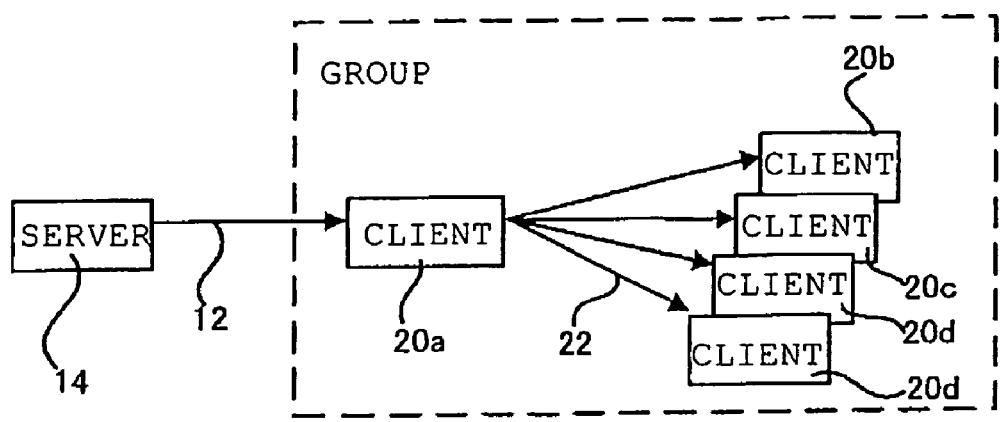
FIG. 2 is schematic diagrams of path tree structures constructed in the present invention.
Figure 2:
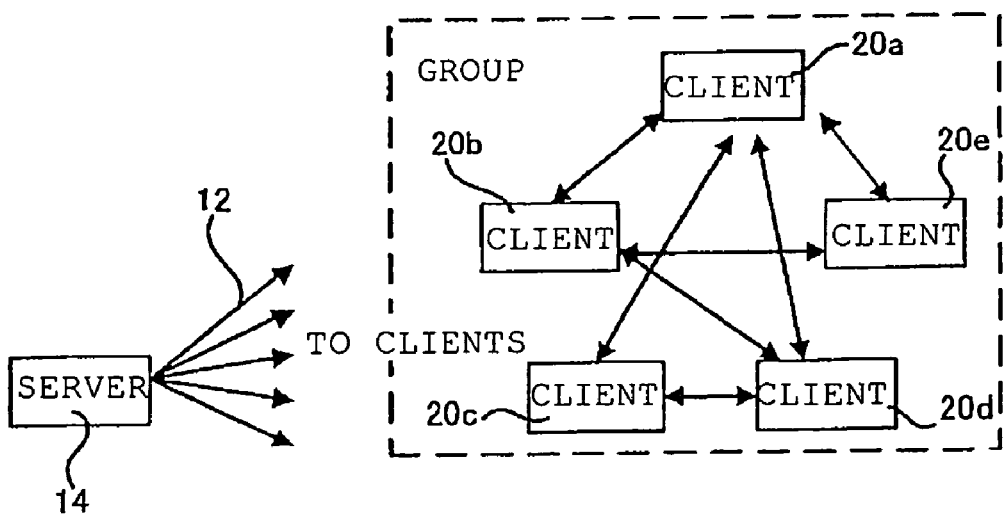

<B-1> Dynamic Routing Based on Temporal Selection in Packet Unit of Static Path Tree Structure As described above, in the present invention, for example, for m pieces of clients included in one group, a path tree structure is constructed, in which the server 14 is set as a root, and one client 20a is designated as an intermediate node by the server 14. FIG. 2(a) schematically illustrates a path tree structure constructed in the present invention. As illustrated in FIG. 2(a), the tree structure of 1:1:(m−1) in the constructed tree structure constructs one transmission path of the packets. For the sake of description convenience, in this specification, it is assumed that the paths are formed to have a two-stage structure, which includes a first-stage path between the server and the intermediate node, and second-stage paths between the intermediate node and the clients, and that there is no relay exceeding such two stages.

As illustrated in FIG. 2(a), the server 14 selects the one client 20a in the group as the intermediate node, and first transmits the source packet to the client 20a selected as the intermediate node. The client 20a that has received the source packet and functions as the intermediate node transmits the received packet to the clients 20b to 20e included in the group, thus making it possible to share the packet in the group. Moreover, in the present invention, the client 20a set as the intermediate node is not limited to one as illustrated in FIG. 2(a). The server 14 monitors effective throughputs of the respective clients through the network 12 in conformity with connection-oriented protocol such as TCP/IP, and thus the client 20 can be dynamically selected from one or more clients. The selection of the intermediate node in the present invention will be described later in detail.

If all of the paths (in tree structure) from the server 14 to the respective clients 20a to 20e, which are illustrated in FIG. 2(a), are superposed on one another, then it is possible to describe a complete graph having lines connected from the server 14 to the respective clients 20a to 20e and further connected interactively between each two clients in a predetermined group. FIG. 2(b) illustrates an embodiment of a complete graph formed between the server 14 and the respective clients 20a to 20e in the specific embodiment illustrated in FIG. 2(a). As illustrated in FIG. 2(b), it can be conceived that path selection per packet unit is selection of a partial tree structure (in path tree structure) from the complete graph. According to the present invention, it is possible to flexibly select the paths in accordance with the throughputs of the clients. Accordingly, in the path tree structure, each client will be dynamically moved to an upstream or downstream of the other clients.

The present invention will be described with reference to the complete graph in the specific embodiment of the present invention, which is illustrated in FIG. 2(b). First, source packets for one stream are transmitted from the server 14 to the group including the clients 20a to 20e without overlapped packets. The respective clients 20a to 20e receive the source packets constructing a part of the stream without any overlap. Thereafter, the clients belonging to the same group mutually copy short packets as the copy packets, and thus compensate the short amount of the packets for reconstructing one stream to recover the one stream. In the present invention, the above-described function of the clients is referred to as peer-to-Group type distribution. Note that the serial numbers are previously added as the packet identifiers to the respective packets in accordance with streaming protocol. Thus, a structure is adopted, in which a packet order in the short packets and stream can be recovered in each client. As a method for the above, any method known heretofore can be used. Concretely, for example, a method disclosed by Schulzrinne, et al. can be adopted (H. Schulzrinne, S. Casner, R. Frederick, and V. Jacobson. RFC 1889: RTP: A Transport Protocol for real-time applications, January 1996.).

Figure 3:
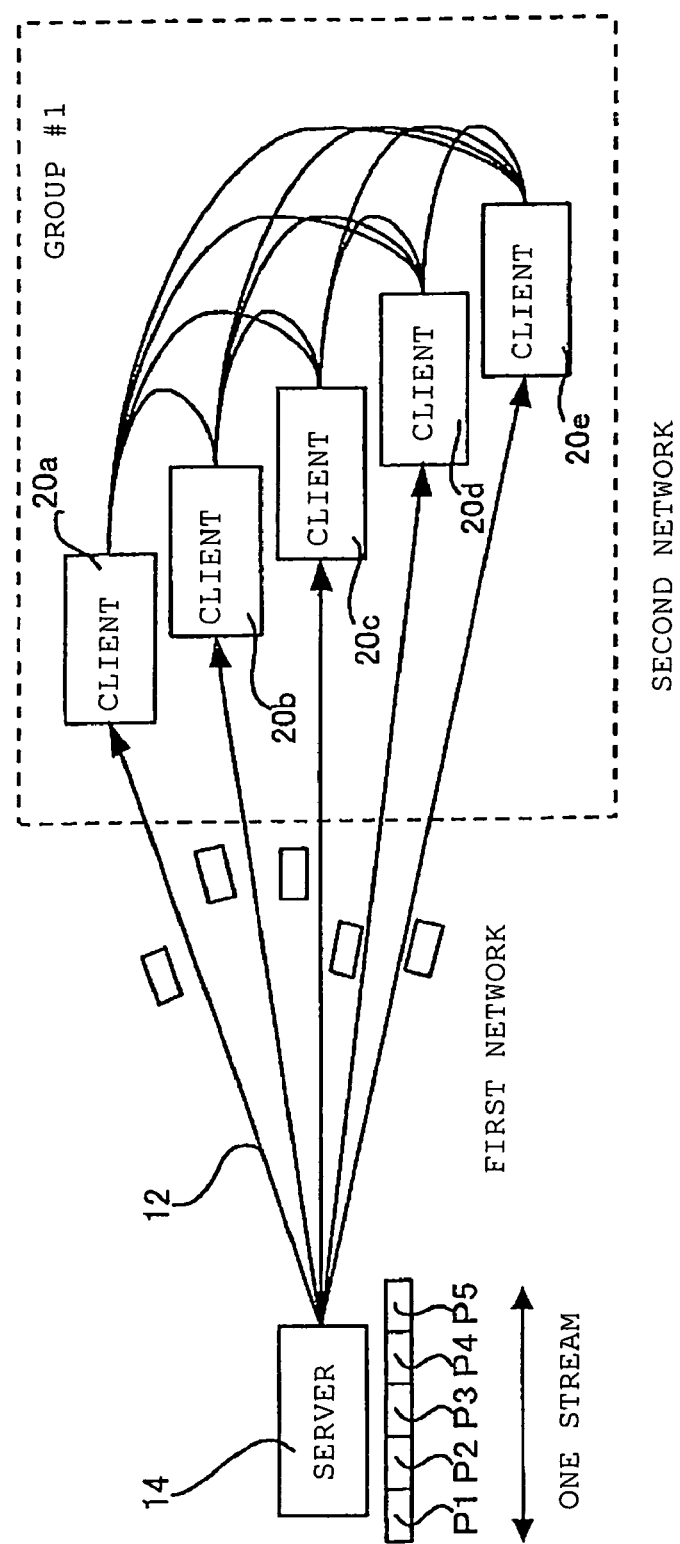
FIG. 3 is a diagram schematically illustrating processing of source packet transmission from a server and copy packet transmission of clients.

FIG. 3 schematically illustrates the above-described transmission processing of the source packets from the server 14 and of the copy packets among the clients in the group #1. As illustrated in FIG. 3, the moving picture image data acquired in the server 14 is streamed and divided into the plurality of packets. For example, the packet identifiers P1 to P5 are added to the respective source packets. In the present invention, no particular limitations are imposed on the size of the source packets illustrated in FIG. 3, and the source packets may be made into any size. A stream 24 divided into the source packets P1 to P5 is transmitted to the group #1 through the first network such as, for example, the Internet, or LAN and WAN which are belonging to different domains.

In the specific embodiment illustrated in FIG. 3, the respective clients 20a to 20e are defined to have throughputs approximately equal to one another as will be described later. The embodiment is illustrated, in which the clients 20a to 20e are selected as the intermediate nodes individually, and the source packets P1 to P5 are transmitted to the clients 20a to 20e, respectively.

Here, the function of the client 20a having received the packet P1 will be described in detail. Member lists, each corresponding to the clients belonging to the group #1, are included in the clients 20a to 20e. The copy packets are transmitted to the other clients 20b to 20e by executing, for example, broadcast communication, with reference to the member lists in accordance with any known protocol, for example, communication protocol such as TCP/IP, UDP and a promise cast mode, in the group. Moreover, in the present invention, in the event of transmitting the copy packets, the copy packets can also be transmitted to the attentions of the respective IP addresses of the other clients more securely immediately after the arrival of the source packets or at a fixed time interval. The transmission method usable in the present invention can be appropriately selected in consideration of the number of clients constructing the predetermined group, cost, reliability and the like. The other clients 20b to 20e receive the copy packets from the client 20a and accumulate the copy packets in receiving buffers. Besides the client 20a, the other clients 20b to 20e also execute the similar transmission of the copy packets. The respective clients accumulate the copy packets in the receiving buffers for a predetermined period for which processing for the subsequent stream can be guaranteed not to be affected, for example, for about one second or less.

In an embodiment in which addresses in the receiving buffer of the client 20a are designated so as to correspond to the packet identifiers, after the elapse of the predetermined period, the source packets for one stream are accumulated therein in order of "P1P2P3P4P5," for example. It is made possible for the client 20a to reconstruct the packets and copy packets accumulated for the predetermined period as moving picture image data for one stream, that is, "P1P2P3P4P5" by use of an FEC decoder a source decoder, and the like. Moreover, as long as no particular disadvantage occurs, it is also possible to record the packets not necessarily in accordance with the serial number but in a receiving order, and then to sort the packets and reconstruct the image data.

Figure 4:
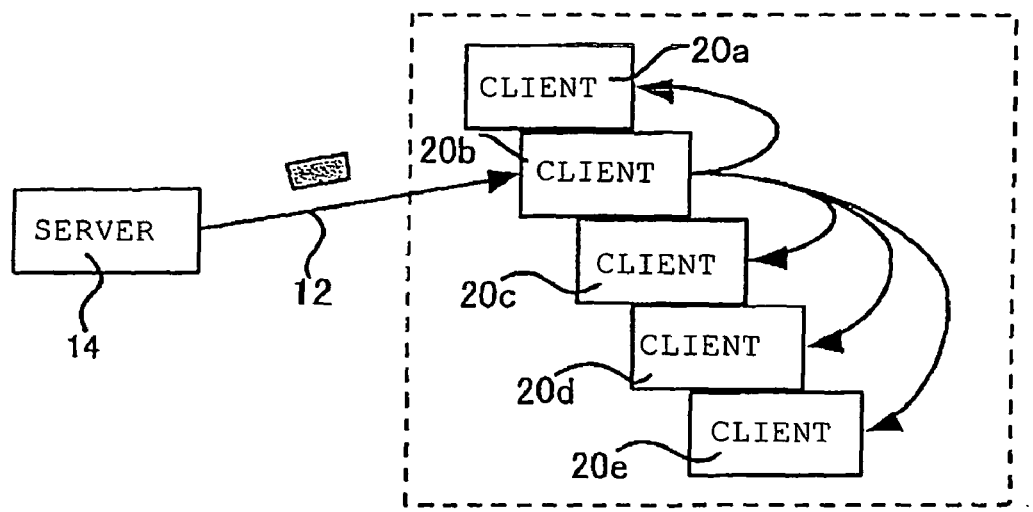
FIG. 4 is diagrams illustrating embodiments of cases of dynamically selecting clients serving as intermediate nodes in the present invention.
Figure 4:
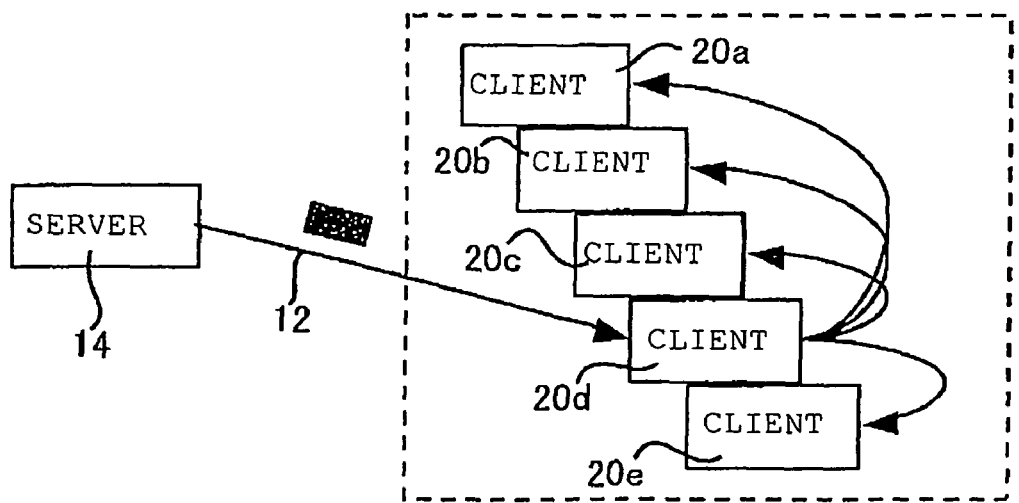

FIG. 4 is a diagram illustrating an embodiment of the present invention in the case where a client serving as the intermediate node is dynamically selected. In the present invention, the server 14 and the clients 20 construct a network by use of connection-oriented protocol such as TCP. As illustrated in FIG. 4(a), though described in more detail later, the server 14 monitors the throughputs of the respective clients and selects a client probabilistically in accordance with the throughputs. The client having the maximum throughput is not always selected. Then, the selected client 20b is set as the first intermediate node, to which the first source packet P1 is then transmitted. Moreover, the server 14 monitors throughput changes of the clients continuously at an interval of, for example, around several seconds or less, and dynamically selects the intermediate node from clients having small overheads at each point of time. For example, the embodiment shown in FIG. 4(b) illustrates that the client 20d has the minimum overhead at that point of time, and therefore, that the client 20d is selected as the intermediate node by the server 14, and receives a source packet, for example, the source packet P3.

With the above-described construction being adopted, according to the present invention, it is made possible to allow all of the clients in the group #1 to hold the digital contents just by transmitting the source packets for one stream without transmitting the packets overlapped for the clients constructing the group #1 by the server 14. Specifically, the present invention enables a load concentrated heretofore on the server 14 in the event of transmitting the packets to the clients included in the group #1 to be dispersed to the entire network. Thus, the present invention enables the efficiency of the network including the server 14 to be improved. Simultaneously, the present invention enables traffic scalability in the network to be improved.

<B-2> Network Scalability

Figure 5:
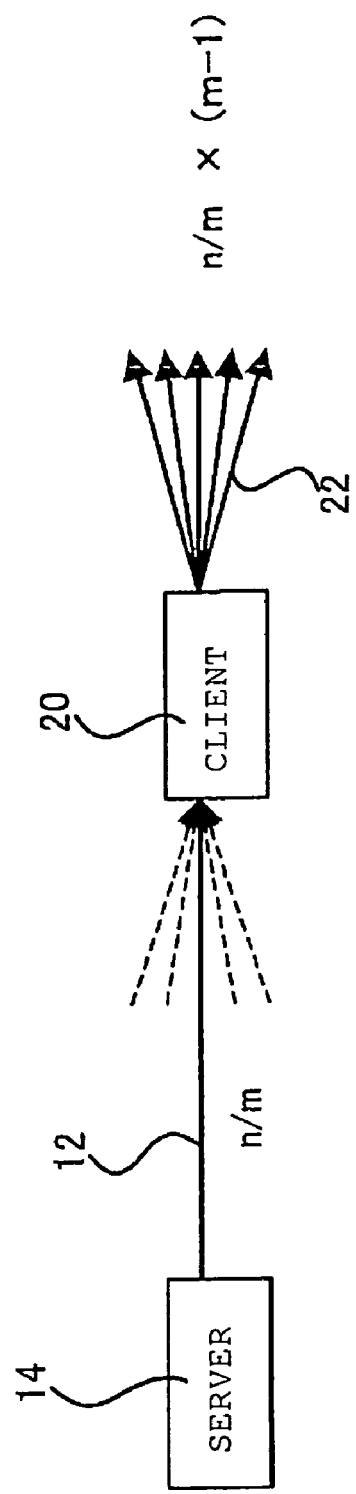
FIG. 5 is a diagram illustrating traffics of packets transmitted/received to/from the clients according to the present invention.

A communication traffic volume between the server 14 and the clients 20 in the construction of the present invention will be examined below. FIG. 5 illustrates traffics of the packets transmitted/received to/from the clients 20a in accordance with the present invention. It is assumed that n packets are transmitted from the server 14 to the respective clients uniformly for a unit time. n/m source packets are sent out from the server 14 to the client 20a, and the client 20a receives the source packets sent out from the server 14. The client having received the packets relays the received packets to m−1 clients (distribution of copy packets). Simultaneously, the client 20a receives the copy packets from the other clients. From a viewpoint of the network, these copy packets are identical to the packets sent out from the other clients. Therefore, communication of $(n/m + n/m \times (m-1) = n)$ packets is generated for a unit time per client. In this communication traffic volume, the number of packets is not changed as compared with the case of the conventional example of using the construction of the conventional edge server. The above-described packet transmission volume is established even in the case where the clients are not selected uniformly.

Next, in terms of number, packets required to be subjected to input/output processing per unit time by the respective clients are n packets in total for the input processing, which is obtained by adding together n/m packets from the server 14 and {n/m×(m−1)} packets from the other clients, and {n/m×(m−1)} packets for the output processing, which is obtained when n/m source packets are relayed to the clients, in the uniform selection. Therefore, the number of packets subjected to be the input/output processing is given by {n×(2m−1)/m} [packets]. Hence, the packets are n packets at the minimum (m=1), and do not exceed 2n packets at the maximum (m→∞A). Specifically, even if the number of clients is increased, the load on each client just gets closer to the load for the 2n packets gradually, and does not exceed the same, thus causing no overflow problem of the load in each client. Meanwhile, the server 14 must do work of selecting one client for each packet from the m pieces of clients. The number of this client selection processing is proportional to the number m of the clients, and the number of packet transmissions never depends on the number of clients. Hence, ever if the number of clients is increased, no disadvantage occurs in the digital contents distribution of the present invention with regard to the network scalability.

Subsequently, the case opposite to the uniform selection is also assumed in the present invention. Specifically, the case is also assumed, where only one client receives all of the source packets from the server 14. Also in this case, the number of input packets to the clients is not changed from the conventional case because the input packets are for a stream, and n source packets are inputted to the selected client. Moreover, the output of the copy packets from the client having received the source packets is summed up to n×m packets only in that client. In this case, though the load is increased only in the selected client, no serious problem occurs in the digital contents distribution from the server 14 to the group since only the broadcast traffic in the group is increased. Furthermore, in the present invention, it is preferable to dynamically select the path tree structure so that the selection in this case can be as approximate as possible to the uniform selection so as not to transmit the source packets biasedly only to the above-described single client. Simultaneously, it is also possible to perform the reconstruction for keeping the network system stable by dynamically selecting the path tree structure. The above-described dynamic selection of the path tree structure will be described later in detail. Note that, in order to prevent the local increase of the sent packets due to the ununiformity of the selection, limitations may be provided on the transmission speed of the copy packets and the time of the transmission processing, and packets exceeding the limitations may be broken.

<B-3> Dynamic Selection (Dynamic Optimizing)

In the path tree structure in the present invention, one or plural clients are not fixed and statically used but dynamically selected from the clients. In the path tree structure selection, the path tree structure transmitting the packets is dynamically constructed under the following conditions:

(a) the concerned client is ready to receive the packets;
(b) priority is given to a path selecting, as an intermediate node, a client having a small round-trip time (RTT) seen from the server, that is, a path selecting a client having a small processing overhead; and
(c) priority is given to a path having, as an intermediate node, a client of which copy rate of packets is high.

It is possible to realize validation processing for the above-described condition (a) by use of the connection-oriented protocol such as TCP. Moreover, measurement of RTT described in the condition (b) will be described by use of, for example, the format of IPv4 in the case where the server 14 sends out the source packets. For the measurement, a time may be previously recorded in an IP header portion of a source transmission packet, and a client having received the source packet may return only the IP header portion as it is to the server. Alternatively, a time may be recorded by use of and in an original header generated separately in an application level, and this original header may return as it is to the server. As described above, it is possible to use a method utilizing a difference between the time recorded in the IP header and the like and the time returned to the server 14. Moreover, a time when the server 14 transmits a source packet may be previously stored, and a response packet from a client may be received, thus making it possible to read and validate the time of the IP header of the response packet.

In the case of utilizing TCP, a time including time taken for resending processing in the concerned hierarchy, that is, a throughput is observed in association with RTT. Note that, for the measurement of RTT, an average of several observations can also be utilized for the purpose of absorbing a fluctuation of the measurement value.

Moreover, the copy rate described as the condition (c) utilizes a packet transmission success rate from an intermediate client to clients downstream thereof. In the network using connection-oriented protocol such as TCP, a cause of variation of the copy rate includes the case where the intermediate client breaks the packets due to the time limitations, and so on. When the clients are mutually connected in conformity with UDP, the copy rate is calculated from an arrival rate of the packets to the downstream clients.

Figure 6:
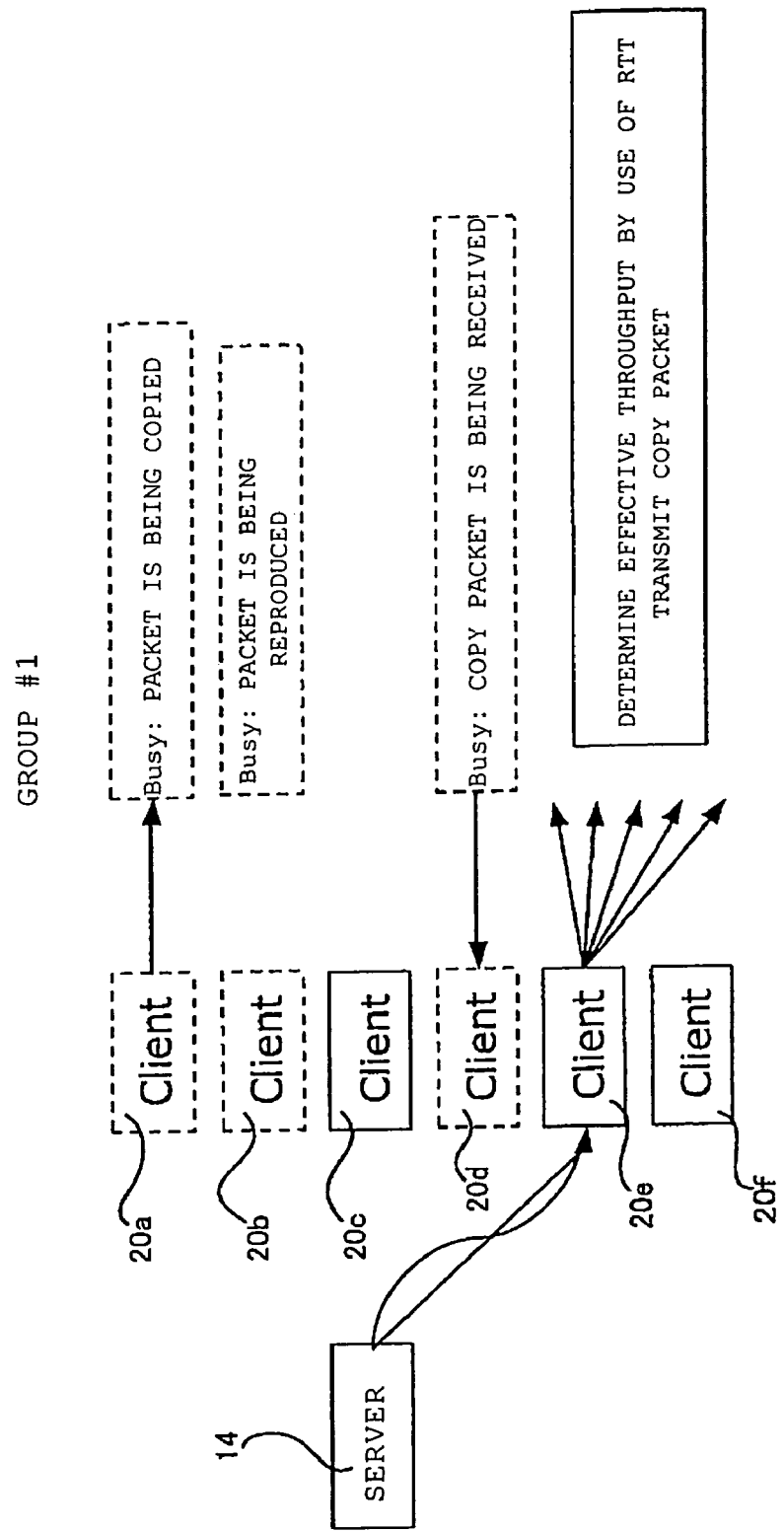
FIG. 6 is a schematic diagram of a case of dynamically selecting a client as an intermediate node in the present invention.

In the specific embodiment of the present invention, in order to satisfy the above-described conditions, clients meeting the condition (a) are selected so that the source packets can be transmitted thereto at a predetermined ratio. FIG. 6 is a schematic diagram illustrating the case of dynamically selecting a client as an intermediate node in the present invention. As illustrated in FIG. 6, the server 14 selects the client 20e as an intermediate node and transmits the source packets thereto. For example, the client 20e can be selected as a client that returns a response first at that point of time, in response to a start of the digital contents distribution from the server 14. For example, other clients than the client 20e are not selected for the reasons that these other clients execute other processing, these other clients have not responded to the server 14 for a predetermined threshold value time, and their RTTs have been slower, for example, than a set threshold value in comparison with that of the client 20e.

In the embodiment illustrated in FIG. 6, the server 14 judges the client 20e to have a sufficient processing capability and sets the client 20e as an intermediate node receiving the source packets. The client 20e having received the source packets transmits the copy packets to other clients in the group #1 by use, for example, of the broadcast communication.

In the present invention, the client having the smallest RTT is selected as the intermediate node. Furthermore, besides above, allocation weight can also be imparted among the clients in association with RTTs as will be described below. For example, in the most preferred embodiment of the present invention, adoptable allocation weight can be given based on the following relational expression.

[Equation 1]

$$\text{Allocation weight of source packet} \propto \frac{t_k r_k}{\sum_{i=1}^{m} t_k r_k} \quad \text{[Equation 1]}$$

$t_k$ : throughput $\propto 1/RTT$ $r_k$ : copy rate

In the above relational expression, $t_k r_k$ is proportional to a substantial throughput, that is, the number of packets processible by the client per unit time. Hence, in this allocation method, to maximize the effective throughputs, that is, to maximize the stability is set as a target function. Note that, in the present invention, the above-described conditions can be applied for each source packet. Moreover, in the present invention, the allocation weight of the source packets can be updated periodically at a predetermined time interval. Clients that cannot receive the packets at each point of time are excluded from candidates for the path selection. Therefore, even if there is an error in allocation weight, there does not occur a serious situation such as a loss of the source packets. Moreover, in another embodiment of the present invention, the effective through-puts can be also judged by use only of RTT.

<B-4> Dynamic Reconstruction

Furthermore, the present invention automatically copes with an increase of a new client in the case where such a new client is added to the group recognized by the server, thus making it possible to flexibly cope with a change of the network construction.

Figure 7:
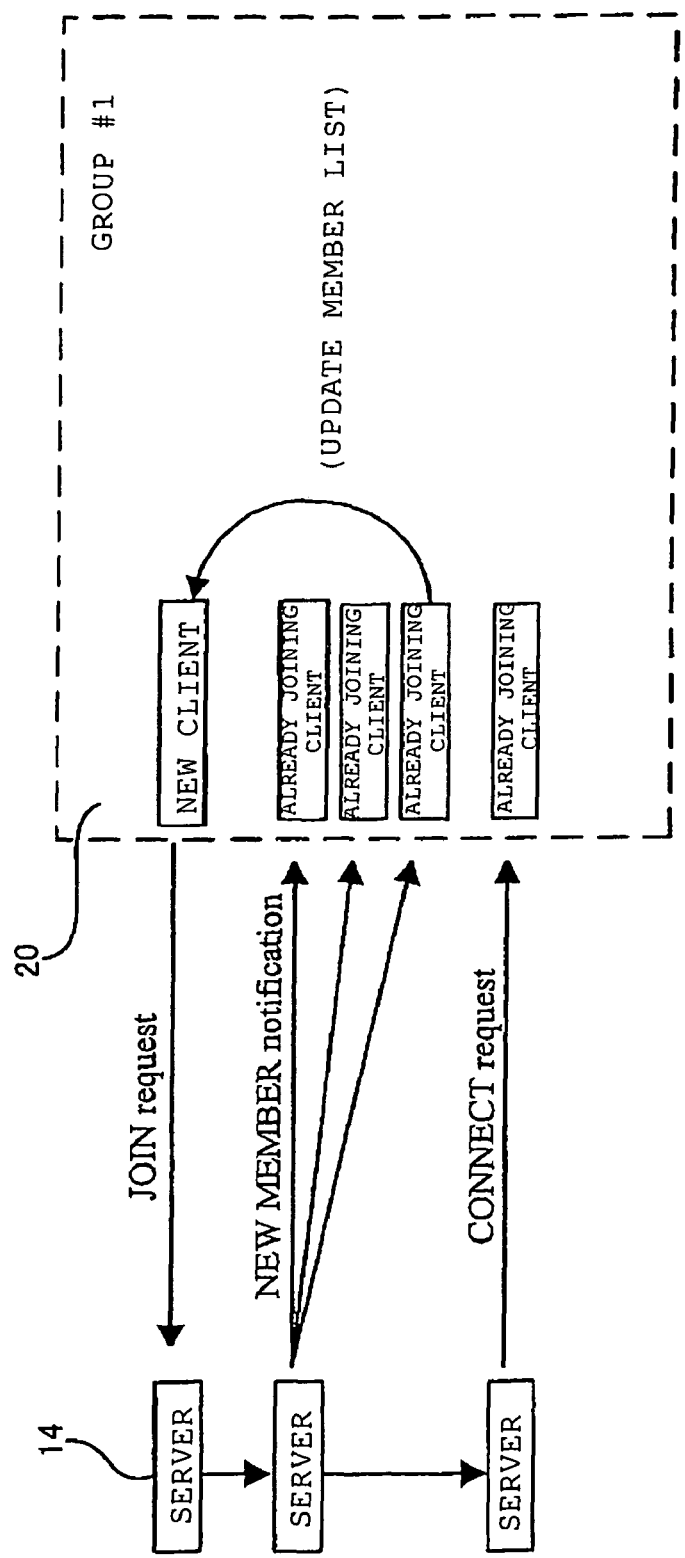
FIG. 7 is a diagram illustrating processing of servers in a case where a new client is added to a group #1 in the present invention.

FIG. 7 illustrates processing of the serve 14 when the new client is added to the group #1 in the present invention. As illustrated in FIG. 7, when the new client 20f is added into the group #1, the client 20f transmits a JOIN request to the server 14 by use, for example, of the IP address of the server 14, which is acquired from another client. The JOIN request can be made to include a client identifier such as an IP address acquired by the newly joining client 20f or allocated thereto.

Upon receiving the JOIN request, the server 14 adds the client identifier of the client 20f to the client list of the group #1 held in the server 14 and used as a destination list. In the embodiment illustrated in FIG. 7, the server 14 sends out NEW MEMBER notifications notifying the addition of the new client to the clients 20a to 20d included in the group #1 by use, for example, of the broadcast communication to the attentions of the IP addresses of the group #1. The clients 20a to 20c in the group #1, which received the NEW MEMBER notifications, update the member lists and register the new client 20f as a distribution destination of the copy packets.

Subsequently, the server 14 transmits, to the newly joining client 20f, a CONNECT request indicating that the connection thereof is completed. In the embodiment illustrated in FIG. 7, client identifiers corresponding to the client members constructing the group #1 held in the server 14 can be included in the CONNECT request. The client 20f receives the CONNECT request and updates the member list. Note that, for this operation, for example, the automatic IP address acquisition method described in Japanese Patent Application No. 2002-088702, which belongs to the same applicants, can be used. In the case where the above-described automatic IP address acquisition method disclosed in Japanese Patent Application No. 2002-088702 can be used, it may not be necessary to transmit the NEW MEMBER notifications from the server to the respective clients 20a to 20f because the member lists are already held thereby.

After the above-described processing, the server 14 becomes able to judge a path including the newly joining client 20f in the path tree structure for performing the digital contents distribution. In the specific embodiment of the present invention, a construction can be adopted, in which the client 20f is added to the lowermost stream of the prepared path tree structure immediately after the client 20f joins the group, and the client 20f acquires the copy packets from the other clients 20a to 20c. The new path tree structure including the client 20f is constructed at a path selection after the elapse of a predetermined period in monitoring the RTT.

Note that, in the present invention, the performance of the newly joining client 20f is unknown at an initial stage, and therefore, for example, as shown in the following equation, large RTT can be previously imparted as an initial value (large value) to the client 20f, and a frequency of receiving the source packets can be previously lowered. For a judgment for the above, it is possible to use balancing including a so-called forgetting factor that lowers the weight of the past actual results gradually. In the present invention, it is preferable to apply the dynamic construction method of the present invention thereafter at the point of time when the so-called "actual result" of the newly joining client becomes obvious in terms of securing the stability of the network. Thus, the effectiveness of the present invention can be further improved.

Figure 8:
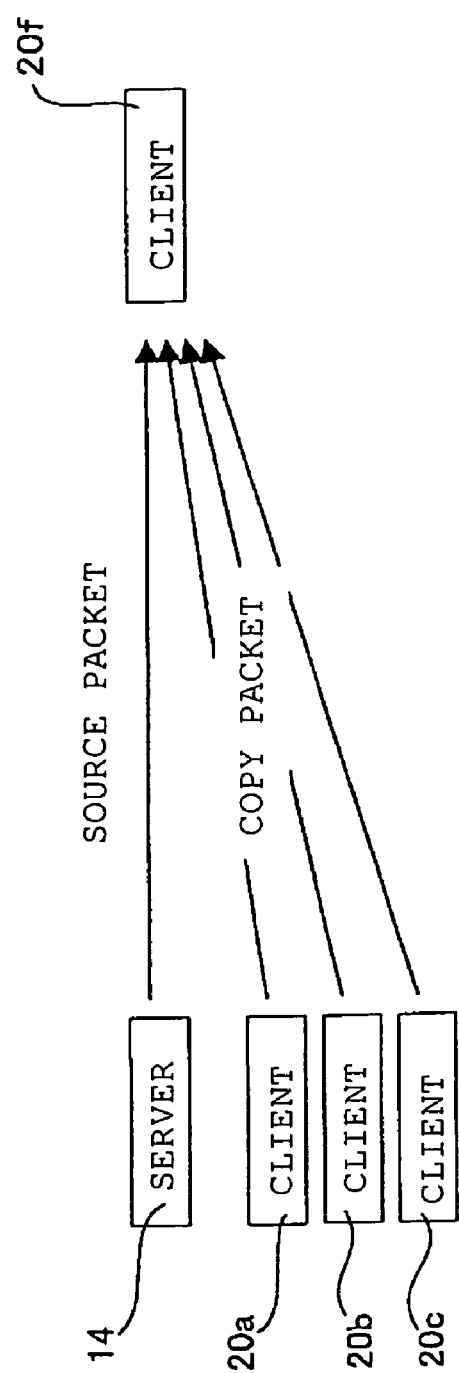
FIG. 8 is a diagram illustrating processing for the newly joining client based on a newly created path tree structure.

FIG. 8 illustrates that, based on the newly created path tree structure, the source packet is transmitted from the server 14 to the newly joining client 20f, and the copy packets are transmitted thereto from the other clients 20a to 20c.

Moreover, in the present invention, when a joining client is departed, the server 14 can get to know the departure of the client through the connection-oriented network. Note that, though departure of a client can be detected even if the client ends abnormally, an event occurs, which is a case where a network cable is detached cannot be detected until time-out of the client. In the present invention, even if the time-out occurs, the source packet is not sent to the client in accordance with a rule of dynamic selection (confirmation of receiving enable/disable). Therefore, there does not occur a disadvantage in which packets to be received by the other clients are lost all at once.

The server 14 having recognized the departure of the join client immediately breaks the path tree structure having the concerned client as an intermediate node, and prevents the loss of the source packet. The clients having remained in the group #1 can distribute the received source packet in accordance with the member lists. In the case where the remaining clients transmit the copy packets on the basis of the broadcast communication, the clients can transmit the copy packets to all of the clients in the group #1, which can receive the copy packets. Moreover, the remaining clients cancel the connections between each and the departed client, thus making it possible to delete the departed clients from the lowermost streams of all of the path tree structures.

Moreover, some of the source packets transmitted to the departed client may not sometimes be relayed but be broken at the same time of the departure. In order to prevent such a packet loss accompanied with the client departure, the server 14 can use processing in which some of chronically new packets sent to the respective clients are previously recorded, and packets sent to the departed client are resent to the other clients at the point of time when the departed client is detected.

In the present invention, with the above-described construction being adopted, the server and the clients automatically add, delete and change locally the path tree structure, and thus reconstruct the group by the join and departure of the clients. Moreover, the recently transmitted packets are recorded and resent according to needs, thus making it possible to prevent the packet loss caused by the sudden departure.

Figure 9:
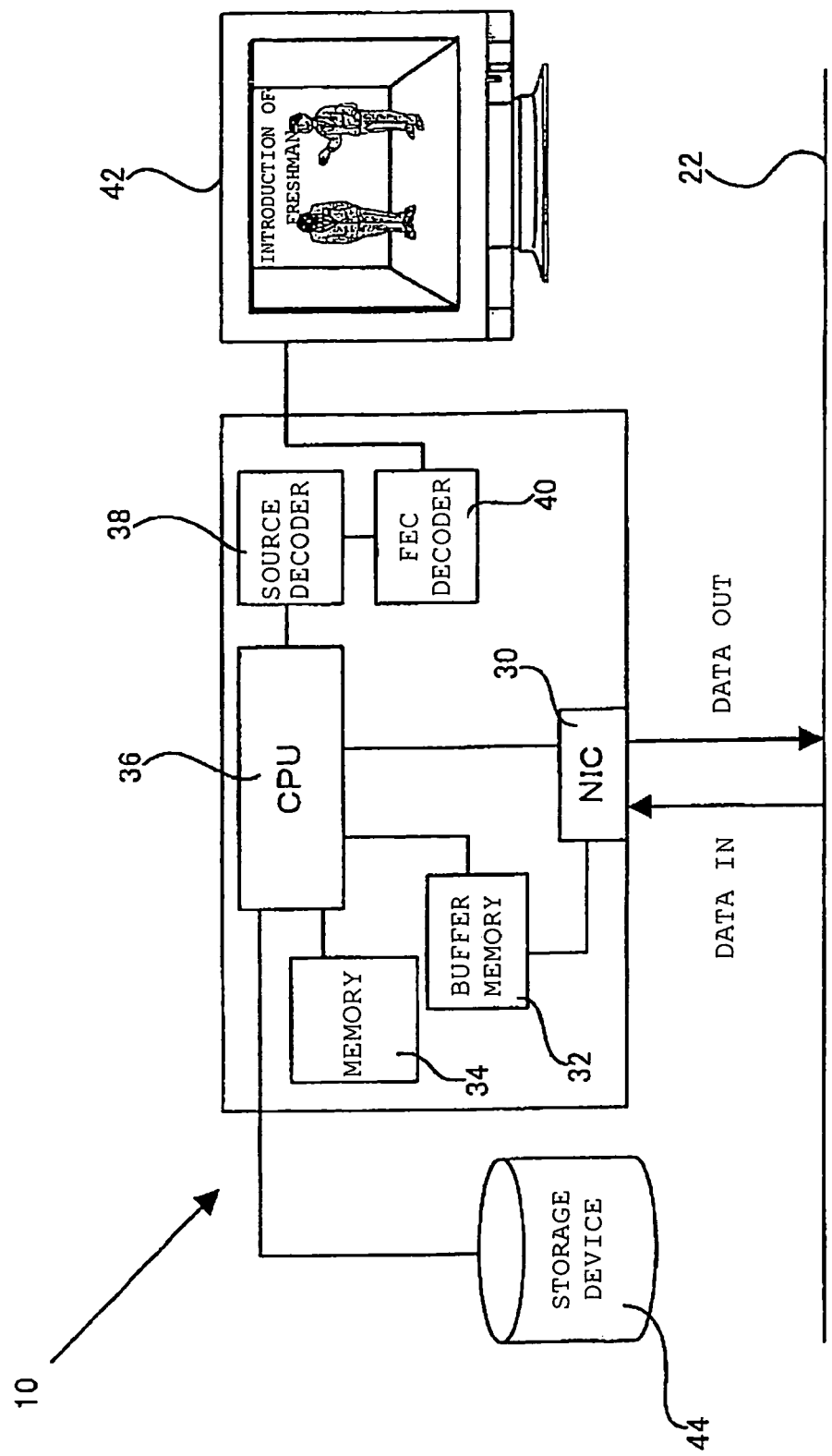
FIG. 9 is a functional block diagram illustrating a construction of the client in the present invention.

FIG. 9 is a functional block diagram illustrating the construction of the client 20 described in the present invention. The client 20 is connected to the second network 22 through the network interface card (NIC) 30. Furthermore, the client 20 is constructed by including the receiving buffer 32, the memory 34 and the memory 36 such as RAM. The receiving buffer 32 holds the received source packets and copy packets during a period before reconstructing the stream of the moving picture image data.

In the present invention, the receiving buffer 32 can be constructed as a ring buffer that writes the received packet to the address corresponding to the packet identifier for each time of receiving the packet. Moreover, the client 20 is constructed by including the central processing unit (CPU) 36, the source decoder 38 and the FEC decoder 40. However, the FEC decoder 40 is not always necessary in the present invention. The CPU 36 is driven in synchronization with a clock, reads the packets accumulated in the receiving buffer 32 for each predetermined period, sends the packets to the source decoder 38 and the FEC decoder 40, and reconstructs the moving picture image data for one stream. The reconstructed moving picture image data for one stream is displayed or reproduced on the display 42 to be provided to a user of the client.

The moving picture image data displayed or reproduced for the user can be deleted from the client 20. Alternatively, the entire stream from the start of the digital contents to the end thereof can be held in the memory 34, and can be stored in the storage device 44 such as a hard disk, a magneto-optical disk and a magnetic tape. In the storage device 44, for example, the member list constructed by including the client identifiers for identifying the clients constructing the group #1 can be stored. The member list is read into the memory 36 of the client from the storage device 44 at the boot of the client, and is held as a resident file. When the client illustrated in FIG. 9 receives the source packet, the client 20 refers to the member list and designates destinations to which the copy packets are distributed. Moreover, when the client 20 performs, in accordance with the TCP/IP protocol, the broadcast communication for the copy packet to, for example, abc, def.ghi.255, set as the destination in the format of IPv4, it is not necessary to directly refer to the above-described member list.

Figure 10:
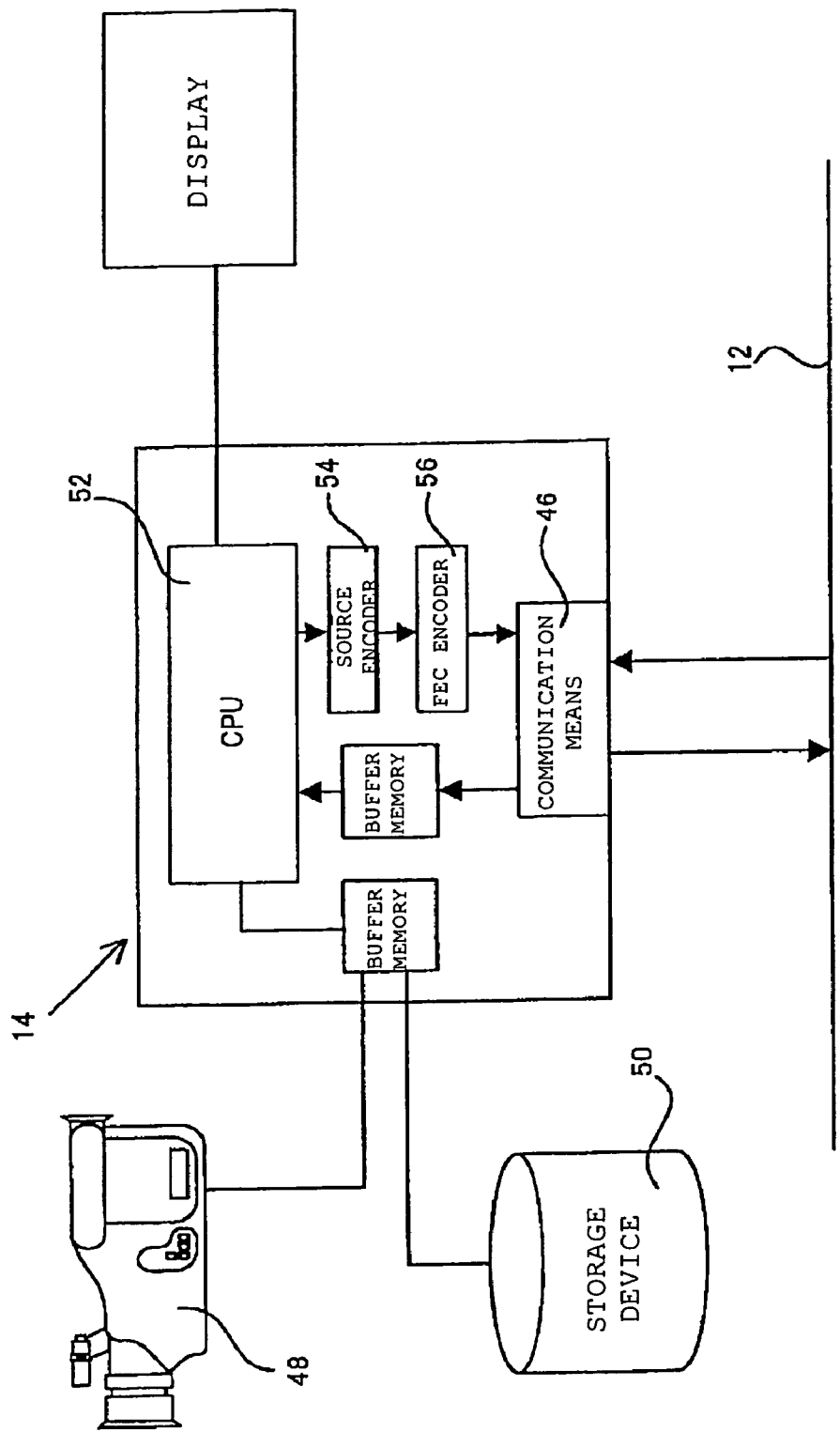
FIG. 10 is a functional block diagram illustrating a construction of the server of the present invention.

FIG. 10 is a diagram illustrating the construction of the server 14 of the present invention. The server 14 illustrated in FIG. 10 is connected to the network 12 through the communication means 46 such as a modem, a DSU, or the network interface card, and distributes the digital contents to the clients (not shown). Hereinafter, function of the server 14 of the present invention will be described starting from the acquisition of the digital contents.

To the server 14 illustrated in FIG. 10, the imaging means 48 such as a digital video camera is connected, in which digital data desired to be distributed as digital contents, for example, a program, a lecture meeting, a greeting, an education program and the like are recorded in a recording medium. The recorded digital data is acquired into the server 14 through an appropriate interface, and is held in, for example, the storage device 50. It is preferable to construct the digital data in the present invention as multi-media data including the above-described moving picture image data. When the digital contents are transmitted to a client, the CPU 52 first reads the digital contents from the storage device 50, and sends the read digital contents to the source encoder 54 and the FEC encoder 56. The source encoder 54 and the FEC encoder 56, which have received the digital data, perform streaming processing for the digital data, and further divide one stream into packets of a predetermined size, for example, packets P1 to P5. The created packets P1 to P5 distribute the digital contents through the communication means 46 to, for example, the group #1.

Figure 11:
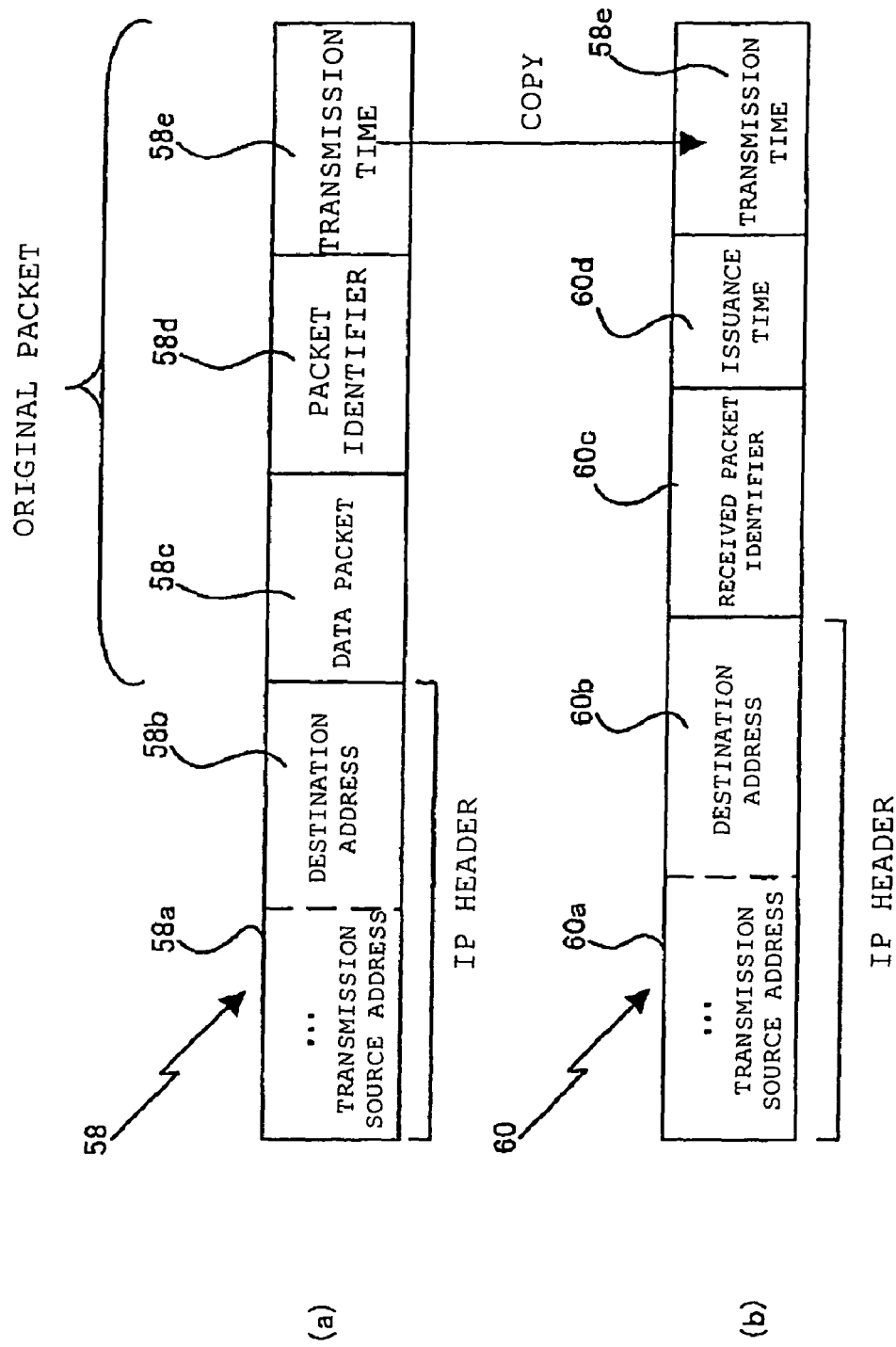
FIG. 11 is diagrams illustrating embodiments of a source packet usable in the present invention.

Because the connection-oriented network protocol is established between the server 14 and the client 20, the RTT is already monitored, at least weight in response to the RTT is allocated, and a client is selected as an intermediate node in accordance with the allocation weight. The server 14 transmits the source packet to the client as the selected intermediate node and distributes the digital contents thereto. FIG. 11 explains the case of illustrating the construction of the embodiment of the source packet 58 usable in the present invention by use of an IP header. As illustrated in FIG. 11(a), the source packet 58 transmitted from the server 14 is constructed by including, for example, the IP header 58a, and the IP header 58a is constructed by including a transmission address and the destination address 58b. Furthermore, the source packet 58 includes the packet 58c of the digital data to be distributed, the packet identifier 58d added as a serial number, for example P1, the transmission time 58e when the source packet is transmitted, and the like. In the present invention, the above-described packet 58c, the packet identifier 58d and the transmission time 58e can be constructed as an original packet created in the application level. Moreover, the IP header 58a includes IP version information, a transmission source IP address and the like, and is constructed to enable the server 14 to judge the RTT based on a reply from the client. In the case of transmitting the source packet 58 illustrated in FIG. 11(a), the server 14 can also monitor the time of transmitting a source packet, for example, the packet P1 by a timer and the like.

A response packet from the client having received the source packet P1 is returned to the server 14 through the network 12, is once accumulated in an appropriate storage unit in the server 14, and reads a time when the client transmits the response packet from a time recorded in, for example, a transmission time added to the response packet. FIG. 11(b) illustrates the embodiment of the construction of the response packet 60 from the client. As illustrated in FIG. 11(b), the response packet 60 includes the IP header 60a. As described above, this IP header 60a includes the transmission source address and the destination address 60b. Furthermore, the response packet 60 is constructed by including the packet identifier 60c of the received digital data, the time 60d when the client issues the response packet 60, and the packet transmission time 58e when the source packet P1 is transmitted. In the IP header 60a, the time when the client transmits the response packet 60, the transmission source IP address of the transmission source client and the like are recorded.

In the present invention, upon receiving the response packet 60, the server 14 judges the response packet 60 to be a response packet corresponding to the receiving of the source packet 54 by use of an identifier included commonly in the source packet 58 and the response packet 60, that is, the packet identifier P1 in the embodiment illustrated in FIG. 11. In the specific embodiment of the present invention, the server 14 calculates the RTT by use of the transmission time 58e and the issuance time 60d, and judges the effective throughput of the client by use of 1/RTT and the copy rate. The judged effective throughput is, for example, balanced for a fixed period, and then used to update the client list shown in FIG. 12. Moreover, in another embodiment of the present invention, in the case where a time is recorded in the IP header, the time recorded in the IP header can be directly used.

FIG. 12 is a table showing the embodiment of the client list 62 used by the server 14 in the present invention. The client list 62 shown in FIG. 12 is constructed by including the group identifiers 62a registered when the server 14 distributes the digital contents, the client addresses 62b of the clients included in given groups, and the effective throughputs 62c balanced for predetermined periods. For example, when the digital contents are distributed, contents providers such as a television station, a satellite broadcast station, and an event provider can prepare the group identifiers 62a by registrations from users and the like. Moreover, when the server 14 distributes the digital contents through intranets of business enterprises, administrative organs, judicial organs, legislative organs, educational institutions, libraries and the like without being particularly limited to the contents provider, addresses allocated for each group of the business enterprises or the organs, for example, the IP addresses can be used.

Moreover, for the client addresses 62b, the IP addresses and the like, which are allocated to specific groups, can be used in the specific embodiment of the present invention. The effective throughputs 62c shown in FIG. 12 are essential parameters in the present invention, which are used for the above-described allocation weighting. In the present invention, the above-described weighting is balanced at, for example, around one second time interval for the purpose of preventing unnecessary variations and stabilizing the path tree structure to secure the stability/reliability of the network and of flexibly coping with variations of the overheads in response to the departure and join of the clients or the processing status. This weighting is updated periodically as the effective throughputs. The effective throughputs 62c shown in FIG. 12 are denoted by #1Ta to #1Te as values corresponding, for example, to the clients 20a to 20e included in the group #1.

Figure 13:
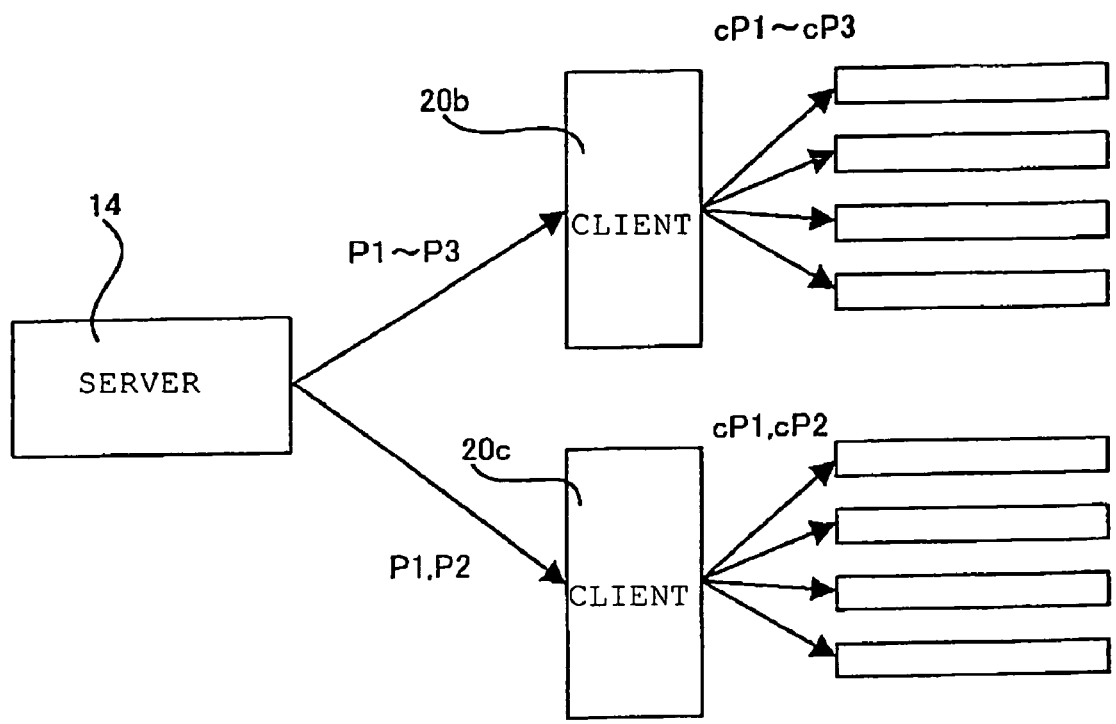
FIG. 13 is a diagram illustrating an embodiment of the path tree structure of the present invention, which is selected by the server.
Figure 14:
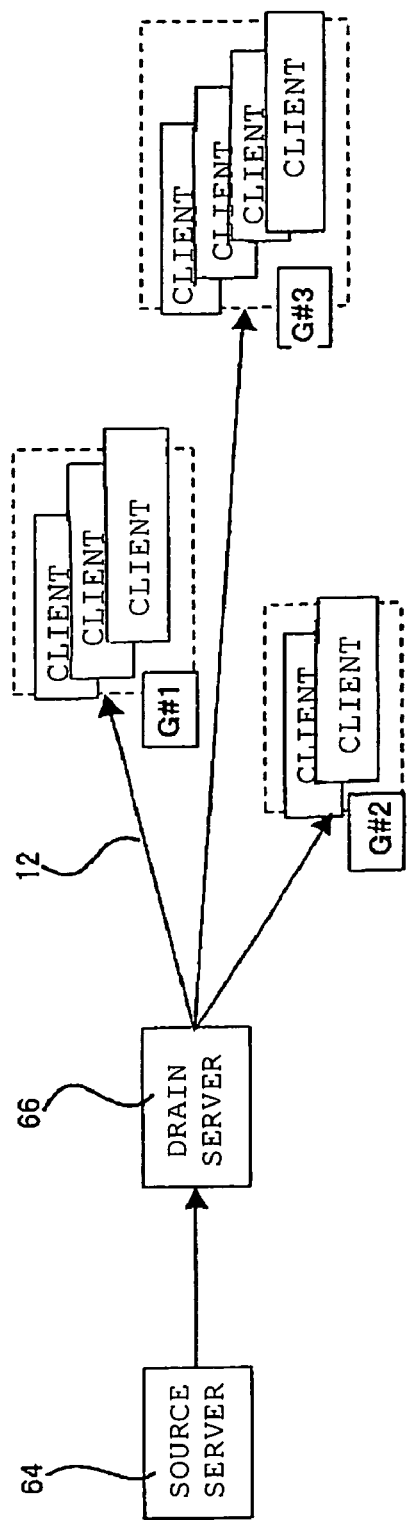
FIG. 14 is a diagram illustrating a second embodiment of the digital contents distribution system of the present invention.

Here, if it is assumed that the clients 20b and 20c are selected as intermediate nodes and that the ratio of the weight allocated thereto is 3:2, then the path tree structure illustrated in FIG. 13 is formed in the server 14. The server 14 transmits, for example, the source packets P1 to P3 to the client 20b and the source packets P4 and P5 to the client 20c in accordance with the weighting. The transmitted source packets are transmitted as the copy packets cP1 to cP5 from the clients 20b and 20c selected as the intermediate nodes to the other clients included in the group #1. Then, the copy packets cP1 to cP5 are accumulated in the receiving buffers of the respective clients, and then, after being accumulated for a predetermined period, used for reconstructing one stream. Note that, in another embodiment of the present invention, the transmitted source packets can be divided in any other numerical ratio and transmitted to the intermediate nodes. C: Another embodiment of digital contents distribution system FIG. 14 is a diagram illustrating the second embodiment of the digital contents distribution system of the present invention. The digital contents distribution system illustrated in FIG. 14 is constructed by including the source server 64 for crating the digital contents, the drain server 66 held in the source server 64 and for extracting and holding digital data subjected to the streaming processing, and the groups G#1, G#2 and G#3 connected through the network 12. A construction is adopted, in which a client included in each group is selected as an intermediate node and distribute the digital contents in the group in accordance with the present invention.

Figure 15:
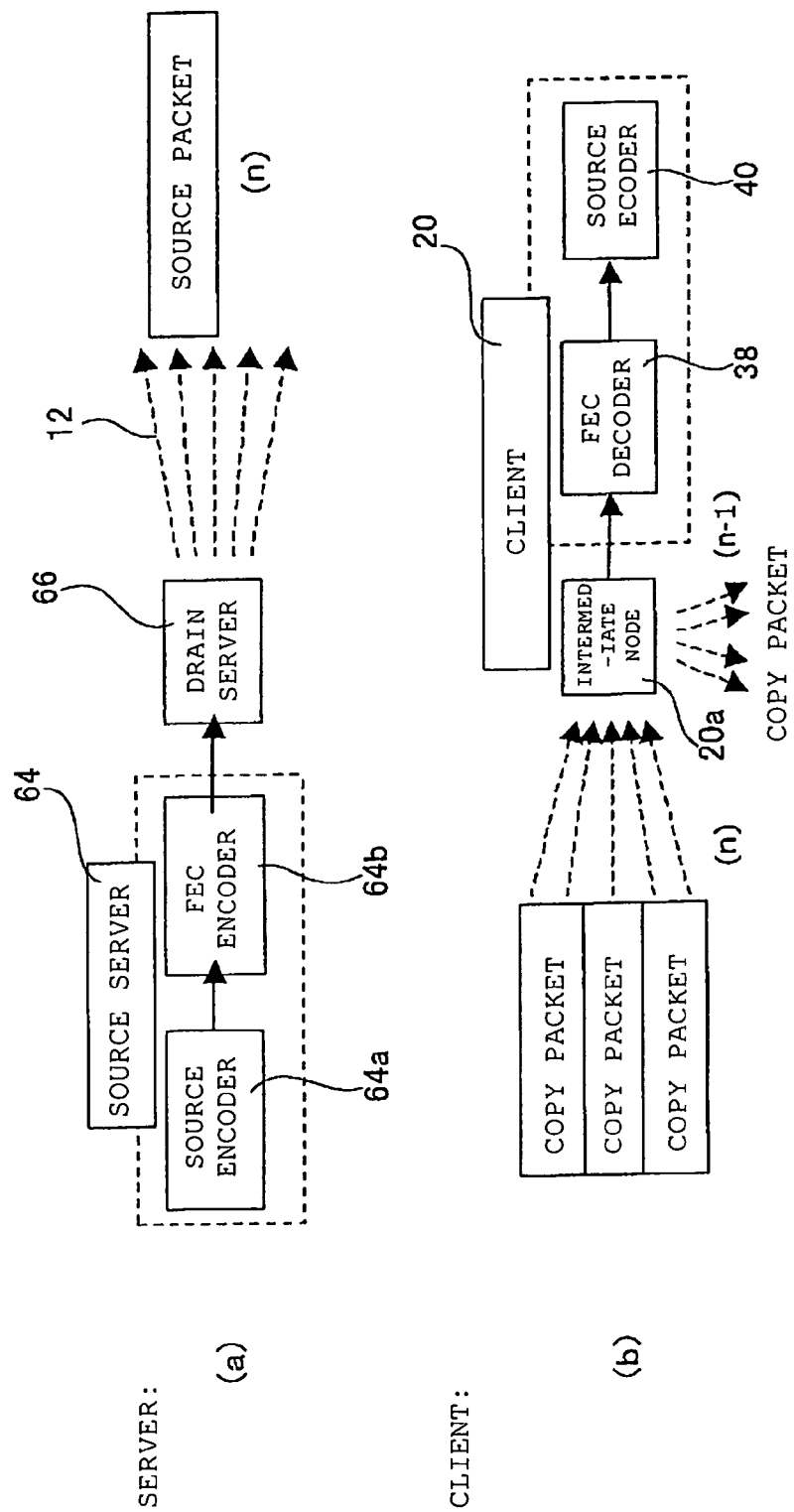
FIG. 15 is block diagrams illustrating constructions of a source server and a client, which are illustrated in FIG. 14.

FIG. 15 is a block diagram illustrating constructions of the source server 64 and one client, which are illustrated in FIG. 14. As illustrated in FIG. 15(a), the source server creates streamed digital contents from the created digital data by use of the source decoder 64a and the FEC encoder 64b. The created packets are transmitted to the drain server 66, edited into n pieces of the source packets necessary for the present invention in the drain server 66, and transmitted to the clients through the network 12. Moreover, FIG. 15(b) illustrates the construction and processing of the client. The client 20 receives the copy packets, and after accumulating the copy packets for a predetermined period, reconstructs the digital contents for one stream by use of the FEC decoder 38 and the source decoder 40. Then the client 20 provides the digital contents to the user. Simultaneously, the client 20a selected as the intermediate node copies the received source packets, and transmits the packets as copy packets to the other clients.

D: Source Packet Communication Protocol in Digital Contents Distribution

Figure 16:
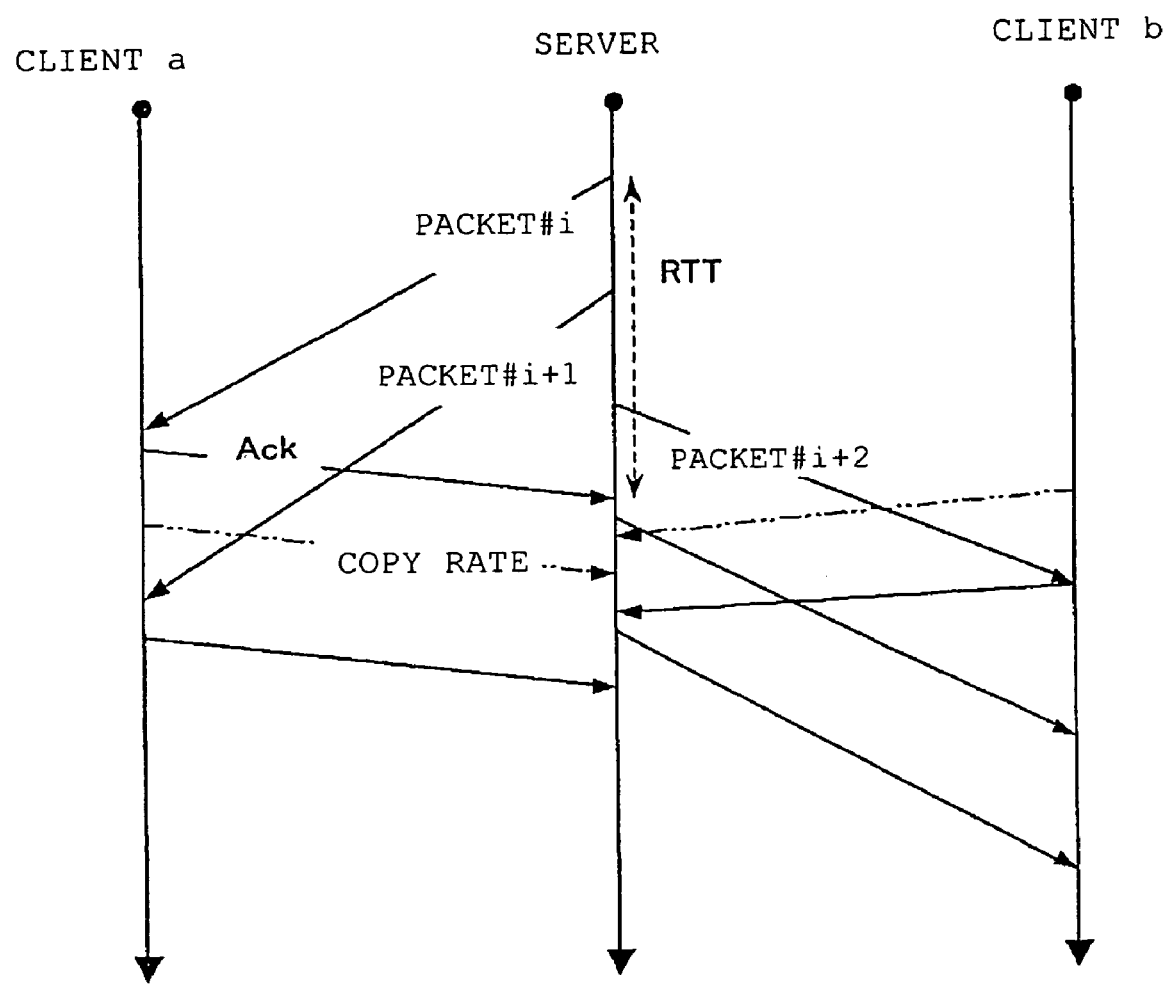
FIG. 16 is a diagram illustrating communication of source packets between the server and clients of the present invention in time series.

FIG. 16 is a diagram illustrating the communication of the source packets between the server and the clients of the present invention in time series. The source packets are sent out from the server to any of the clients at a fixed interval. The client having received the packets returns the response packets Ack (acknowledgement) to the server. The client is constructed to report the success rate of the copy (copy rate) to the server periodically (for example, at every one second). As described above, the period from each time when the packet is sent out to each time when the server receives the response packet Ack is used as the RTT (Round-Trip Time) for determining the allocation weight of the intermediate node in the path tree structure.

Figure 17:
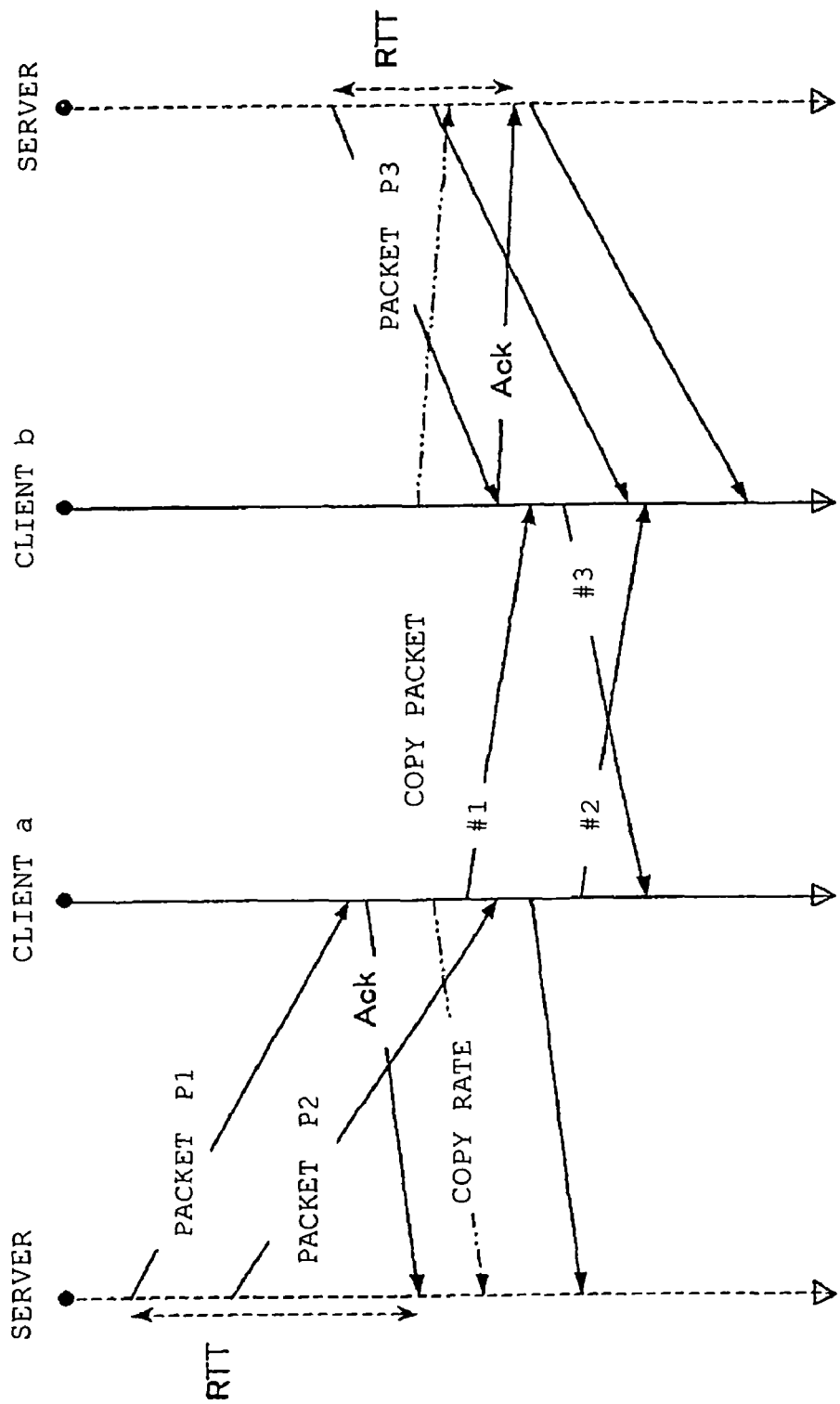
FIG. 17 is a diagram illustrating transmission of the source packets and copy packets between the clients selected as the intermediate nodes in the present invention among the clients and the server in time series.

FIG. 17 is a diagram illustrating, in time series, the transmission of the source packets and the copy packets among the server and the clients selected as the intermediate nodes in the present invention. The client a having received the source packets P1 and P2 from the server transmits the copy packets #1 and #2 of the packets P1 and P2 to the client b in the same group. The success rate (copy rate) in this case is reported to the server periodically. Moreover, the server sends the packet P3 to the client b, and the client b transmits the copy packet #3 to the client a. At this point of time, the client a holds the packets P1 to P3 in the receiving buffer. The above-described process is sequentially repeated, and the packets for one stream are accumulated.

Figure 18:
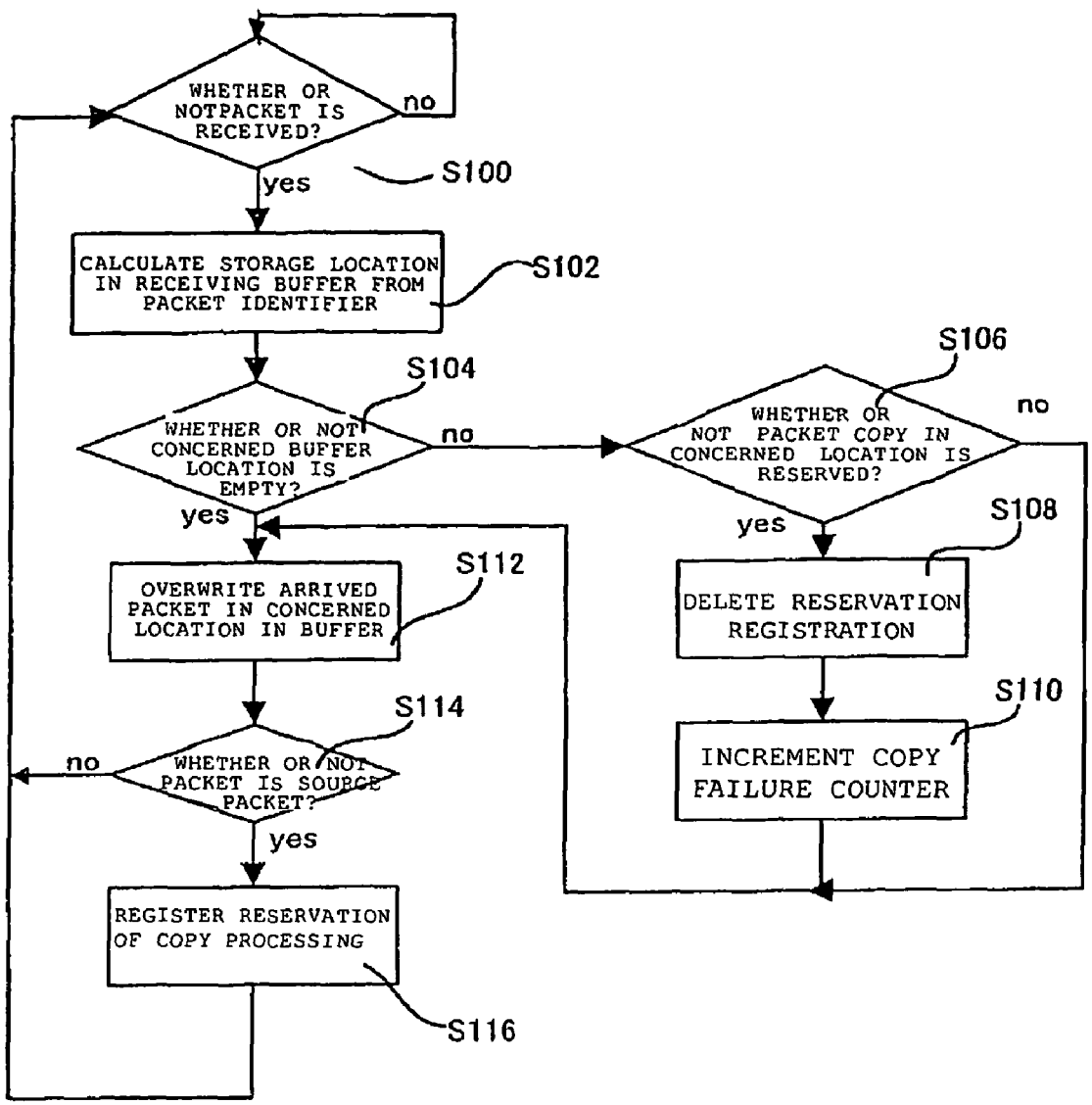
FIG. 18 is a flowchart illustrating processing of the client of the present invention.

FIG. 18 is a flowchart illustrating the processing of the client of the present invention. The client selected as the intermediate node is always set on standby for receiving the source packets, and monitors arrival of the packet in Step S100. Upon receiving the packet, the client calculates a storage location in the receiving buffer from the packet identifier of the received packet in Step S102. In Step S104, it is judged whether or not the location in the buffer is empty. If empty (yes), then the packet having a number corresponding to the location has not been received yet. Therefore, the received packet is written into the corresponding location of the receiving buffer in Step S112. Subsequently, in Step S114, it is judged whether or not the received packet is a source packet, for example, whether or not the source packet has been received by use of the transmission source address included in the IP header. If the source packet has been received (yes), then the processing proceeds to Step S116, where copy processing is reserved in order to transmit the copy packets to the other clients in the group. The reservation of the copy processing can be performed by, for example, registering the copy of the received packet with a suitable FIFO buffer. After the end of the reservation of the copy processing, the processing returns to Step S100, and the client is on standby for receiving the packet.

On the other hand, if the corresponding buffer address is judged not to be empty (no) in Step S104, then the packet having the corresponding packet identifier has already been received. Therefore, in Step S106, it is judged whether or not the packet with the corresponding identifier is already reserved so as to be subjected to the copy processing. If the reservation is registered (yes), then the reservation registration is deleted in Step S108 because overwrite will cause the source packet to be erased. Then, a copy failure counter is incremented in Step S110. In Step S112, a packet received at that point of time is overwritten into the corresponding buffer location. This corresponds to arrival of a subsequent packet before the client transmits the copy of the source packet. This also corresponds to the extinguishment of the packet. If the reservation is not registered for the packet so as to be subjected to the copy processing (no), then the processing proceeds to Step S112, where the packet is overwritten into the corresponding buffer address because the packet is a copy packet. Then, the processing from S114 through S100 is repeated.

Figure 19:
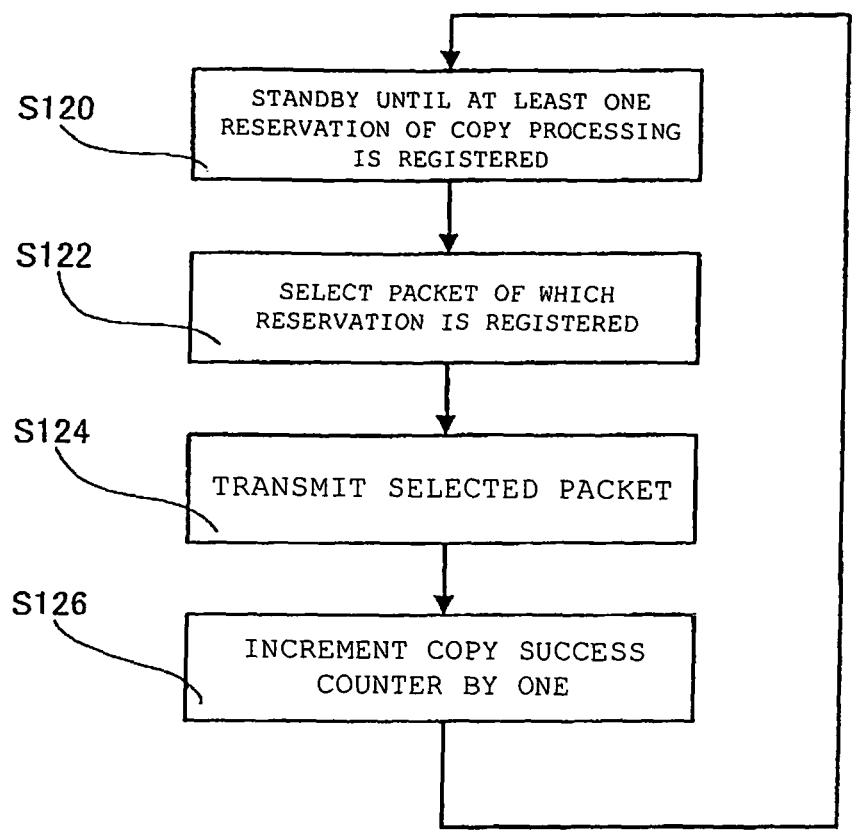
FIG. 19(a) is a flowchart of copy processing in the present invention.
FIG. 19(b) is a flowchart illustrating processing of the server in a case where unexpected departure of a client occurs and a case where a serious failure in the concerned client is detected.
Figure 19:
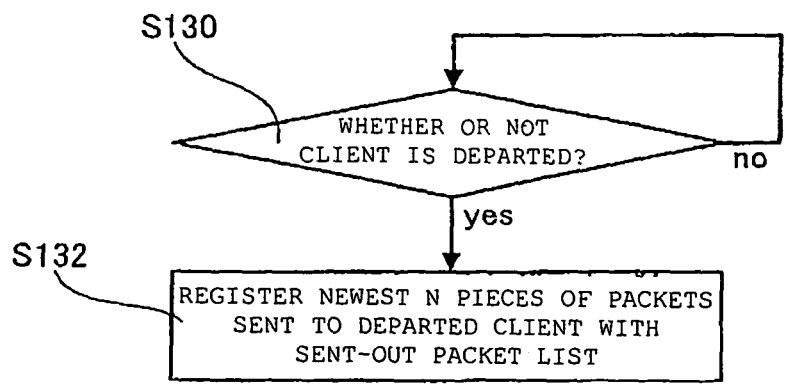

FIG. 19(a) is a flowchart illustrating the copy processing in the present invention. In Step S120 in the copy processing illustrated in FIG. 19, the client is on standby until a source packet requiring the copy processing is registered therewith. When the source packet is registered, if the registration is made, for example, by use of the FIFO buffer in the described embodiment, then a packet previously registered is selected in Step S122. In Step S124, the client copies the selected packet to make the copy packets, and performs the broadcast communication for the copy packets to the other clients, or transmits the copy packets individually to the other clients with reference to the destination IP addresses. Thereafter, a copy success counter is incremented in Step S128, the processing returns to Step S120, and the client is on standby. A ratio of the count of the above-described copy success counter to the total count of the copy success counter and copy failure counter is transmitted as the copy rate to the server. There is adopted a construction capable of preventing the disadvantages in the digital contents distribution by processing such as retransmission of the packets for one stream, the disadvantages being caused by lost packets, if this copy rate is too low.

FIG. 19(b) is a flowchart illustrating processing of the server if unexpected departure of the client occurs or if there is a serious failure detected in the concerned client. In Step S130, the server always monitors the effective throughput of the client through the RTT and the copy rate. For example, if the server does not receive a response packet for a predetermined threshold period, the server judges that the departure or the failure occurs in the client. Thereafter, the processing proceeds to Step S132, and the server selects source packets transmitted for a period corresponding to the predetermined threshold value from the source packets transmitted to the concerned client. Then, the server reregisters the selected source packets with the head of the sent-out source packet list of the server, and transmits the reregistered source packets to the other clients. Thus, a construction is adopted, which prevents the extinguishment of the source packets.

Figure 20:
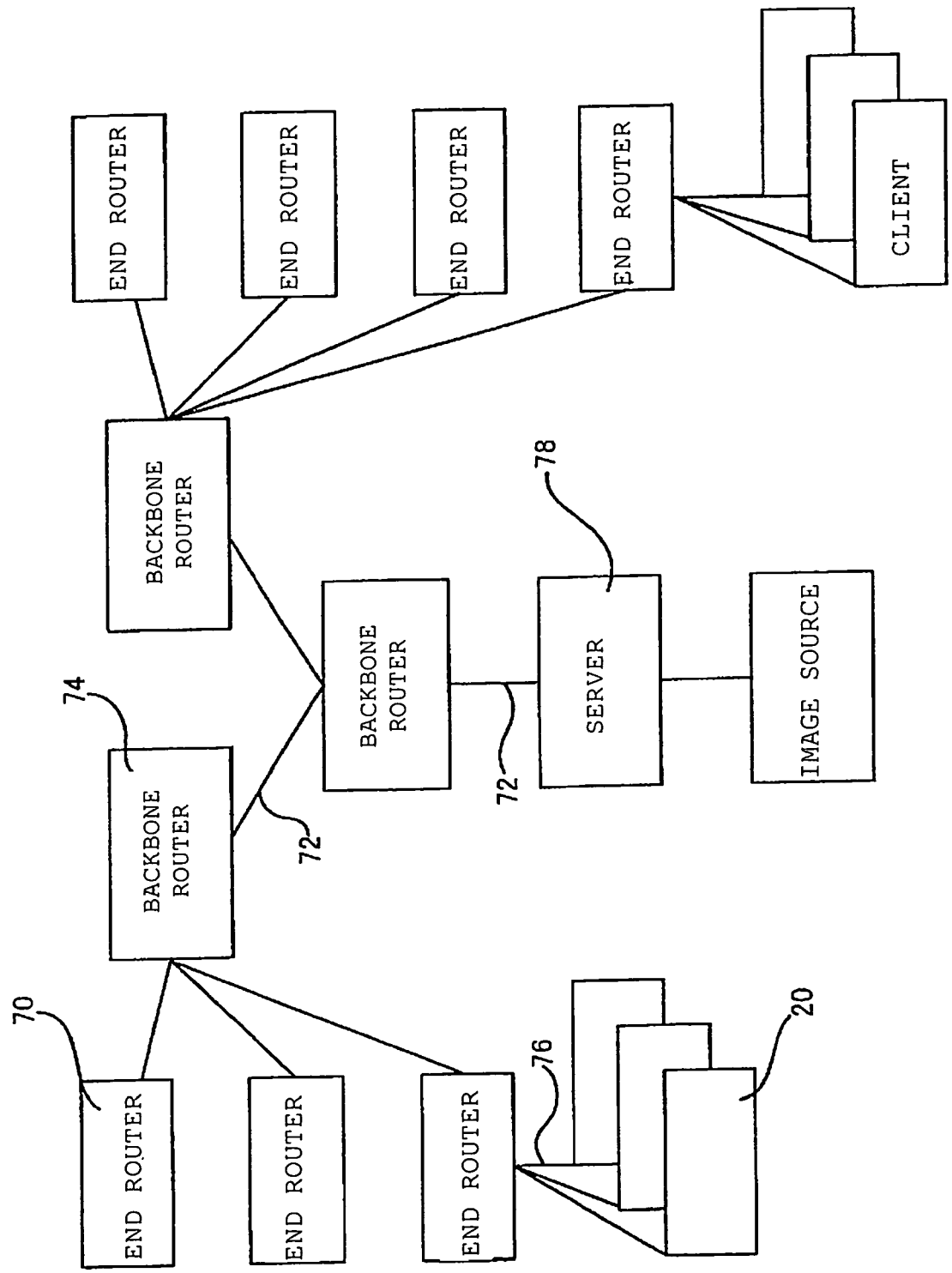
FIG. 20 is a diagram illustrating another embodiment of the digital contents distribution system of the present invention.

FIG. 20 is a diagram illustrating another more concrete embodiment of the digital contents distribution system of the present invention. Concretely, the embodiment illustrated in FIG. 20 is an embodiment of the case where the present invention is applied to in-house broadcast of a lecture meeting or the like by use of an in-house intranet. In the embodiment illustrated in FIG. 20, the in-house intranet is constructed to mutually connect the end routers 70 located in the respective sections through the network 72 such as the Ethernet (registered trademark) or a fiber channel by use of the backbone routers 74. Under each end router 70, the clients 20 constructed of, for example, approximately one hundred personal computers are subjected to the peer-to-peer connection to construct the second network 76. In the embodiment described with reference to FIG. 20, a network having approximately 3,000 pieces of the clients 20 in total is constructed. For example, if the server 78 transmits packets to all of the clients under the construction illustrated in FIG. 20, even if a backbone router having a bandwidth of, for example, 1 Gbps is used as the backbone router 74, the server 78 cannot smoothly transmit moving picture image data requiring a transmission speed of 8 Mbps. For example, digital contents distribution in a size of a digital versatile disk (DVD) is impossible by a conventional method. If the packet overlap avoidance of the present invention is not used, even if the network has one hundred pieces of the clients, the users cannot receive the digital contents distribution in realtime.

The present invention is applied to this system. Accordingly, if the clients 20 form the second network through the same switching hub by the Ethernet (registered trademark) of, for example, 100 Mbps, then, as the communication speed by the peer-to-peer connection among the clients, a throughput ranging from 40 to 50 Mbps is expected. Therefore, no problem occurs in transmission/receiving, for example, of data at 8 Mbps in MPEG4. On the other hand, if the clients are connected to different end routers, it is more efficient to divide the clients into different groups. However, in this case, the server 78 transmits streams by the number of groups. If there are thirty end routers, each connecting one hundred PCs thereunder, groups can be allocated for each end router.

In this case, data for thirty streams will be transmitted from the server 78 directly connected to the backbone router 74 while consuming a throughput of 240 Mbps. In the embodiment illustrated in FIG. 20, as the clients 20, the personal computers grouped under the end routers 70 can always join or depart from a network including data of the video and audio of the lecture meeting. Moreover, clients having relatively low performances are always located downstream of the path tree structure in the packet transmission, thus making it possible to avoid the adverse effect to the other clients. Note that, though the sever manages the three hundred pieces of clients as objects to be selected for paths in this case, it has been possible to perform the realtime digital contents distribution sufficiently by one server.

Figure 21:
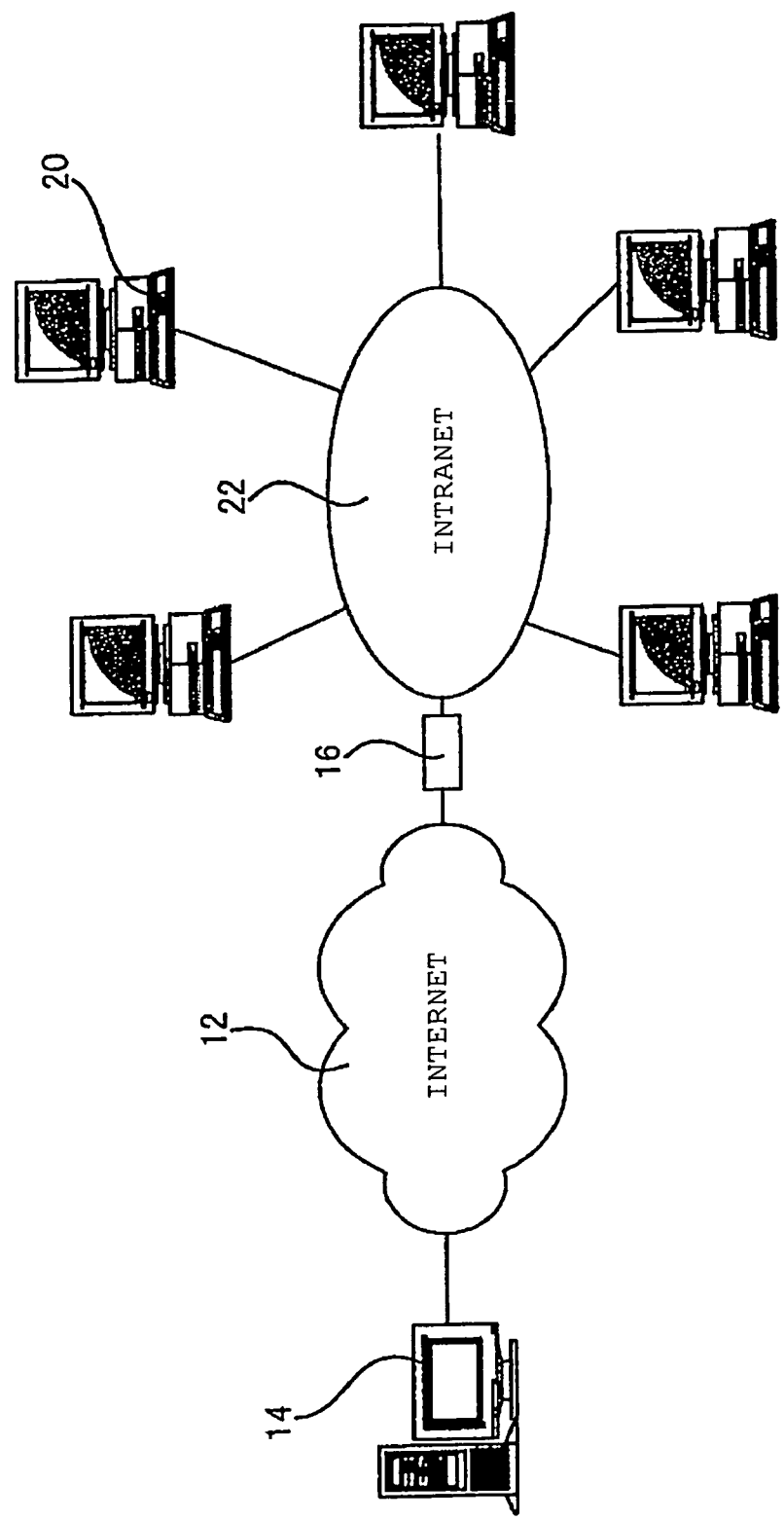
FIG. 21 is a diagram illustrating still another embodiment of the digital contents distribution system of the present invention.

FIG. 21 is a diagram illustrating still another more concrete embodiment of the present invention. In this embodiment, the plurality of clients 20 simultaneously receive digital contents from the server 14 located on the Internet in accordance with the present invention. In the embodiment illustrated in FIG. 21, the Internet forms the first network 12, and the second network 22 corresponds to, for example, an intranet connected through the router 16 to the Internet. It is seen from the Internet that the in-house intranet is a well-managed network with a wide bandwidth and a small fluctuation in throughput. When the server 14 is located on the Internet, if the group is constructed of the clients belonging to the intranet, the clients can simultaneously receive, for example, the moving picture image/data video of 1 Mbps while preventing the packet overlap on the Internet without any special edge server. In the case illustrated in FIG. 21, it has been confirmed that a communication speed of 2 Mbps may be satisfactory as the communication speed required for the clients.

Figure 22:
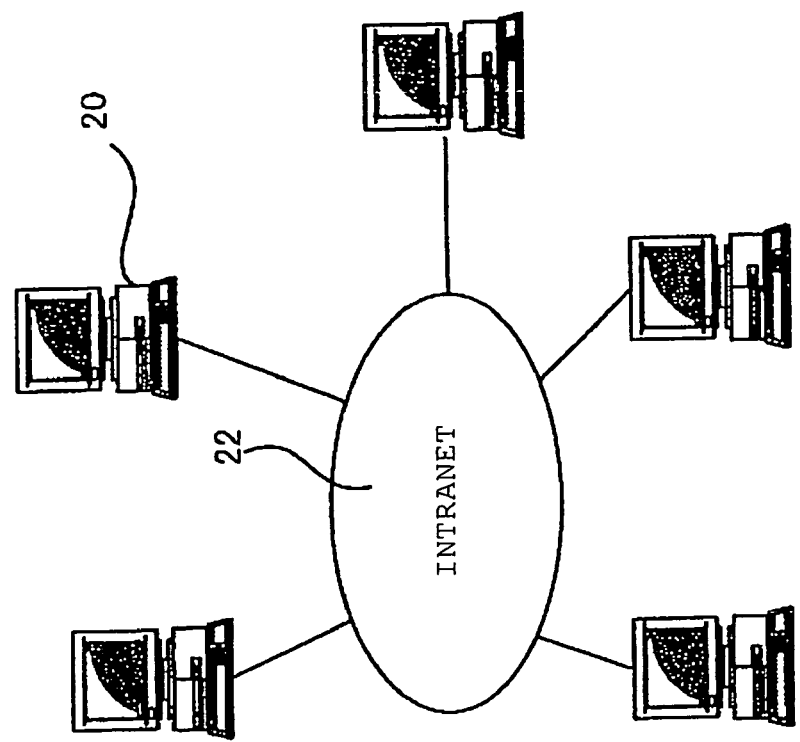
FIG. 22 is a diagram illustrating yet another embodiment of the present invention, which enables load reduction for a server on a wireless network.
Figure 22:
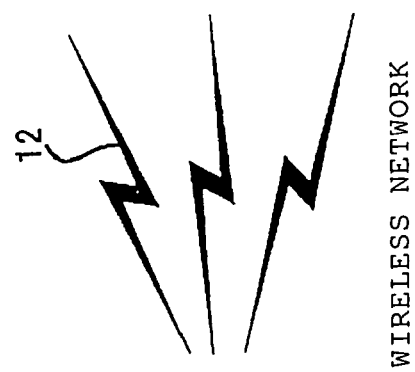
Figure 22:
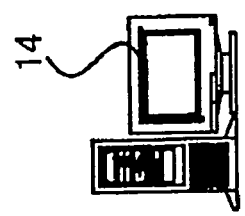

FIG. 22 is a diagram illustrating yet another embodiment of the present invention, which enables load reduction for servers on a wireless network. In the embodiment of the present invention, which is illustrated in FIG. 22, the processing of the server 14 is only transmission of streams in accordance with the number of groups and dynamic path selection. Therefore, in comparison with the conventional case, the overhead given to the server will be able to be reduced. For example, the load on the client 20 may sometimes be larger than that on the server 14 because the reproduction of the image data in MPEG2 or MPEG4 requires extremely large CPU resources. Moreover, the server 14 transmits only one stream to the group constructed of the clients 20. Therefore, even if the server 14 located on the wireless network has small CPU resources, the server 14 can simultaneously distribute streams in MPEG4, for example, at 384 kbps, to the plurality of clients on the intranet connected through the wireless network.

Figure 23:
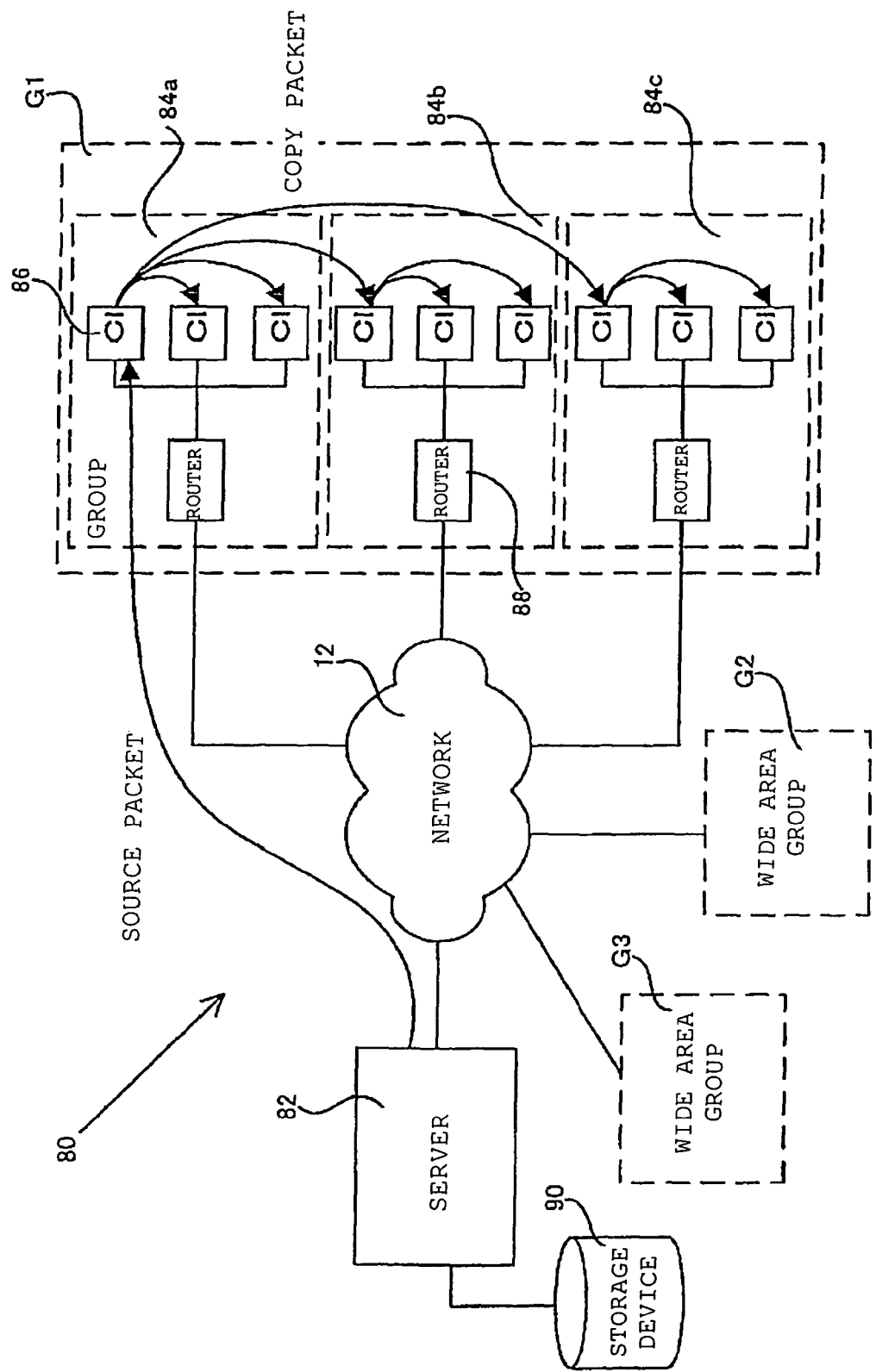
FIG. 23 is a block diagram illustrating a construction of the digital contents distribution system of the present invention.

E: Digital Contents Distribution System Executing Pseudo Tunnel Distribution that Performs Digital Contents Distribution FIG. 23 illustrates a digital contents distribution system enabling pseudo tunnel distribution in the present invention. The digital contents distribution system 80 illustrated in FIG. 23 is constructed by including the server 82 for receiving digital contents from a transmitter and holding the contents therein, and the clients 86 belonging to the groups 84a to 84c constructed by including the plurality of clients 86. The server 82 and the groups 84a to 84c are mutually connected via the routers 88 through the first network such as the Internet. Moreover, the clients 86 belonging to each group are mutually connected through LAN constructed therein, thus making it possible to share the data and perform information communication. Note that the number of groups illustrated in FIG. 23 is not particularly limited to that number illustrated therein in the present invention, or the number of clients is not particularly limited to the number illustrated therein, either. Moreover, as well known by those skilled in the art, a variety of servers such as a printer server and a mail server may be connected to the groups. The respective groups construct the larger wide area group G1, and the wide area groups G2 and G3 constructed similarly are connected to the first network 12. Note that, though the digital contents can also be distributed to the wide area groups G2 and G3 from the server 82, different servers can be used for each groups.

The function of the contents distribution system 80 illustrated in FIG. 23 will be described in detail. First, from a transmitter server managed by a provider, the server 82 receives digital contents to be distributed. Alternatively, the provider inputs the digital contents to the server 82 in a moving picture or text format. Thus, the digital contents are held in the storage means 90 such as a hard disk. Moreover, when multimedia data is directly inputted from a video camera to the server 82, the digital contents are held in an appropriate buffer memory (not shown) and the like included in the server 82.

The held digital contents are subjected to the streaming processing in the server 82, divided into a plurality of segments, and created as source packets. The created source packets are transmitted to a client 86 selected by use of the execution throughput and the like in accordance with the method of the present invention. As illustrated in FIG. 23, upon receiving the source packets, the client 86 executes the copy of the source packets in the group or among the groups, thus making it possible to share the digital contents in the entire wide area group.

Moreover, each of the clients 86 includes an application, for example, such as Windows Multimedia Player (trademark) for reproducing the digital contents, and executes the reproduction processing for the digital contents accumulated in the buffer memory thereof, thus making it possible to provide the digital contents to the user. In the embodiment illustrated in FIG. 23, the application is included in each of the clients, and the digital contents are accumulated in each of the clients 86. In the present invention, the pseudo tunnel distribution can be executed in the server 82 by describing, to the source packets, data for executing the packet copy in the group or among the groups. Moreover, in yet another embodiment, a construction can also be made, in which lists of copy destinations selected from the client list are previously stored in the clients, the receiving of the source packets is judged, the lists of copy destinations are referred to, and the copy packets are transmitted.

Figure 24:
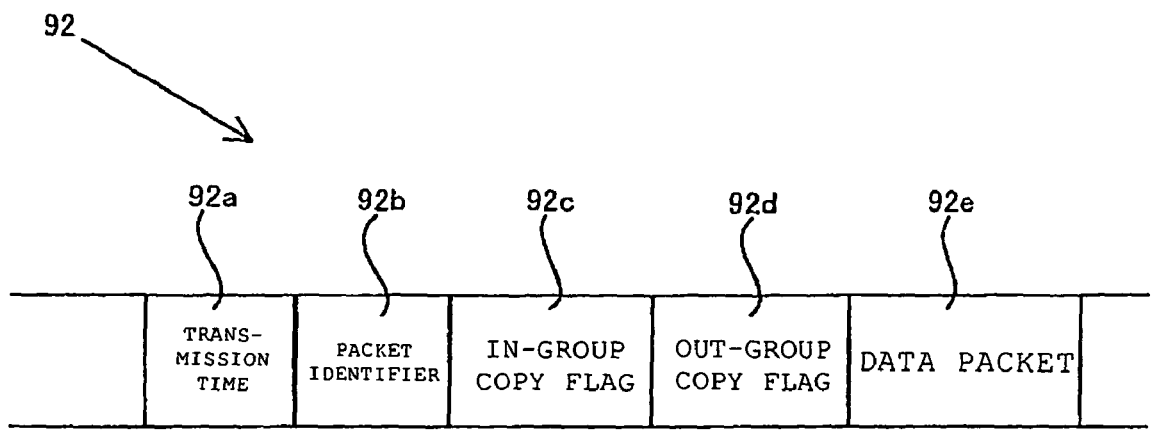
FIG. 24 is diagrams illustrating other embodiments of the source packet usable in the present invention.
Figure 24:
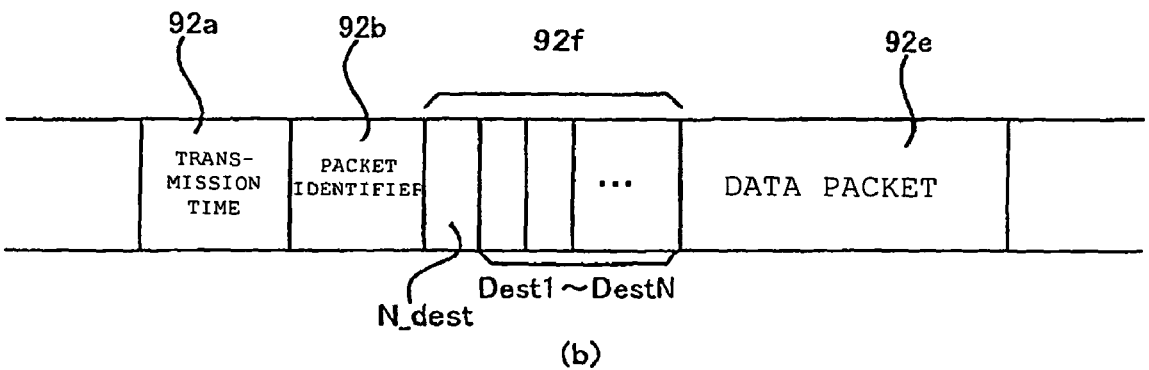
Figure 24:
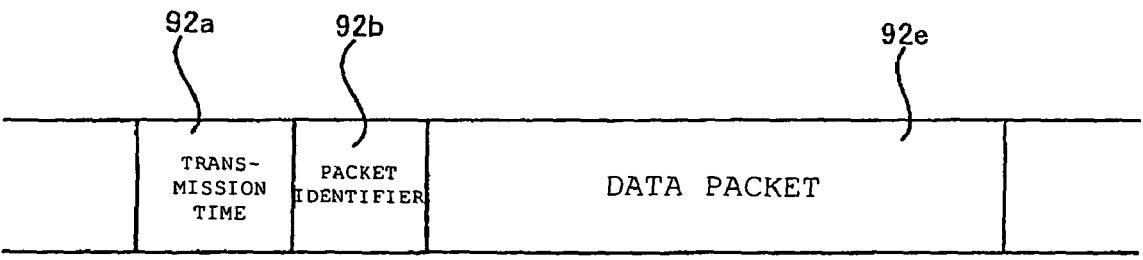

FIG. 24 illustrates embodiments of source packets created for executing the pseudo tunnel distribution in the present invention. The source packet 92 illustrated in FIG. 24(a) is constructed by including the transmission time description area 92a, the packet identifier description area 92b, the packet identifier being added to the source packet, the copy instruction flag areas 92c and 92d for instructing the packet copies to be executed in the group and among the groups respectively, and the data packet description area 92e constructed of the substantial data of the digital contents.

The transmission time description area 92a can convert the time when the server first sends out the packets into an arbitrary format recognizable by the clients and the server. The transmission time description area 92a is utilized for the case where the server 82 measures the response time of each client, that is, the execution throughput in order to determine the client to which each packet is transmitted. Moreover, the packet identifier description area 92b is an area for recording therein a serial number added to the source packet sent out by the server 82, and is utilized for the case where the client reconstructs the time-series order of the source packets.

The copy instruction flag area 92c is an area in which a true/false flag indicating whether or not the copy in the group is to be performed is described. The client executes the processing of transmitting the copies of the received packets of which flags are true in these areas to all of the clients in the group. The copy instruction flag area 92d is an area in which a true/false flag indicating whether or not the copy among the groups is to be performed is described. The client executes the processing of transmitting the packet of which flag is true to one of the clients in each of the other groups in the wide area group. The data packet description area 92d is an area in which the substantial data of the digital contents to be transmitted by the server 82 and reproduced by the client 86 is described. Note that, in the present invention, other additional elements may be added before, after and among these elements, or an order of these elements may be changed. Moreover, a part of the elements may be omitted depending on the case. Moreover, as illustrated in FIG. 11, the source packet 92 is constructed by including the transmission source IP address and the destination IP address designating the destination to which the source packet 92 is transmitted, though no illustrated.

FIG. 24(b) illustrates the second embodiment of the source packet created in the contents distribution server 82 of the present invention. In the embodiment illustrated in FIG. 24(b), the source packet itself is made to include the list of the clients to which the copies of the packet are to be transmitted, and thus the distribution destinations are designated in more detail. In this case, the server 82 describes, in the source packet 92, the list of the destinations to which the copies are to be transmitted with reference to the client list held by the server itself. Moreover, the source packet 92 illustrated in FIG. 24(*b*) includes the transmission time description area 92*a* and the packet identifier description area 92*b*, which have a function of allowing the client to execute a similar function to that described with reference to FIG. 24(*a*). Moreover, the source packet 92 illustrated in FIG. 24(*b*) is provided with the copy instruction data area 92*f* designating the copy destinations designated by the server 82. When the client judges to have received the source packet, the client reads the copy instruction data area 92*f*, and executes processing described below.

The value N_dest described in the copy instruction data area 92*f* designates a list length of the destination to which the copy is to be transmitted. For the values Dest1 to DestN, client identifiers such as IP addresses designating the clients to which the copy packets are to be transmitted can be used. For example, if the group to which the client itself belongs is designated in the copy instruction data area 92*f*, then the client transmits the copies of the source packet only to the clients in the group. Meanwhile, if a value designating the transmission of the copy packets to the other groups, for example, IP addresses corresponding to the other groups and the like are designated in the copy instruction data area 92*f*, then the client transmits the copies of the source packet to the clients in the designated groups. The data packet description area 92*e* is similar to that described with reference to FIG. 24(*a*).

FIG. 24(*c*) is a diagram illustrating the third embodiment of the source packet 92 for use in the present invention. The embodiment illustrated in FIG. 24(*c*) is made for the case where the destinations of the copy packets are originally obvious and description thereof is not necessary. In this case, the client previously selects the copy destinations from the client list stored in the storage means such as a memory and a hard disk, and selects clients in other groups, which have addresses allocated in a range that is not overlapped with the other clients, thus making it possible to prepare the copy destination list. Moreover, in the case of distributing the copy packets in the group in the embodiment of FIG. 24(*c*), the distribution thereof can be performed by executing the broadcast communication in the group. Furthermore, in another embodiment, a construction can be previously adopted, in which the client transmits the copy packets to the other clients in the group, and transmits each copy of the received source packet to one client belonging to each of the other groups in the wide area group. The source packet illustrated in FIG. 24 and usable in this embodiment is constructed of the transmission time description area 92*a*, the packet identifier description area 92*b* and the data packet description area 92*e*, and includes no distribution destinations of the copy packets. As described above, the client distributes the copy packets to the clients listed in the copy destination list or the clients previously designated.

Figure 25:
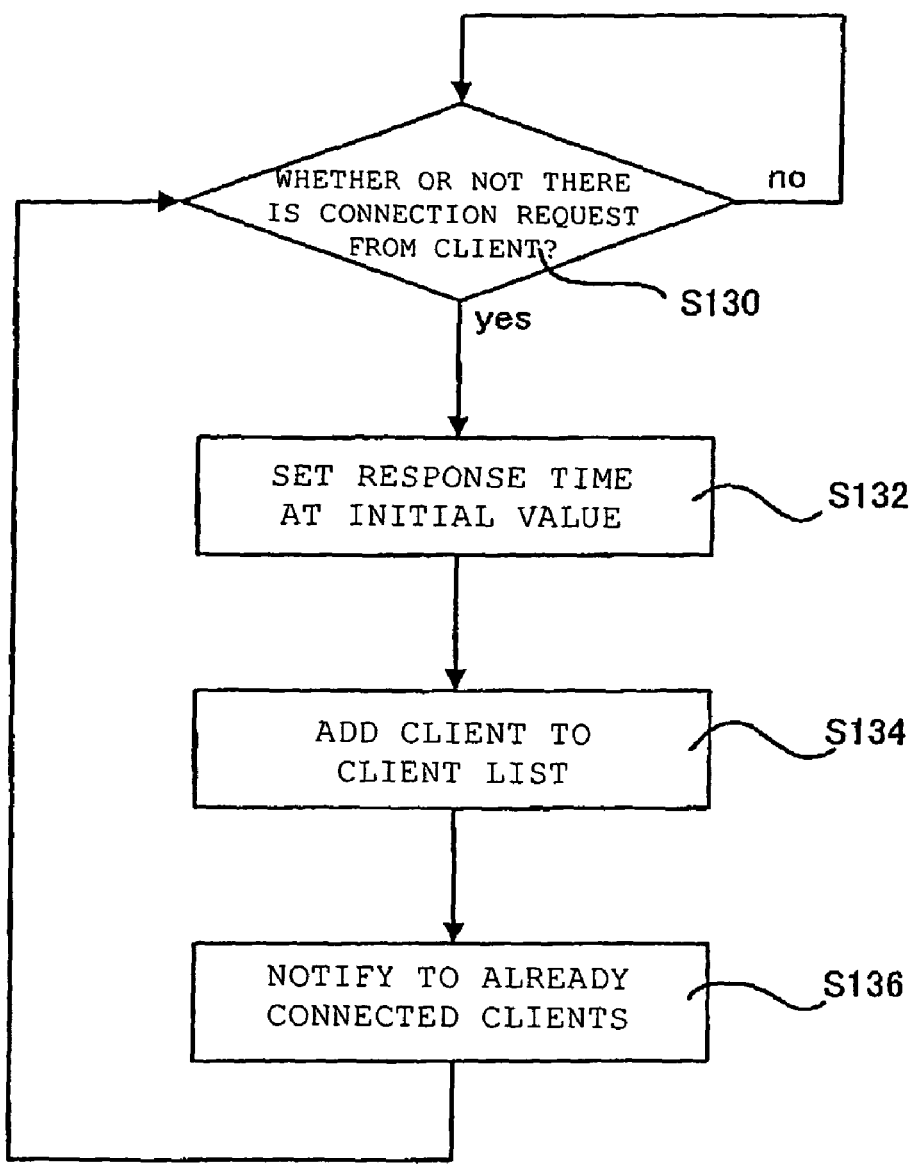
FIG. 25 is a flowchart of a process executing contents distribution of the present invention.

FIG. 25 is a flowchart illustrating a process executed by the server for the pseudo tunnel distribution of the present invention. In the pseudo tunnel distribution of the present invention, in Step S130, the server judges whether or not a new client joins the group by monitoring a notice (Join request) transmitted from the client. If the server finds the newly joining client (yes), then, in Step S132, the server previously allocates a smallish value for the execution throughput of the newly joining client, and prevents a large amount of source packets from being suddenly transmitted to the newly joining client in consideration of actual results on and after. Subsequently, in Step S134, the server adds the concerned client to the client list, thus enabling the digital contents to be distributed thereto. Here, the identification of the client can be performed by means of an identifier allocated to the client, for example, the IP address, a name of the client arbitrarily added to the client or the like. In step S136, the server notifies the join of the new client to the wide area group and the identifier such as the IP address thereof to all of the clients in the wide area group, which includes the newly joining client. The client having received the notice stores a new list in the hard disk or the suitable memory. The communication in this case can be executed by use of the pseudo tunnel distribution of the present invention. Alternatively, the communication can be performed by use of any known method because the transmitted data amount is relatively small in comparison with the multimedia data, the image data and the like. By the above-described process, it is made possible for the server and the clients to own the same newest client lists.

Figure 26:
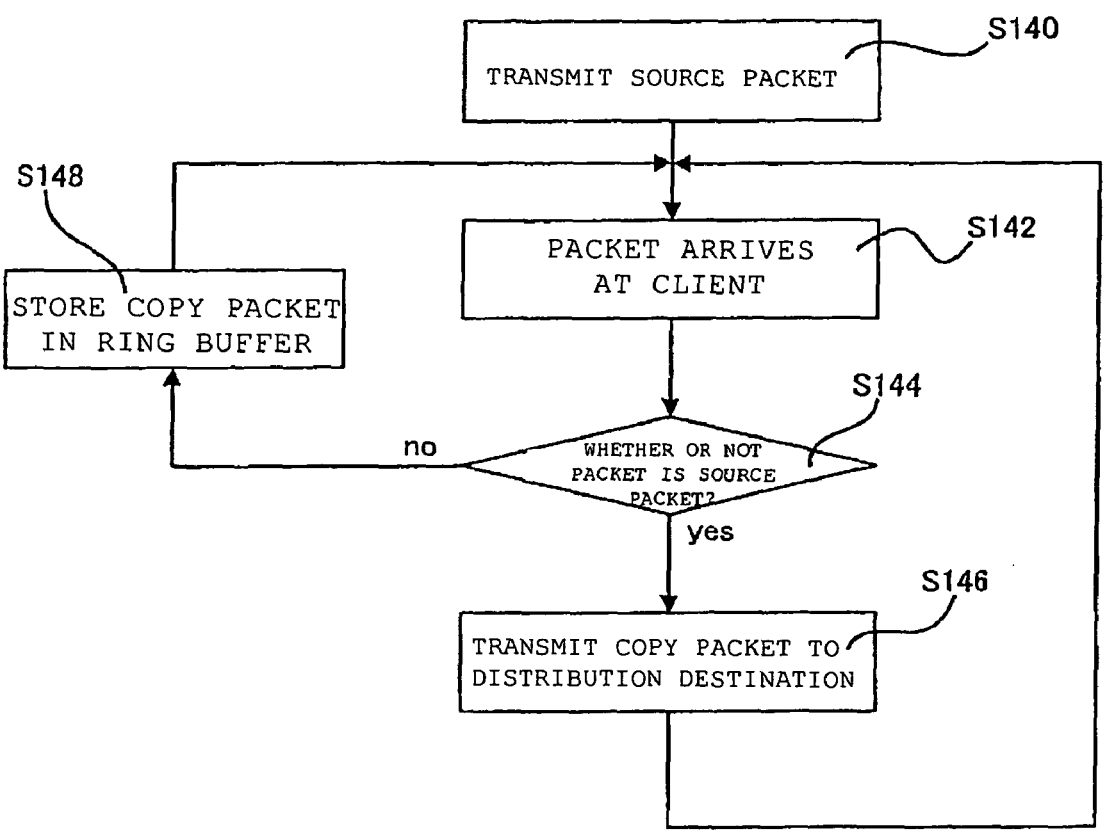
FIG. 26 is a flowchart illustrating processing of the server and the client in a case of executing the contents distribution of the present invention.

FIG. 26 is a flowchart illustrating a process between the server and a client in the processing performing the digital contents distribution. If the provider instructs the server to perform the digital contents distribution, then, in Step S140, the server refers to the client list, selects a client having the largest execution throughput or the smallest round-trip time (RTT), and transmits the first source packet to the concerned client with reference to the IP address thereof and the like. In this case, the same source packet is distributed to only one client among the clients belonging to the wide area group in the simplest embodiment of the pseudo tunnel distribution method of the present invention.

The client receives the packet in Step S142, and in Step S144, judges whether or not the received packet is the source packet from the server. The judgment whether or not the packet is the source packet can be performed, for example, based on whether or not the packet includes the transmission source address, the copy instruction flag, the copy instruction data area, which are included in the source packet. Moreover, in the present invention, the copy of the source packet can be prepared in any format as long as the packet can be judged to be the copy packet. Moreover, because the IP address allocated to the server is usually set as a fixed IP address, the judgment for the source packet, which can be utilized most universally, can be performed by use of the transmission source IP address in the packet. If the packet is judged to be the source packet (yes) in the judgment of Step S144, then the client transmits the copy of the source packet to the pre-registered distribution destination with reference to the distribution destination described in the source packet in Step S146, or reference to the copy destination list in the case of the embodiment using the source packet illustrated in FIG. 24(*c*). In this case, the transmission of the copy packet is executed including two processes. Specifically, (i) the client transmits the copy packets to all of the clients belonging to the group to which the client having received the source packet belongs; and (ii) the client transmits the copy packet to each one selected client in each of the groups to which the client having received the source packets does not belong. It can be previously set as to which of the clients are to be selected. Alternatively, the RTT of the client to which the copy packet is to be transmitted is previously monitored by suitable criteria and technique, a client having a small response time is dynamically selected similarly to the contents distribution server, and the copy packet can be transmitted thereto.

If the received packet is judged not to be the source packet (no) in the judgment of Step S144, then the packet is a packet to be stored by the receiving client. Therefore, in Step S148, the client accumulates the received copy packet in the ring buffer and the like, and starts the processing for reproducing the digital contents. Then, the processing returns to step S142, and is repeated for the next packet.

Figure 27:
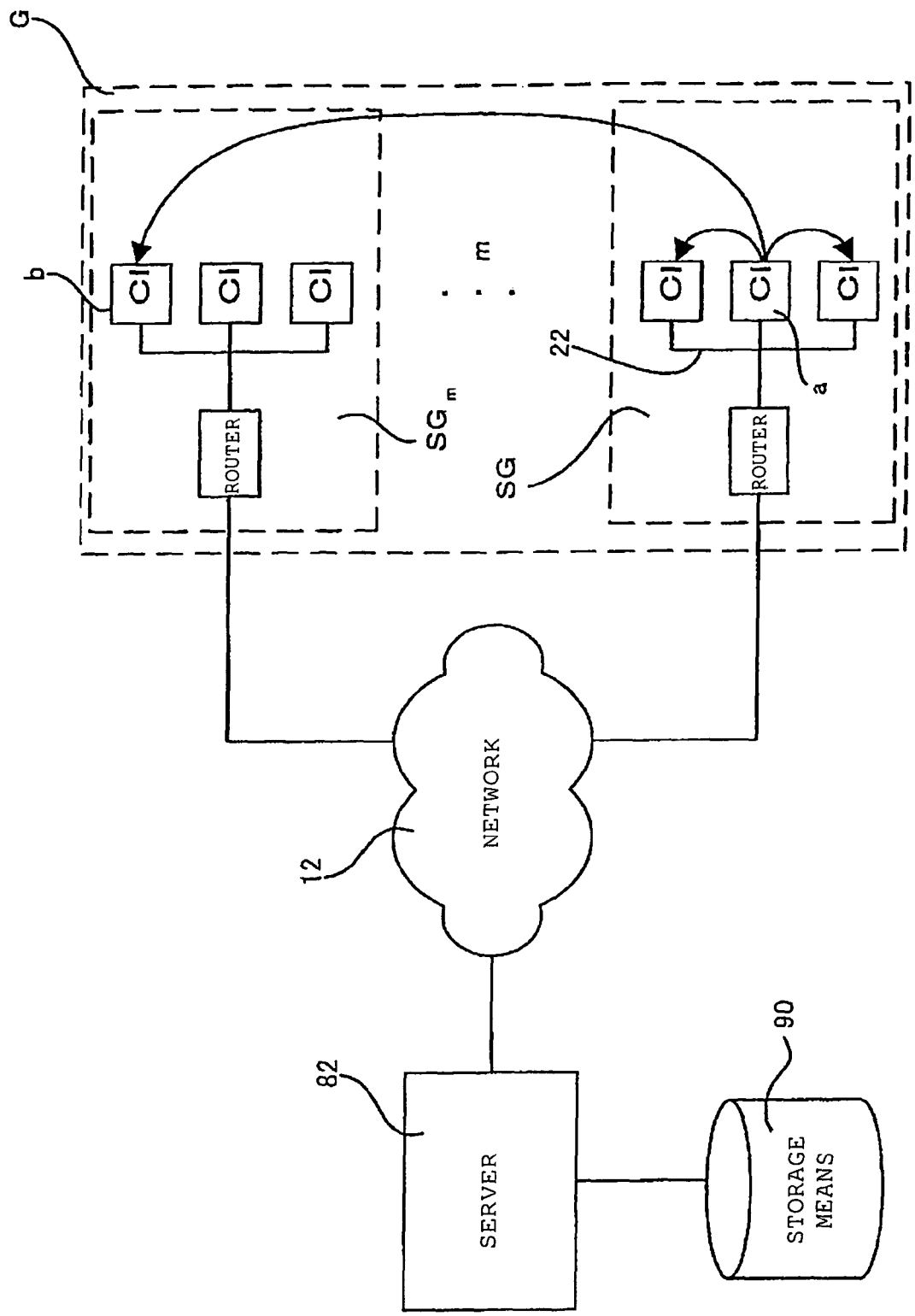
FIG. 27 is a diagram schematically illustrating flows of source packets and copy packets distributed by the contents distribution of the present invention.

FIG. 27 is a diagram schematically illustrating the above-described processing of the packet transmission/receiving between the server and the clients. As illustrated in FIG. 27, the client a belongs to the group $SG_i$ constructing the wide area group denoted by the reference code G, and the groups $SG_i$ to $SG_m$ ($1 \leq i \leq m$) exist in the wide area group G. The client a transmits the copies of the source packet received from the server 82 to all of the clients belonging to the group $SG_i$ and to one client b of each of the other (m–1) groups.

The method illustrated in FIGS. 26 and 27 enables the clients included in the wide area group G to receive the packets from the server 82, the clients in the other groups and the clients in the same groups. As a result of this, the server can distribute, to all of the clients, all of the packets for reconstructing the digital contents without transmitting the overlapped digital contents as in the conventional case of transmitting the source packets as the minimum units for reconstructing the digital contents by constructing the tunnels for each group. Furthermore, in the pseudo tunnel distribution of the present invention, the source packets are not transmitted in an overlapped manner. Therefore, it is made possible to avoid the overlap of the packets in the client completely. Accordingly, there occurs no problem on the overlap of the packets in the client and on the processing of the overlapped packets accompanied therewith, thus making it possible to distribute the digital contents smoothly.

Moreover, after accumulating predetermined amounts of the source and copy packets in the ring buffer, the client provides these packets to the application, and provides the digital contents to the user.

In the pseudo tunnel distribution of the present invention, the digital contents distribution is enabled without compressing the communication bandwidths of all of the server, groups and clients. The packets transmitted from the server to the wide area group are for one set. Seen from each group, the received packets are for one set including the source packet and the copy packets, and the transmitted packets are for one set or less in average per unit group. Even seen from each client, similarly, the received packets are for one set, and the transmitted packets are for one set or less in average. Here, the number of all of the clients included in the wide area group is redefined as m, and the number of groups constructing the wide area group is redefined as M. In this case, if the numbers of connected clients in the groups are approximately equal to one another, then each client statistically receives 1/m source packets of one set, copies the received source packets to (m/M–1) clients in the group, and further distributes the copy packets to the other (M-1) groups. Here, if the transmission/receiving amounts of the packets for one client are schematically calculated, then the following equation is obtained.

$$((m/M-1)+(M-1))/M=(m+M^2+2M)/mM \quad \text{[Equation 3]}$$

In the above-described equation, $mM-(m+M^2+2M)=(m-M)(M-2)+m>0$. Therefore, the following relationship is established.

$$(m+M^2+2M)/mM<1 \quad \text{[Equation 4]}$$

Moreover, according to the present invention, even if the join and departure of part of the clients occur, and even if part of the clients abnormally end for some reasons, the rest of the clients can keep on normally receiving the digital contents. In the present invention, the plurality of tunnels are not provided between the server and the groups, but the peer-to-group type tunnels are provided between the server and the large number of dispersed clients, thus making it possible to impart the robustness to the entire system.

Note that, in the above-described embodiments, each of the clients has been described on the premise that a pair of the digital contents and the application for reproducing the digital contents is held therein. In the present invention, though the client and the application can be operated on the same computer, the applications can share the digital contents as will be described later more in detail, which are not limited to the above-described embodiments. Moreover, the server creating the digital contents and the server performing the streaming processing therefor and transmitting the source packets can be operated on the same computer or can be constructed as separate servers. If these are constructed as computers separate from each other, the communication between the provider and the servers may be multicast or unicast using the communication protocol such as UDP and TCP. In this point, unlike the so-called multicast tunnel, the present invention makes it possible to give, between the server and the clients, a similar effect to the multicast even if the IP multicast is never used.

Figure 28:
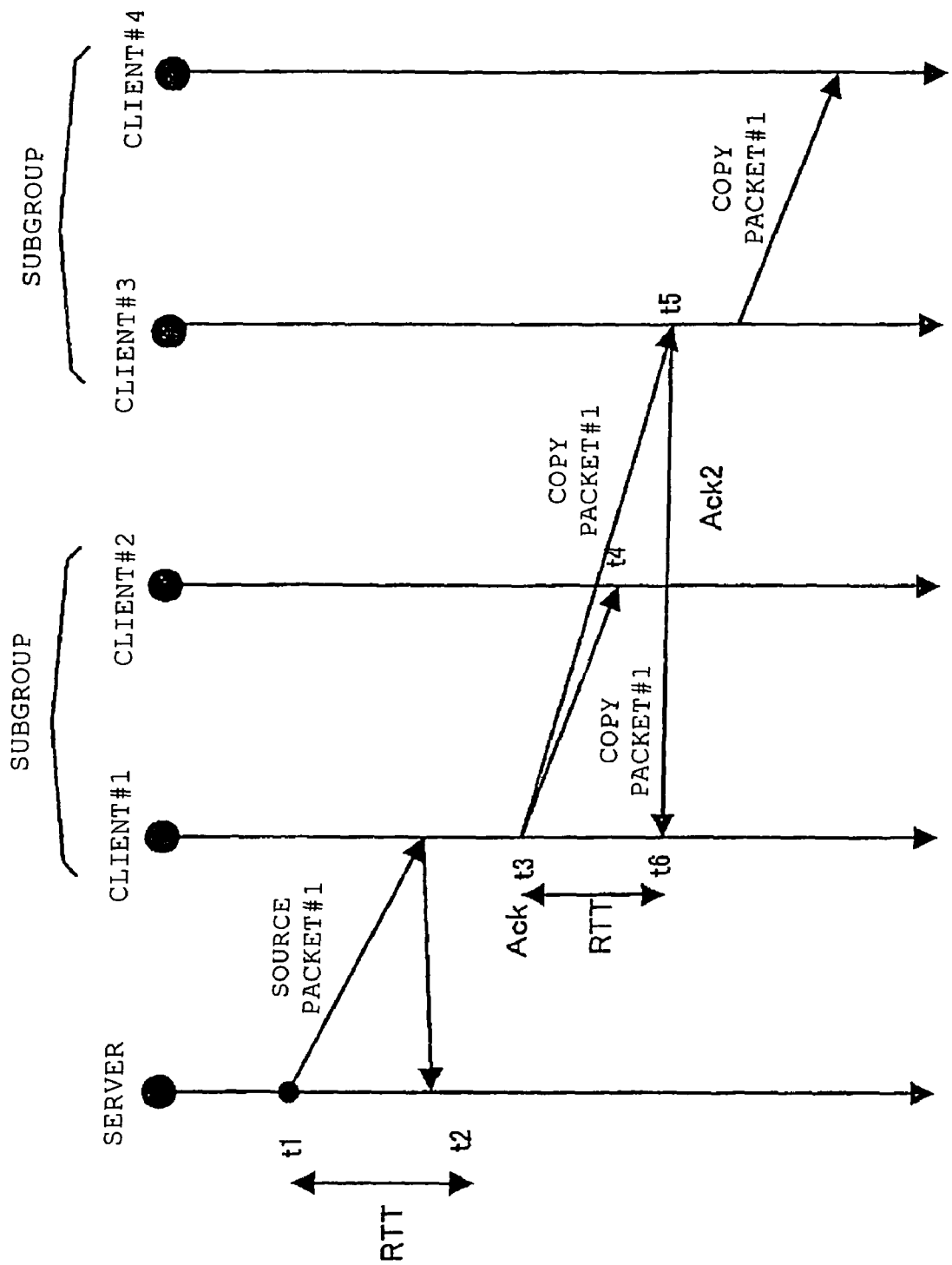
FIG. 28 is a diagram illustrating yet another embodiment of the contents distribution system of the present invention.

FIG. 28 is a diagram illustrating timing of the packet transmission/receiving between the server and the clients. As illustrated in FIG. 28, the server transmits the source packet #1 to the client #1 at the time t1. The client #1 having received the source packet #1 transmits, to the server, the signal "Ack" notifying that the source packet has been received. The server receives the signal "Ack" at the time t2, calculates a time difference (t2–t1) therebetween, and updates the execution throughput of the client in the client list, which correspond to the client #1.

Upon receiving the source packet #1, the client #1 creates the copy packet immediately. Then, at the time t3, the client #1 transmits the copy packet #1 to a client in the group to which the client #1 belongs, that is, the client #2 in the embodiment illustrated in FIG. 28. Simultaneously, the client #1 transmits the copy packet #1 to the client #3 belonging to another group. The client #2 receives the copy packet #1 at the time t4, and the client #3 receives the copy packet #1 at the time t5. The client #3 transmits, to the client #1, the signal "Ack2" notifying that the copy packet #1 has been received. At the time t6, the signal "Ack2" is received by the client #1. The client #1 calculates the execution throughput in the group, for example, as the time difference (t6–t3), and updates the corresponding client list. Furthermore, the client #3 transmits the copy packet #1 to the client #4 in the same group. Here, the reason why the round-trip time is not calculated in the group is that the copy packet #1 must be transmitted in the group without selecting the clients. Moreover, as described later in the present invention, when the communication bandwidths are greatly different among the respective groups, the time when the server transmits the source packet is stored, the time when the Ack signal is received from the destination client is measured, and then these times can be employed as criteria for judging the execution throughput.

Figure 29:
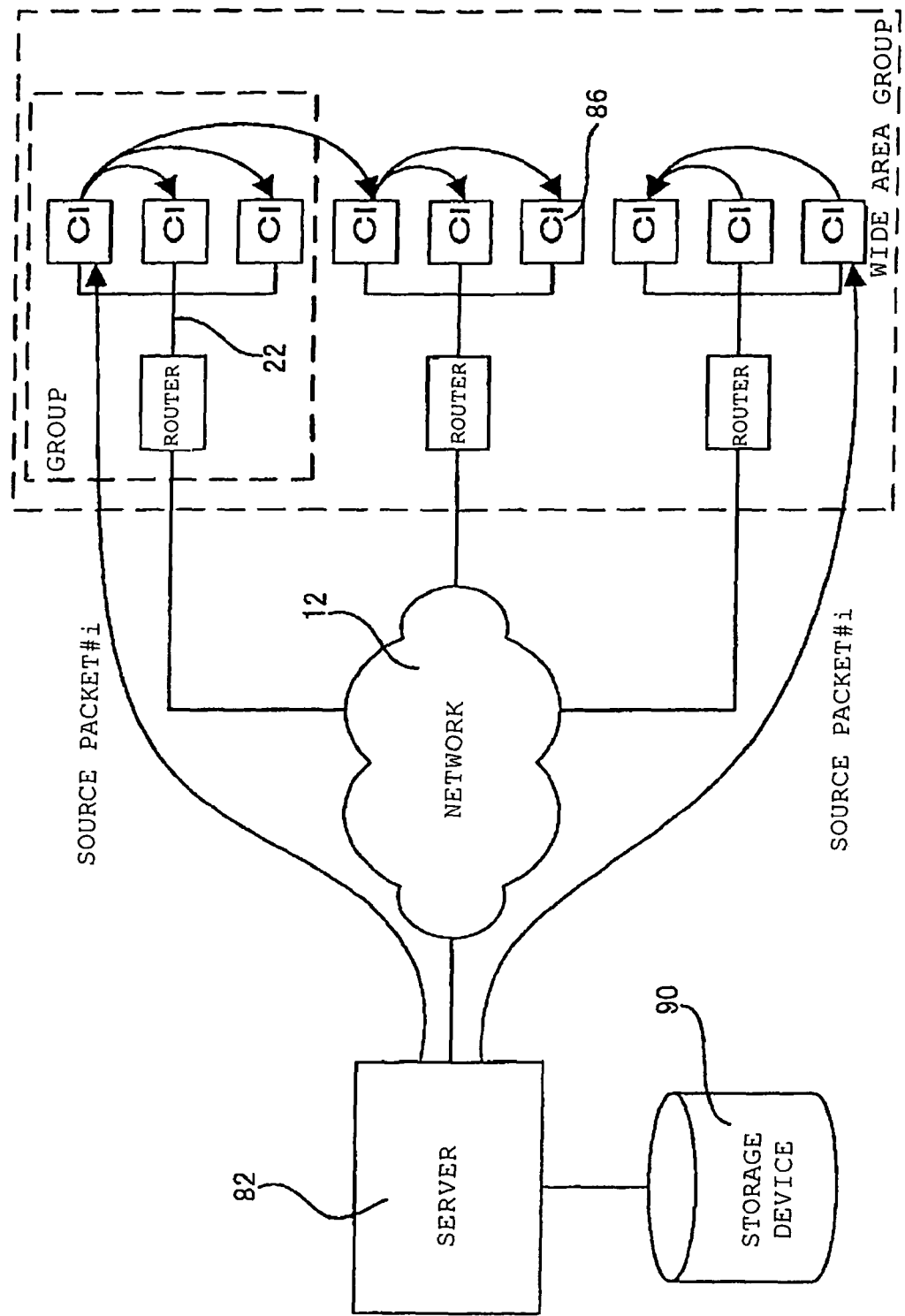
FIG. 29 is a diagram illustrating yet another embodiment of the contents distribution system of the present invention.

FIG. 29 is a diagram illustrating another embodiment of the pseudo tunnel distribution system of the present invention. In the network using the communication infra-structure such as ADSL and CATV, the bandwidths of the receiving/transmission (downlink/uplink) become asymmetric. The embodiment illustrated in FIG. 29 is a effective embodiment in the case where the uplink bandwidth is designed to be narrow in the network on the client side. In the embodiment illustrated in FIG. 29, when the server transmits the source packets, the server transmits at least one unit of source packets to the plurality of clients. In the case illustrated in FIG. 29, the clients can be individually selected from the ones belonging to the separate groups in order from, for example, a client having a smaller round-trip time (RTT). Moreover, for the source packets transmitted to the plurality of clients, the source packet construction illustrated in FIG. 24(b) can be used, and the direct instruction can be made as to which client of which group the source packets are to be copied to.

The processing executed by the clients illustrated in FIG. 29 will be described. One client having received the source packet #i transmits the copy packet to another group to which the same source packet #i has not been sent yet. In such a manner as described above, the disadvantage caused by the distribution of the copy packets corresponding to the same source packet to the same group can be eliminated. Moreover, the addresses of the groups to which the same source packets #i have been sent can be described into the source packets #i, and the copy packets can be transmitted to groups excluding the groups of which addresses have been described. Furthermore, by use of the pseudo tunnel distribution illustrated in FIG. 29, the communication amounts among the groups can be reduced, and the amount of uplink packets can also be reduced. Meanwhile, seen from the server, the load on the server is increased because there arises the necessity of transmitting the same source packets to the plurality of clients. In the present invention, an optimal method can be selected from the above-described methods in consideration of the above-described tradeoff and the characteristics of the communication infrastructure for use. Moreover, the digital contents can be distributed by use of the plurality of methods in combination in accordance with a time zone.

Figure 30:
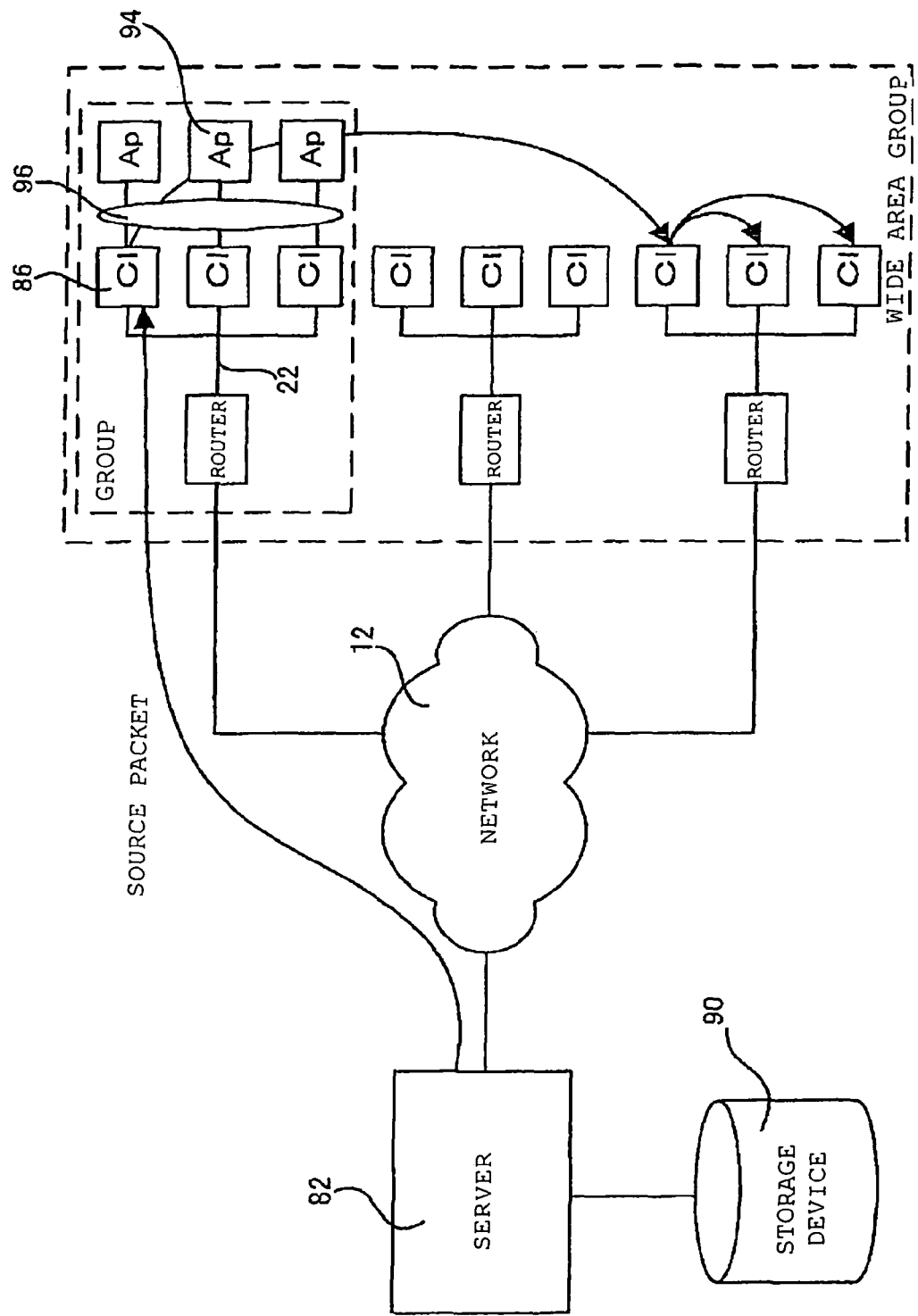
FIG. 30 is a diagram illustrating yet another embodiment of the contents distribution system of the present invention.
Figure 31:
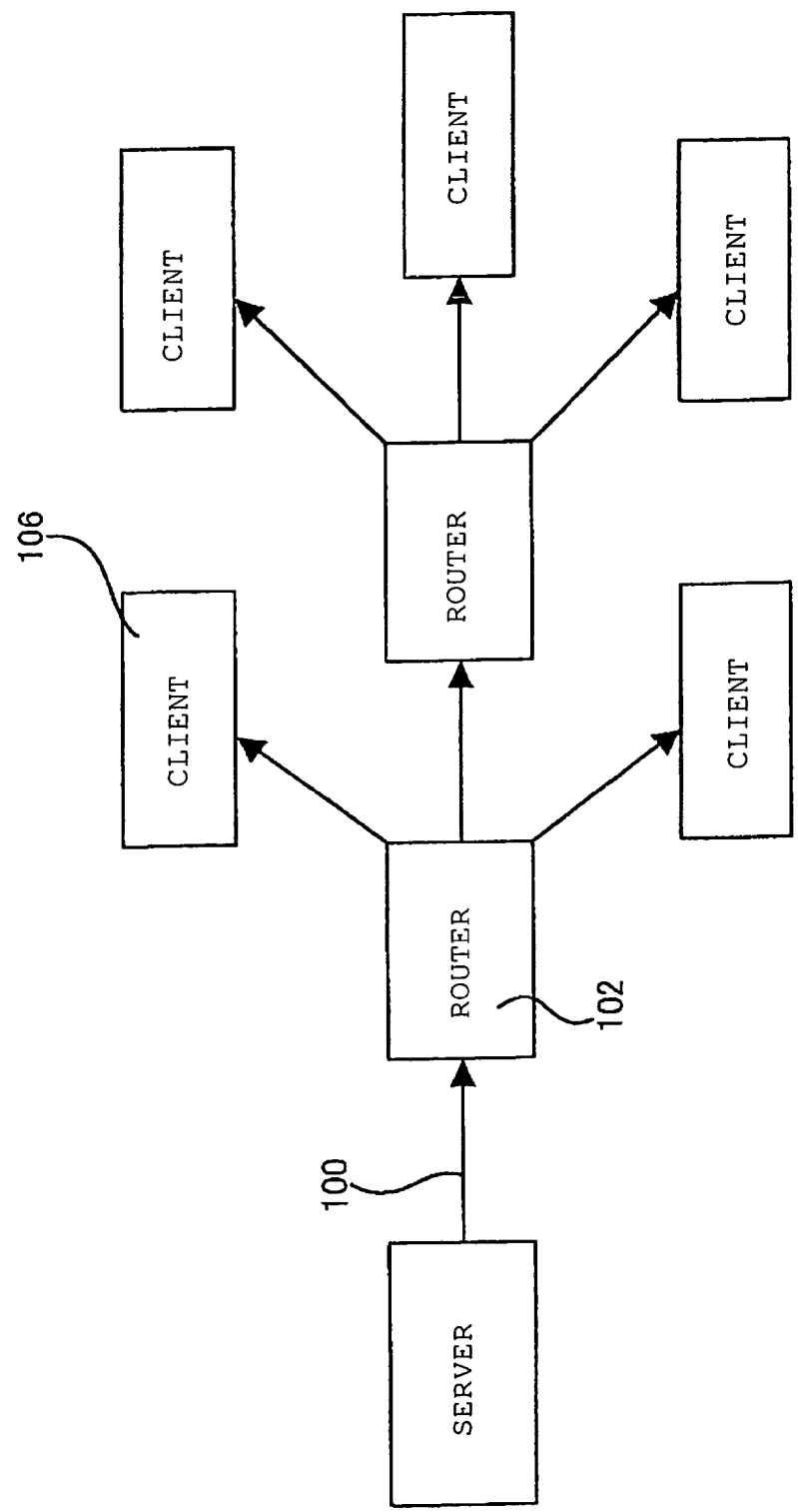
FIG. 31 is a schematic diagram of a conventional IP multicast method.
Figure 32:
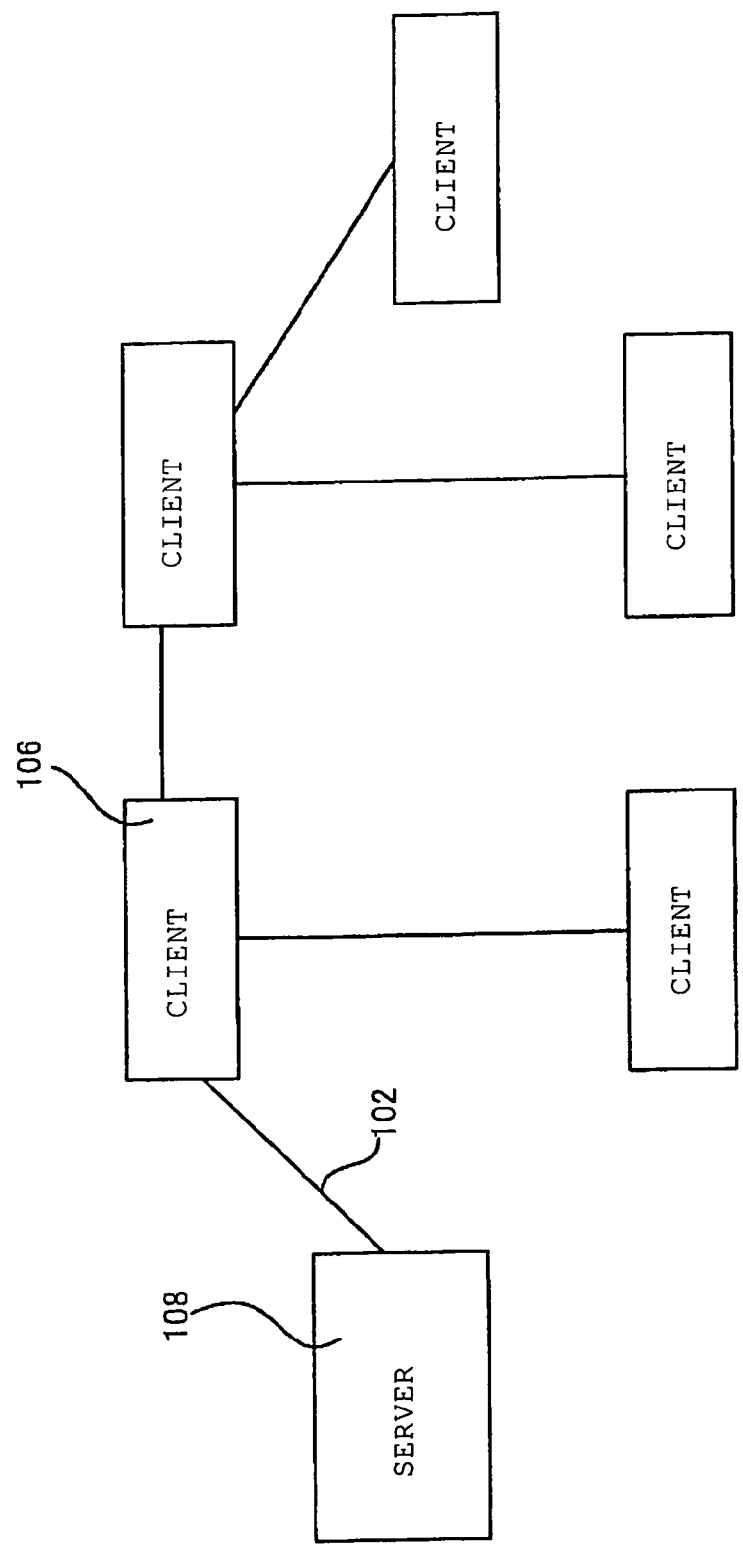
FIG. 32 is a schematic diagram of digital contents distribution using a conventional application-level multicast method.
Figure 33:
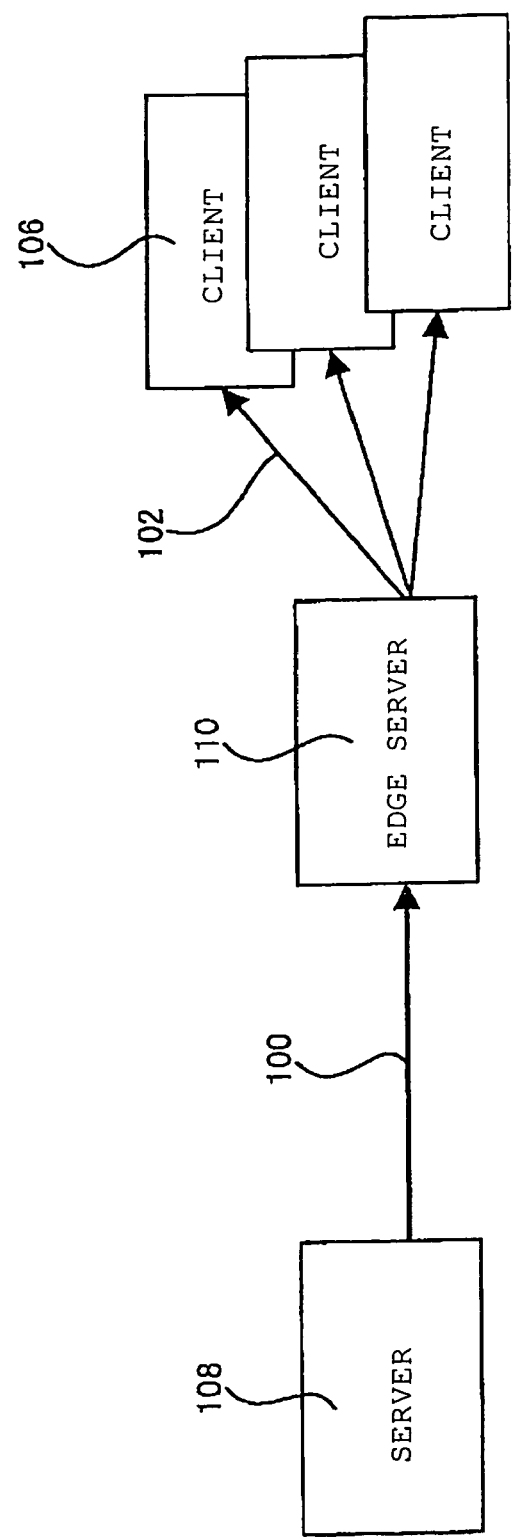
FIG. 33 is a schematic diagram of a digital contents distribution system of a conventional construction for connecting a client to an edge server.
Figure 34:
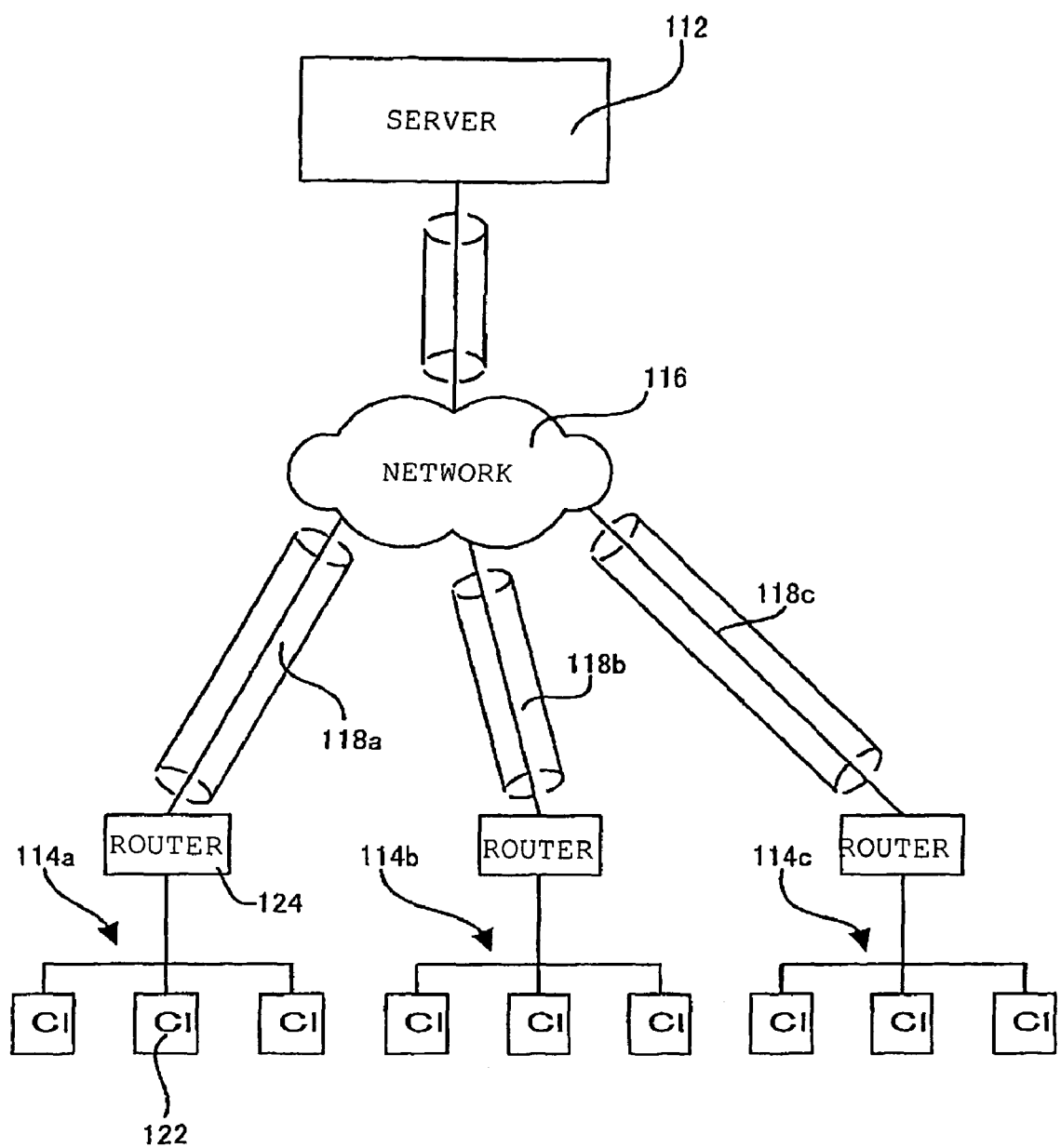
FIG. 34 is a schematic diagram illustrating digital contents distribution using a conventional multicast tunneling.
Figure 35:
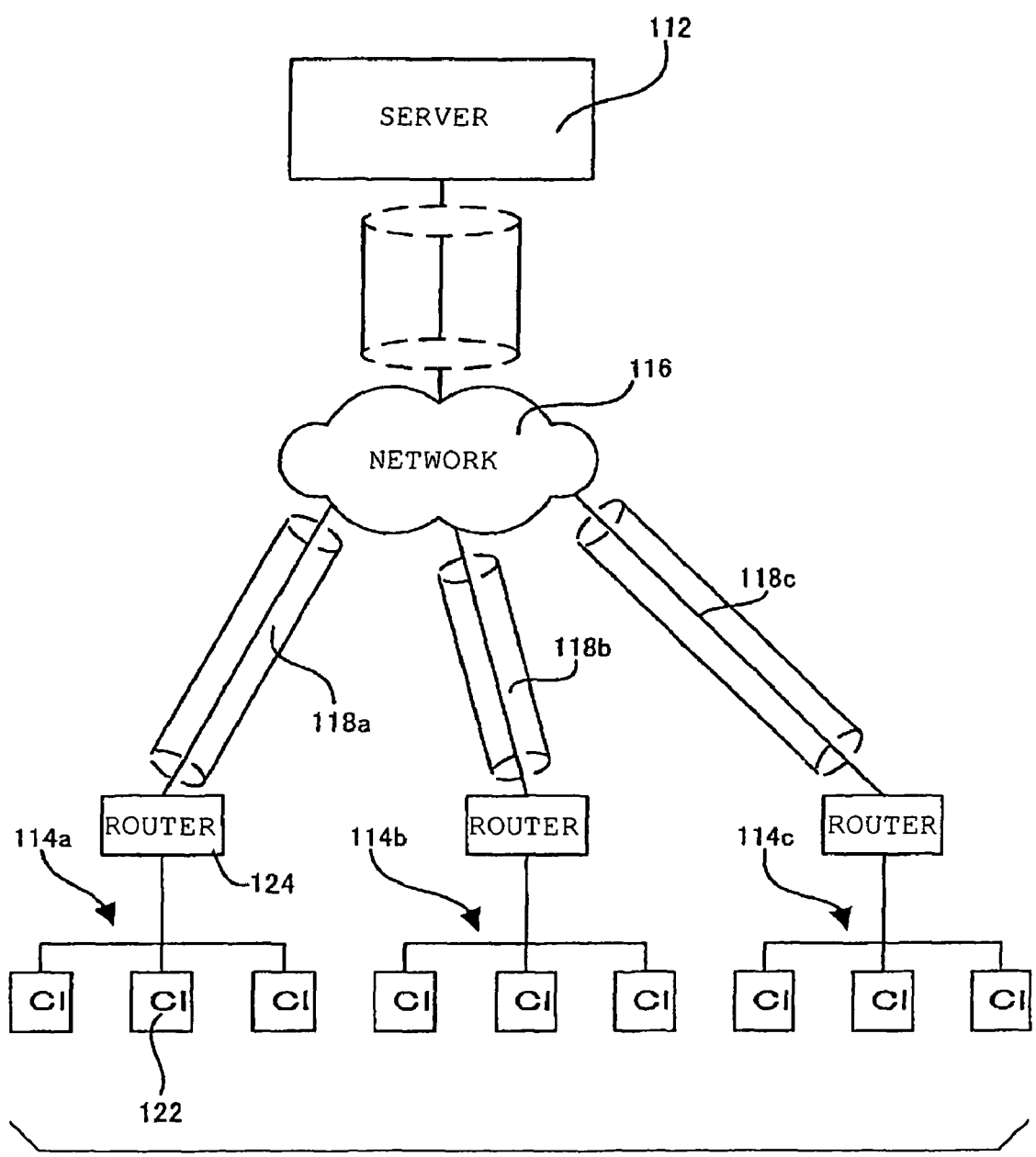
FIG. 35 is a schematic diagram illustrating a communication traffic environment in the digital contents distribution using the conventional multicast tunneling.

FIG. 30 is a diagram illustrating still another embodiment of the pseudo tunnel distribution system of the present invention. In the embodiment illustrated in FIG. 30, the copy packets are not transmitted/received among the clients in the group. In the embodiment illustrated in FIG. 30, the packets are not directly sent from the clients to the application, but the clients transmit the received packets by the broadcast or local LAN multicast referred to as the third network. In the embodiment illustrated in FIG. 30, the application is stored in another computer 94, and for the purpose of reproducing the digital contents, the computer 94 storing the application therein is connected to the client 86 through the third network 96 to acquire necessary packets. Then, the computer 94 reproduces the digital contents. Any of a wireless network and the Ethernet (registered trademark) is permitted as the second network 22 connecting the clients in the group. However, as the third network for use in the embodiment of the present invention, which is illustrated in FIG. 30, a network having a different purpose from the second network, for example, using the Ethernet (registered trademark) and the like, can be set. In the embodiment illustrated in FIG. 30, the computer 94 storing the application therein can receive the packets updated by all of the clients 86 in the group on the third network every time and can reproduce the stream. Therefore, the digital contents can be smoothly reproduced without any excess or deficiency.

Moreover, the embodiment illustrated in FIG. 30 means that the application can receive the packets even if a one-to-one relationship is not established with the client. However, it is necessary that one or more clients operate on the third network 96. In this case, the client 86 can construct the pseudo tunnel even if the client 86 does not acquire all of the packets and store the packets therein, thus enabling the digital contents distribution while enabling the reduction of the communication traffic amount and the saving of the hardware resources on the client side.

As described above, according to the present invention, the path is dynamically optimized in a packet unit in the one-to-multi digital media distribution, thus the network system becomes difficult to be affected by the join and departure of the client, and the client can join or depart from the network at any time. Moreover, the system is difficult to be affected also by the departure of the client due to the abnormal end and the disconnection of a cable, thus making it possible to improve the stability thereof. Furthermore, the loads on the clients are basically dispersed uniformly, and the receiving function operates as the entire wide area group (dispersive cooperativeness), and therefore, a special auxiliary server is not required. Thus, the complicatedness of the network system as noted from a viewpoint of autonomy is avoided, and thus a simple system construction easy to be maintained can be realized.

Moreover, the update processing reflecting the join and departure of the client is localized, and the overhead thereof is always made small. In such a manner, the load on the server is reduced to a great extent, and thus even a computer allowed to be equipped with only resources equivalent to/less than that of the client can be made to function as the server.

Furthermore, according to the present invention, for the predetermined wide area group including the plurality of groups, which are mutually connected through the network, and each of which is constructed by including the plurality of clients, it is made possible to provide a digital contents distribution system enabling smooth and efficient distribution of the digital contents while reducing the overhead of the communication traffic to the server. Furthermore, it is made possible to provide a server and clients for the system, a control method for allowing computers to function as the above-described server and clients, a program for the method, and a computer readable recording medium recording the program therein.

Note that, to the present invention, the conventional advantages in the IP multicast and the application-level multicast, for example, properties such as avoidance of congestion by efficient use of the network accompanied with the packet distribution in an unoverlapped manner and such as nonnecessity of costly substitution work in the network layers are succeeded as they are without being lost. Thus, it is made possible to perform excellent digital contents distribution. Moreover, in the present invention, each of the second networks can be constructed by including, for example, servers such as a printer server, a mail server and an appliance server.

Means or a part that realizes the above-described functions of the present invention can be constructed as software or a group of software modules described in a computer-executable program language, and does not always have to be constructed as a functional block illustrated in a drawing.

The above-described program for executing the digital contents distribution of the present invention can be described by use of a variety of programming languages, for example, C language, C++ language, Java (registered trademark) and the like. Codes describing the program of the present invention can be held in a computer readable recording medium such as a magnetic tape, a flexible disk, a hard disk, a compact disk (CD), a magneto-optical disk, and digital versatile disk (DVD).

As above, the present invention has been described by the concrete embodiments described with reference to the drawings. However, the present invention is not limited to the above-described specific embodiments, and even for various modification examples and other embodiments, any known constituent components within the range exerting the effect of the present invention can be used.

Although the preferred embodiments of the present invention have been described in detail, it should be understood that various changes, substitutions and alternations can be made therein without departing from spirit and scope of the inventions as defined by the appended claims.

What is claimed is:

1. A digital contents distribution server providing digital contents to a second network, the server comprising:
    a connection to a first network, said first network for holding and transmitting the digital contents to a plurality of clients in the second network, wherein said clients in the second network are grouped into client groups that are mutually connected to the second network through lines different in communication capacity; and
    a central processor unit configured for dividing the digital contents into a plurality of packets; wherein the packets are defined as a minimum unit required for reconstructing the digital contents;
    a storage device storing an updatable list of client destinations located in the second network, wherein said updatable list comprises client group identifiers for identifying which clients belong to which client group; and wherein the server adds and removes the client destinations from the updatable list responsive to said client destinations joining or leaving their respective client group;
    the central processor unit further configured for transmitting the packets to the first network wherein copies of said packets are then transmitted, through the second network to a selected client group;
    the central processor unit further configured for dynamically allocating, by use of the updatable list, the selected client group in the second network to which the packets are transmitted;
    a receiver configured for receiving receipt notices from the listed destinations;
    the central processor unit further configured for dynamically selecting at least one client destination, from the updatable list of client destinations, serving as an intermediate node for the selected client group, by use of the receipt notices; and
    the central processor unit further configured for transmitting the packets to the intermediate node, wherein the packets mean the minimum packets capable of reconstructing original digital contents without the overlap of the packets;
    wherein the central processor unit further transmits to the intermediate node information comprising source packet distribution data and a list of the clients within the client group to which the intermediate node belongs; and
    wherein the intermediate node refers to the transmitted information for distributing copies of the packets to other clients in the selected client group for reconstructing the digital contents from the packet copies.

2. The server of claim 1, wherein the central processor unit is further configured for:
    registering, with the server, a time when the server transmits the packets to a predetermined destination;
    registering, with the server, a time when a client having the predetermined destination issues the receipt notice of the packets; and
    calculating a time difference between the transmission time and the receipt notice issuance time.

3. The server according to claim 1, wherein the central processor unit is further configured for dynamically updating the updatable list of client in association with a change of a construction of the second network.

4. A client for receiving digital contents distributed through a first network in a second network connected to the first network, the client comprising:
    a receiving buffer that writes a received packet to an address corresponding to a packet identifier of the received packet for each time of receiving the packet and configured for:
    receiving, through the first network, dynamically allocated packets of a minimum unit for constructing digital contents divided into a plurality of packets, wherein the packets of the minimum unit comprise a minimum number of packets capable of reconstructing original digital contents without an overlap of the packets;
    wherein the packets for reconstructing the digital contents are received by a dynamically selected intermediate node within a client group in the second network;
    wherein the clients in the second network are grouped into client groups that are mutually connected to the second network through lines different in communication capacity; and
    a central processor unit configured for distributing to other clients within the client group in the second network copies of the packets of the minimum unit received through the first network and packets received from other clients through the second network.

5. The client according to claim 4, wherein the central processor unit is further configured for preparing a receipt notice which comprises a time of receiving the packets of the minimum unit.

6. The client according to claim 4, wherein the central processor unit is further configured for identifying the packets of the minimum unit from the packets received from the other clients.

7. The client according to claim 4, further comprising:
    an updatable list of members constructing the second network; and
    wherein the central processor unit is further configured for updating the updatable list in any of cases where a client is added to and deleted from the second network.

8. A digital contents distribution system configured for distributing digital contents, the system comprising:
    a server comprising a central processing unit, connected to a first network and configured for holding therein and transmitting the digital contents;
    a first network and
    a second network comprising a plurality of client groups connected to the first network through lines different in communication capacity, wherein each client group represents a wide area network; and
    the plurality of client groups constructed by including clients constructing the second network connected to the first network and for constructing the wide area group for receiving and providing the digital contents wherein one of the clients in the second network is dynamically selected as an intermediate node for receiving a packet from the server and transmitting the received packet to other clients in the client group, and
    wherein the server is configured for dividing the held digital contents into a plurality of packets and transmitting packets of a minimum unit for constructing the digital contents to the intermediate node by dynamically allocating the packets without overlap, and
    wherein the intermediate node distributes copies of the packets of the minimum unit received from the server to all of the clients constructing the client group to which the intermediate node belongs, using an updatable list comprising:
        client group identifiers for identifying which clients belong to which client group; and a client list of the clients constructing the wide area network group within the second network, each client receiving the packets referring to source packet distribution data or a list of pre-allocated copy destinations, which is received together with said packets of a minimum unit for constructing digital contents; and wherein the packets of the minimum unit mean the minimum number of packets capable of reconstructing original digital contents without the overlap of the packets.

9. A server connected to a first network for distributing digital contents, the server comprising:

an interface configured to acquire the digital contents;

a storage device for holding therein the digital contents;
wherein the storage device also stores an updatable list of client destinations located in a second network, wherein said updatable list comprises client group identifiers for identifying which clients belong to which client group; and
wherein the server adds and removes the client destinations from the updatable list responsive to said client destinations joining or leaving their respective client group;

a central processor unit configured for:
reading the digital contents from the storage device;
creating packets of a minimum unit by dividing the digital contents into a plurality of packets, wherein the packets of the minimum unit comprise the minimum number of packets capable of reconstructing original digital contents without an overlap of the packets;
selecting distribution destinations of the packets of the minimum unit in such a manner that identical packets of the minimum unit are not overlapped for a predetermined group, wherein the distribution destinations are selected from the updatable list of destinations included in the second network; and
transmitting the packets to a first network for transmitting to an intermediate node within the predetermined group for dynamically allocating the packets of the minimum unit for constructing the digital contents:
wherein the intermediate node distributes copies of the packets to clients of the selected destinations in the group.

10. The server according to claim 9, wherein the central processor unit is configured for creating packets of a minimum unit including data for distributing a copy of the packets of the minimum unit at least to another group.

11. A method for controlling a computer as a server for distributing digital contents through a first network to a wide area group including a plurality of groups, the method making the computer execute the steps of:

storing the digital contents in a storage device;

creating packets of a minimum unit by dividing the held digital contents into a plurality of packets, wherein the packets of the minimum unit comprise the minimum number of packets capable of reconstructing original digital contents without an overlap of the packets;

selecting and registering therewith distribution destinations of the packets of the minimum unit in such a manner that identical packets of the minimum unit are not overlapped for a predetermined group, wherein the distribution destinations are selected from an updatable list of destinations;

wherein said updatable list comprises client group identifiers for identifying which clients belong to which client group; and wherein the server adds and removes the client destinations from the updatable list responsive to said client destinations joining or leaving their respective client group;

storing data of the selected distribution destinations as the packets of the minimum unit; and reading and transmitting, for constructing the digital contents, the stored packets of the minimum unit to an intermediate node within the selected distribution destination for distributing copies of the packets to other clients of the selected distribution destinations in the group while dynamically allocating the read-out packets;

wherein the group is connected to the server through a second network connected to the first network through lines different in communication capacity.

12. A non-transitory computer readable recording medium recording therein a program for controlling a computer as a server for holding therein and distributing digital contents, through a first network, to a wide area group including a plurality of groups connected through a second network, wherein the program when executed causes the computer execute the steps of:

creating packets of a minimum unit by dividing the held digital contents into a plurality of packets;

selecting and registering therewith distribution destinations of the packets of the minimum unit in such a manner that identical packets of the minimum unit are not overlapped for a predetermined group, wherein the distribution destinations are selected from an updatable list of destinations comprising:

client group identifiers for identifying which clients belong to which client group, wherein each client group represents a wide area network;

a client list of the clients constructing the wide area network group within the second network, each client receiving packets referring to source packet distribution data or a list of pre-allocated copy destinations, which is received together with said packets of a minimum unit for constructing digital contents;

storing data of the selected distribution destinations as the packets of the minimum unit; and reading and transmitting, for constructing the digital contents, the stored packets of the minimum unit to an intermediate node for distributing copies of the packets to the other clients of the selected distribution destinations in the group while dynamically allocating the read-out packets;

wherein the group is connected to the server through a second network connected to the first network through lines different in communication capacity.

* * * * *